(12) United States Patent
Kan et al.

(10) Patent No.: US 7,081,914 B2
(45) Date of Patent: Jul. 25, 2006

(54) IMAGE RECORDER

(75) Inventors: Kazuma Kan, Kyoto (JP); Arifumi Omoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 11/013,465

(22) Filed: Dec. 17, 2004

(65) Prior Publication Data
US 2005/0110864 A1    May 26, 2005

Related U.S. Application Data

(63) Continuation of application No. 10/388,612, filed on Mar. 17, 2003.

(30) Foreign Application Priority Data
Mar. 26, 2002    (JP) .............................. P2002-86152

(51) Int. Cl.
*B41J 2/435* (2006.01)
(52) U.S. Cl. ..................................... 347/262; 347/264
(58) Field of Classification Search ........ 347/241–245, 347/256–257, 262–264, 227, 116; 101/485–486; 355/47; 271/10.11–10.12, 226, 232–240, 271/234, 236, 239, 243–245; 358/493; 400/80, 400/709
See application file for complete search history.

(56) References Cited

U.S. PATENT DOCUMENTS

| 5,709,139 | A | | 1/1998 | Shimizu et al. ................. 83/54 |
| 5,842,397 | A | | 12/1998 | Shimizu et al. ................. 83/54 |
| 5,956,071 | A | * | 9/1999 | Mattila et al. ............... 347/262 |
| 6,016,752 | A | * | 1/2000 | Harari ......................... 101/486 |
| 6,064,465 | A | * | 5/2000 | Watanabe ...................... 355/47 |
| 6,213,020 | B1 | | 4/2001 | Kawada et al. ............. 101/486 |
| 6,299,572 | B1 | | 10/2001 | Harari ......................... 493/320 |
| 6,755,132 | B1 | * | 6/2004 | Cummings .................. 101/485 |

FOREIGN PATENT DOCUMENTS

| JP | 7-225484 | 8/1995 |
| JP | 10-323960 | 12/1998 |
| JP | 2000-56482 | 2/2000 |

* cited by examiner

*Primary Examiner*—Hai Pham
(74) *Attorney, Agent, or Firm*—McDermott Will & Emery LLP

(57) ABSTRACT

An image recorder includes a punch unit for punching a hole in a plate. The punch unit has six punchers disposed movably. Punches of the punchers can punch holes of different configurations. A punch of a required configuration moves to a required location toward a plate prepared on an upper tray of a feed/discharge unit. After a hole is punched in the plate by this punch, the plate is fed to a drum. This allows changes in the location of a punched hole in the plate without the need to simply increase the number of punchers when the range of plate sizes mountable on the drum is expanded. If competition in punch standards occurs, the image recorder allows a required puncher to be situated in a desired location.

14 Claims, 44 Drawing Sheets

MICROSWITCH (OFF)

MICROSWITCH (ON)

FIG. 12
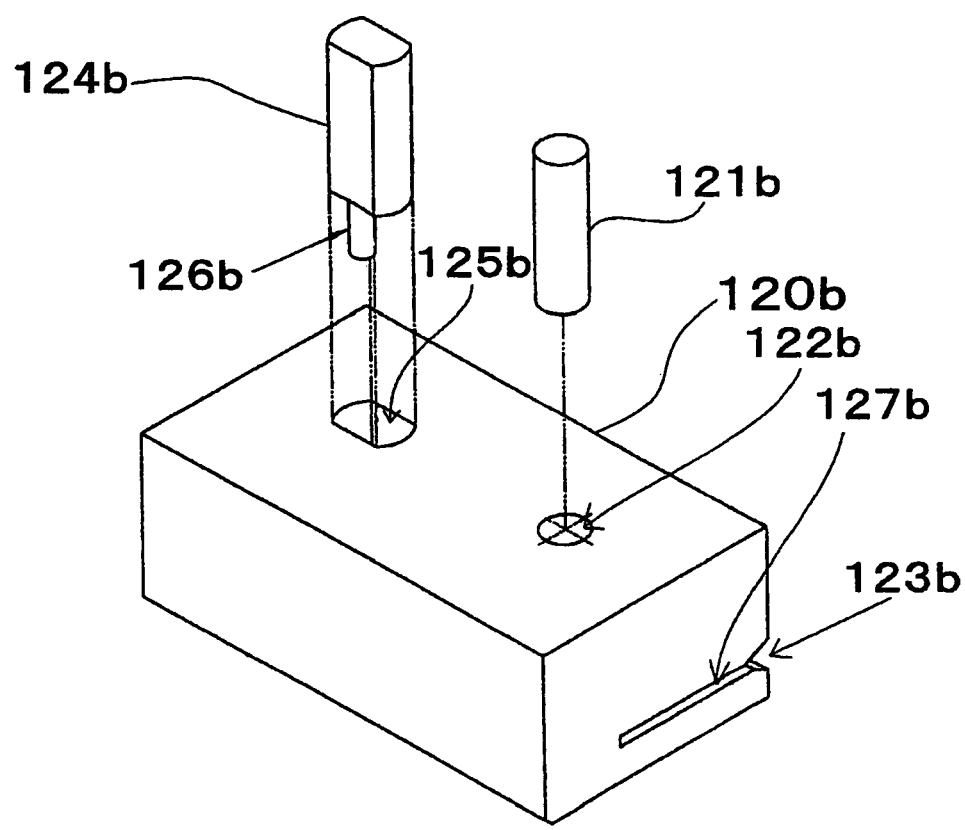
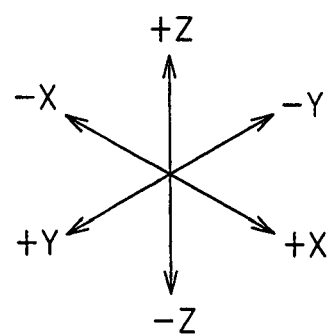

FIG. 13
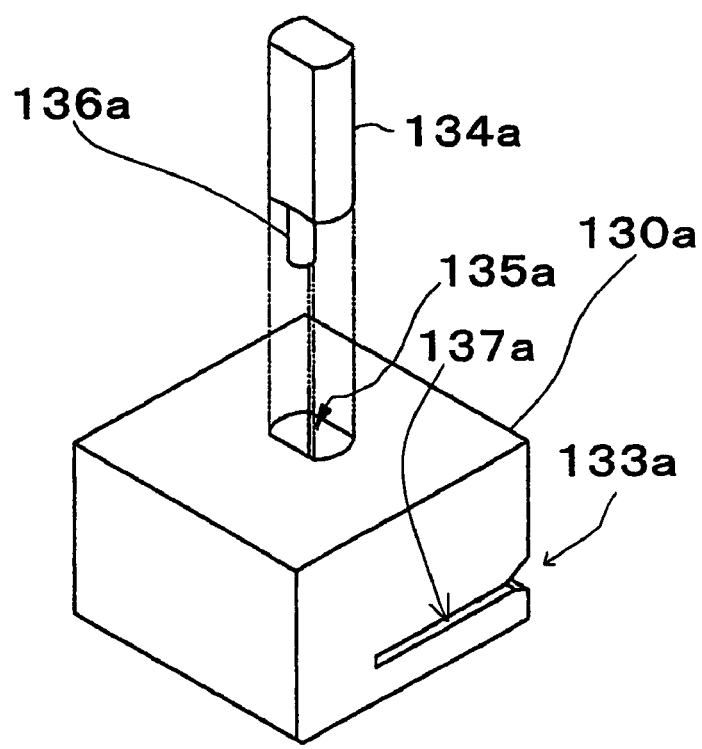
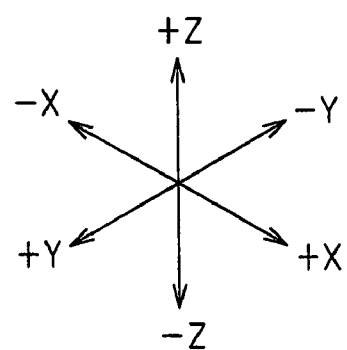

FIG. 18
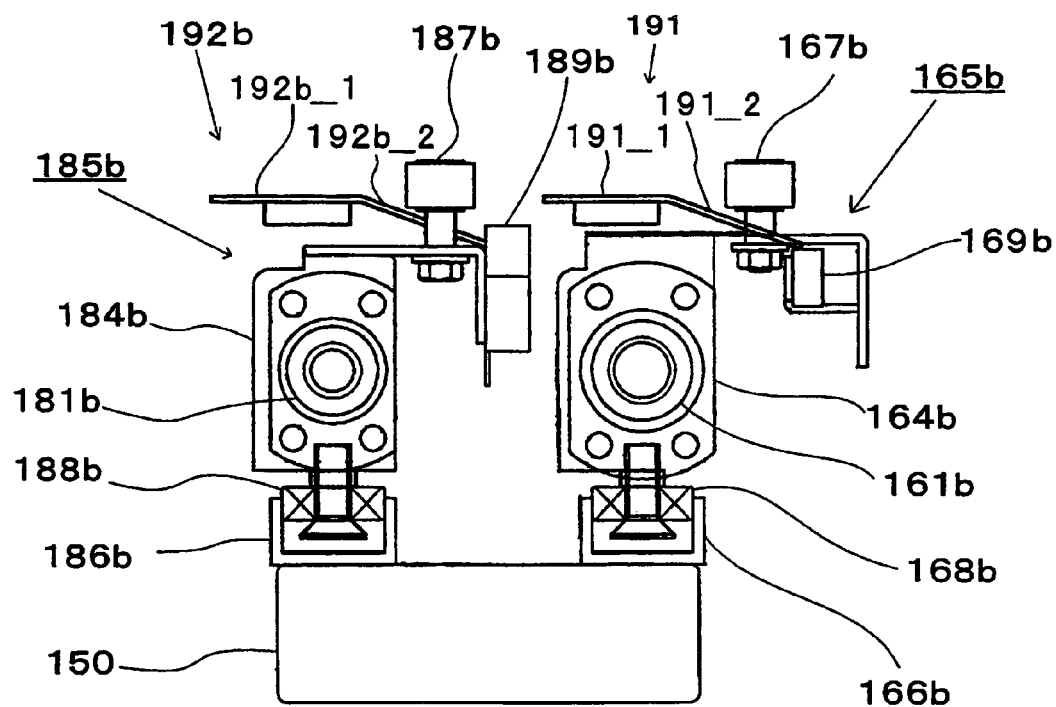
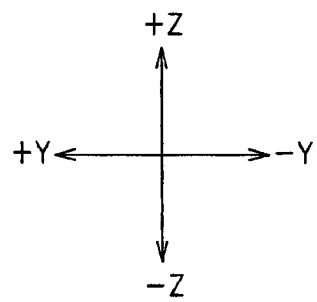

IMAGE RECORDER

This is a continuation of application Ser. No. 10/388,612, filed Mar. 17, 2003.

BACKGROUND OF THE INVENTION

1. Field of the Invention

The present invention relates to an image recorder for directing an optical beam onto an image recording material such as a plate mounted on a drum to record an image on the image recording material.

2. Description of the Background Art

In such an image recorder, the formation of an accurately recorded image on a plate requires the reliable positioning of the plate (or image recording material) in a predetermined location on a drum. One of the known techniques for such positioning is as follows. At least two positioning pins are provided upright on the drum, and a hole is punched in the leading edge of a plate. The punched hole is brought into engagement with one of the two positioning pins, and a portion of the leading edge of the plate which has no punched hole is brought into contact with the other positioning pin, whereby the plate is positioned on the drum.

The above-mentioned technique improves the positioning accuracy of the plate on the drum. However, this technique becomes incapable of meeting the requirements if the range of usable plate sizes is expanded. The location of the punched hole must be changed depending on the expansion of the plate size range. The increase in the number of punchers is a solution to such a problem, but gives rise to the increase in costs.

In some cases, a hole (referred to as a printing hole) for use in a later step is punched at the same time that the above-mentioned hole for positioning is punched, in the image recorder. This provides a uniform positional relationship between the recorded image and the printing hole, thereby offering the advantage of improving an overprinting accuracy on a printing sheet.

There are a variety of standards for printing holes. For the adoption of one of the standards for printing holes, a puncher should be placed in a location compliant with the standard.

However, this location of the puncher sometimes competes with the location of a puncher being in actual use. In this case, it is impossible to use the printing hole based on the standard. Further, an attempt to punch printing holes based on a plurality of standards in the same image recorder increases the incidence of such competition.

SUMMARY OF THE INVENTION

The present invention is intended for a technique relating to an image recorder for directing an optical beam onto an image recording material such as a plate mounted on a drum to record an image on the image recording material.

According to the present invention, the image recorder comprises: a recording drum for mounting an image recording material thereon with reference to at least one positioning part provided on a surface thereof; an image recording element for directing an optical beam modulated in accordance with an image signal onto the image recording material mounted on the recording drum, thereby to record an image on the image recording material; a punching element having a puncher for punching a hole engageable with the positioning part in the image recording material; a moving element for moving the punching element in a direction parallel to the axis of rotation of the recording drum; and a feed element for feeding the image recording material punched with a hole by the puncher to the recording drum.

This allows changes in the location of a punched hole is punched without the need to increase the number of punchers if the range of plate sizes is expanded.

Preferably, the puncher punches in the image recording material a hole for use in a step subsequent to image recording, after the movement of the punching element.

After a first hole engageable with the positioning part is punched, the punching element is moved and then punches in the image recording material a second hole for use in the step subsequent to image recording. Thus, making the amount of movement of the punching element variable provides a variety of positional relationships between the first hole and the second hole for printing. Additionally, a plurality of holes for printing can be punched without concern for competition between the locations of punchers.

It is therefore a primary object of the present invention to provide an image recorder capable of punching a required hole without the need to increase the number of punchers if the range of usable plate sizes is expanded.

It is another object of the present invention to provide an image recorder capable of punching a first hole for use in positioning in the image recorder and a second hole for use in a subsequent step, independently of the positional relationships between the first and second holes.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 12 and 13 are perspective views of principal parts of a puncher;

FIG. 18 is a sectional view of the side-to-side adjustment unit taken along the dash-dot lines E1-E2 of FIG. 15 as seen in the direction of the arrow G;

DESCRIPTION OF THE PREFERRED EMBODIMENTS (Overall Construction)

Figure 1:
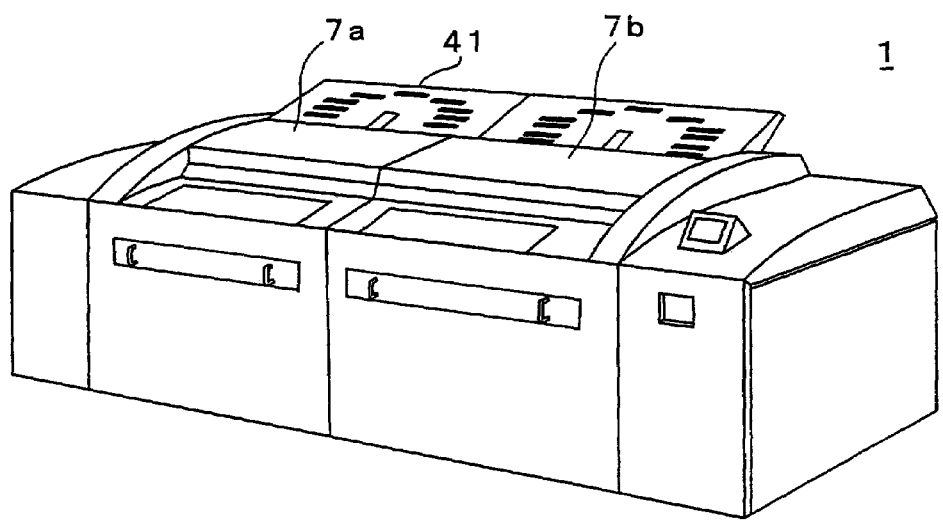
FIGS. 1 and 2 are perspective views of an image recorder according to a preferred embodiment of the present invention.
Figure 2:
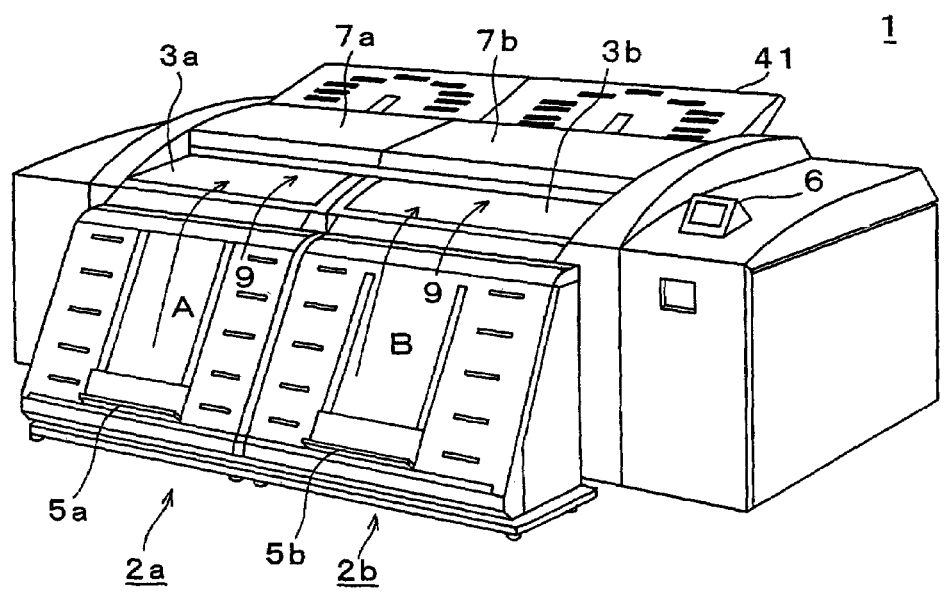

A preferred embodiment according to the present invention will now be described with reference to the drawings. FIGS. 1 and 2 are perspective views showing the external appearance of an image recorder 1 to which the present invention is applied. FIG. 2 shows the image recorder 1 of FIG. 1, with set tables 2*a*, 2*b* and plate guides 3*a*, 3*b* attached thereto for use as auxiliary equipment for loading the image recorder 1 with a plate serving as an image recording material. The set tables 2*a*, 2*b* and the plate guides 3*a*, 3*b* are attachable to and detachable from the image recorder 1. A plate, as that term is used herein, includes a printing plate on which an image will be recorded by irradiation from a beam source such as a laser light source.

A virgin plate P (that is, a plate which is not recorded yet) (not shown) is prepared in an inclined position on the set tables 2*a*, 2*b*. The set tables 2*a*, 2*b* have respective holding members 5*a*, 5*b* which hold the lower edge of the plate P. The vertical location of the holding members 5*a*, 5*b* is adjustable, and this location adjustment allows plates P of a variety of sizes to be set on the set tables 2*a*, 2*b*.

Each of the two set tables 2*a*, 2*b* is capable of setting thereon a single small-size plate P. Otherwise, both of the two set tables 2*a*, 2*b* may be used together to set a single large-size plate P thereon.

A control panel 6 is provided on the front surface of the image recorder 1. An operator can enter commands for starting the loading of a plate P and starting image recording, the number and sizes of plates P to be used, and other commands from the control panel 6 to a controller (not shown).

Openable and closable front covers 7*a*, 7*b* and rear covers 8*a*, 8*b* (not shown) are attached to the upper surface of the image recorder 1. A gap is defined between the front covers 7*a*, 7*b* and the rear covers 8*a*, 8*b*. A plate feed/discharge unit 20 (in which only an upper tray 41 thereof is shown in FIGS. 1 and 2) protrudes upwardly of the image recorder 1 from the gap.

The plates P on the set tables 2*a*, 2*b* move in directions indicated by the arrows A and B of FIG. 2, and pass over the plate guides 3*a*, 3*b*. Thereafter, the plates P pass through a slit 9 defined between the front covers 7*a*, 7*b* and the plate guides 3*a*, 3*b*, and are loaded onto the upper tray 41 of the image recorder 1.

The left-hand side and the right-hand side of the image recorder 1 as seen in FIGS. 1 and 2 are referred to hereinafter as a "home side" and an "away side," respectively. The full face side as seen in FIGS. 1 and 2 is referred to hereinafter as the front side of the image recorder 1, and the opposite side as the rear side thereof. An axis parallel to the axis of rotation of a drum 21 (to be described later) is defined as an X axis. A direction from the home side to the away side is defined as a +X direction, and the opposite direction as a −X direction. A vertical axis is defined as a Z axis. A vertical upward direction is defined as a +Z direction, and a vertical downward direction as a −Z direction. An axis perpendicular to the X and Z axes is defined as a Y axis. A direction from the rear side to the front side of the image recorder 1 is defined as a +Y direction, and the opposite direction as a −Y direction.

When the image recorder 1 has two members of the same type, identifying alphabetic characters "a" and "b" are added herein to the same reference character in principle to designate a member on the home side and a member on the away side, respectively, such as the plate guides 3a and 3b. However, such identifying alphabetic characters are dispensed with in some cases for description of the structure, function and the like common to the two members.

Figure 3:
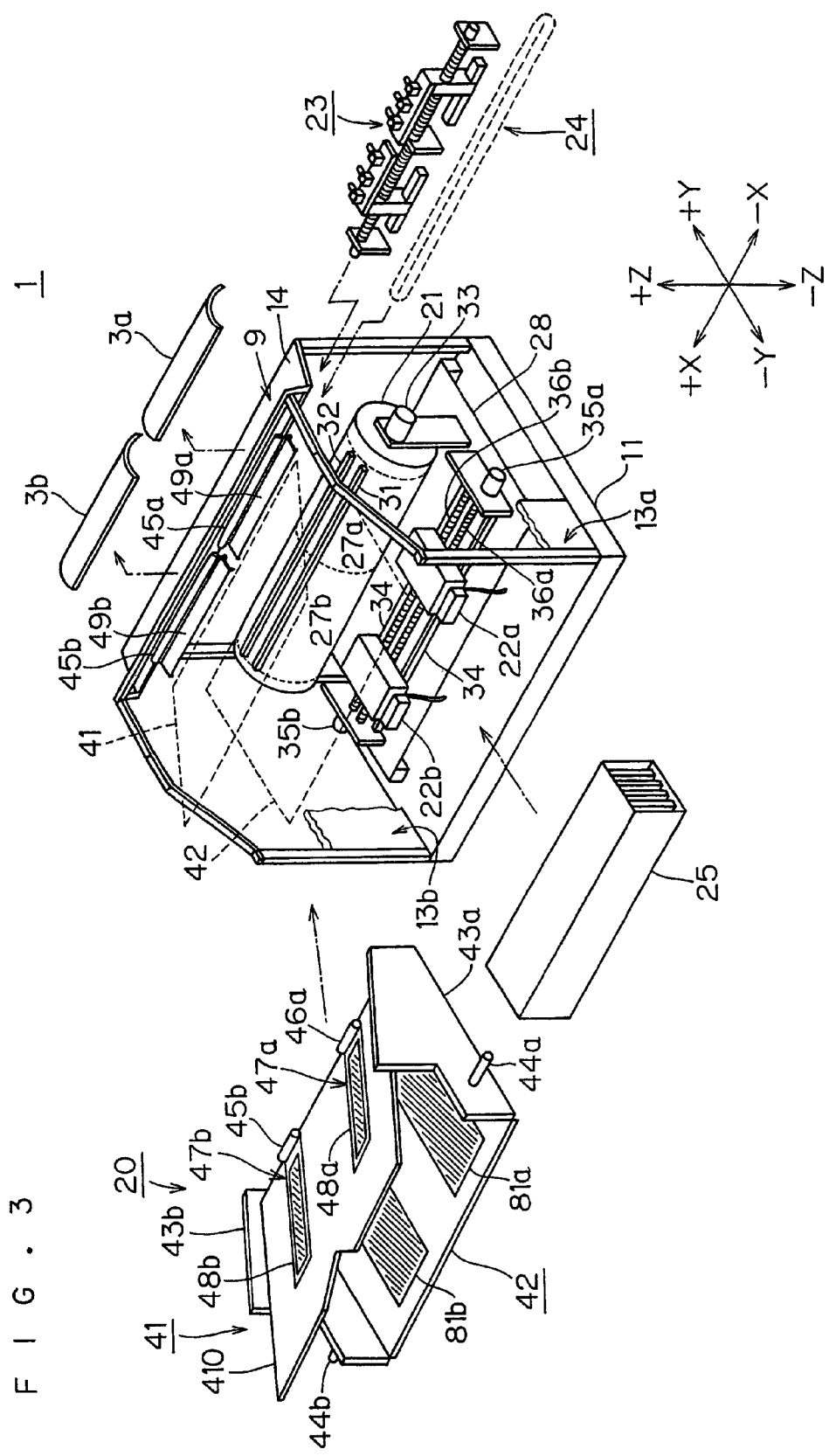
FIG. 3 is an exploded view showing the construction of the image recorder.

FIG. 3 is a schematic perspective view, with parts exploded, of the image recorder 1, as seen from the rear side of the image recorder 1. The above-mentioned front covers 7a, 7b and the rear covers 8a, 8b are not shown in FIG. 3.

The image recorder 1 is constructed such that side panels 13a, 13b, a plate mounting panel 14, the front covers 7a, 7b and the rear covers 8a, 8b are attached to a frame 11 having approximately the shape of a rectangular parallelepiped, and a required horizontal panel is provided across the interior of the frame 11. The plate feed/discharge unit 20, the cylindrical drum 21, a pair of recording heads 22a, 22b, a punch unit 23, a side-to-side adjustment unit 24, an electrical unit 25, a base 26, and the like are mounted to the frame 11 having approximately the shape of a rectangular parallelepiped.

The base 26 is secured to the bottom surface of the frame 11. The drum 21, the pair of recording heads 22a, 22b, and drive mechanisms for driving the drum 21 and the recording heads 22a, 22b, respectively, are mounted on the base 26.

The drum 21 is intended to mount one or two plates P on the outer peripheral surface thereof. When two plates P are mounted, the two plates P are arranged along the X axis. A plate mounting region on the outer peripheral surface of the drum 21 is divided into two regions arranged along the X axis: a right-hand region as seen in FIG. 3 which is referred to as a first plate mounting region 27a; and a left-hand region which is referred to as a second plate mounting region 27b. The plate mounting regions 27a and 27b have the same dimension along the X axis in this preferred embodiment, but may have different dimensions along the X axis. When only one of the plate mounting regions 27a and 27b is used to mount a plate P, the plate P is referred to as a double-mounting plate P2.

In some cases, a distinction will be made between double-mounting plates P2 to be mounted in the first and second plate mounting regions 27a and 27b by designating the former using the reference character P2a and the latter using the reference character P2b.

On the other hand, there is a plate P to be mounted using the two plate mounting regions 27a and 27b together. The plate P to be mounted in this fashion is referred to as a single-mounting plate P1.

(Drum 21)

The drum 21 comprises a leading edge clamp 31 for fixing the leading edge of a plate P, a trailing edge clamp 32 for fixing the trailing edge of the plate P, and a suction hole not shown for holding the back surface of the plate P by vacuum suction. The drum 21 is rotatable forwardly and backwardly at high or low speeds by a motor 33 attached to a rotary shaft of the drum 21. Clockwise and counterclockwise directions of rotation of the drum 21 when an end surface of the drum 21 is seen from the home side are referred to as a forward direction and a backward direction, respectively. Although not shown, the leading edge clamp 31 includes a plurality of pressing portions 310, and a pivotal shaft for coupling the pressing portions 310 together. A leading edge clamp opening/closing mechanism (not shown) mounted to the frame 11 of the image recorder 1 acts to pivot the pivotal shaft, thereby pivoting the plurality of pressing portions 310 simultaneously between a position for fixing the leading edge of the plate P and a position for releasing the same. The trailing edge clamp 32 includes a plurality of securing sections 320 (not shown). A trailing edge clamp opening/closing mechanism (not shown) mounted to the frame 11 acts to move the securing sections 320 of the trailing edge clamp 32 between a position for fixing the trailing edge of the plate P on the surface of the drum 21 and a position spaced apart from the drum 21 for releasing the trailing edge of the plate P. Thus, the trailing edge clamp 32 fixes and releases the trailing edge of the plate P. Specific structures of the leading edge clamp opening/closing mechanism and the trailing edge clamp opening/closing mechanism are not relevant to the present invention, and therefore will not be described in detail.

A plurality of positioning pins for positioning the plate P are provided upright on the surface of the drum 21.

(Recording Heads 22a and 22b)

The first and second recording heads 22a and 22b direct a plurality of optical beams modulated in accordance with an image signal, for example, from a plurality of light emitting devices onto a plate P mounted on the outer peripheral surface of the drum 21, thereby to form an image on the plate P. Both of the first and second recording heads 22a and 22b are disposed slidably along a pair of rails 34 secured on the base 26. The first recording head 22a is in threaded engagement with a feed screw 36a rotatably driven by a motor 35a. Thus, the first recording head 22a is driven by the motor 35a to produce a reciprocal movement in a direction parallel to the axis of rotation of the drum 21 (or parallel to the X axis). Similarly, the second recording head 22b is in threaded engagement with a feed screw 36b rotatably driven by a motor 35b. Thus, the second recording head 22b is driven by the motor 35b to produce a reciprocal movement in a direction parallel to the axis of rotation of the drum 21. In this manner, the image recorder 1 is capable of individually operating the two recording heads 22a and 22b.

The image recorder 1 is capable of recording an image at any resolution, and the feed speed (sub-scanning speed) of the first and second recording heads 22a and 22b is established based on a selected resolution. The first and second recording heads 22a and 22b are fed continuously, whereby the plate P is scanned in a spiral fashion. During the scanning, an adjustment known as a spiral correction is made which, for example, corrects the light emission timing of the light emitting devices of the recording heads for proper recording of a rectangular image.

Although plates P of different sizes may be used in the image recorder 1, the plates P, if of any size, are mounted to the drum 21 at the same angle. Specifically, each of the plates P is mounted to the drum 21 so that the leading edge thereof is always parallel to the axis of rotation of the drum 21. This eliminates the need to correct image data for compensating for changes in the mounting angle of the plates P.

(Punch Unit 23)

The punch unit 23 is intended to punch a hole for positioning and the like in a plate P before being mounted to the drum 21. The punch unit 23 also punches a hole serving as a reference for mounting of an image-recorded plate P onto a plate cylinder and the like of a printing apparatus. The details will be described later. The punched holes, as that term is used herein, include not only a circumferentially closed hole (such as printing holes R1 and R2 to be described later) but also a notch (such as a semicircular hole Q1 and an elongated hole Q2 to be described later) having a portion partially open to the outside.

(Side-to-Side Adjustment Unit 24)

The side-to-side adjustment unit 24 is a member for positioning a plate P along the X axis before the punching operation of the plate P by the punch unit 23. The side-to-side adjustment unit 24 is located on the rear side of the punch unit 23 (or forward of the punch unit 23 as seen in FIG. 3). The image recorder 1 is capable of mounting one or two plates P on the drum 21 at the same time. For mounting of a single-mounting plate P1, the side-to-side adjustment unit 24 performs a side-to-side adjustment operation so that the X-axis center of the plate P1 coincides with the X-axis center of the punch unit 23. For mounting of a double-mounting plate P2, the side-to-side adjustment unit 24 performs a side-to-side adjustment operation so that the X-axis center of the plate P2 coincides with the X-axis center of a movable punch unit (a first movable punch unit 102a or a second movable punch unit 102b to be described later) corresponding to the plate P2.

(Plate Feed/Discharge Unit 20)

The plate feed/discharge unit 20 is constructed such that two trays (an upper tray 41 and a lower tray 42) are fixed between a pair of side panels 43a and 43b. The plate feed/discharge unit 20 is mounted to the image recorder 1 by coupling rotary shafts 44a and 44b attached to the side panels 43a and 43b to the side panels 13a and 13b, respectively, of the image recorder 1. The plate feed/discharge unit 20 is pivoted about the rotary shafts 44a and 44b by a drive mechanism 90 to be described later (not shown in FIG. 3). In the image recorder 1, the plate feed/discharge unit 20 is pivoted about the rotary shafts 44a and 44b, thereby to achieve three angular positions to be described below.

The three angular positions are as follows: an angular position (or a plate loading position) assumed when a virgin plate P is loaded from the outside of the image recorder 1 onto the upper tray 41 of the plate feed/discharge unit 20; an angular position (or a punching position) assumed when the virgin plate P is fed from the upper tray 41 to the punch unit 23 and the side-to-side adjustment unit 24; and an angular position (or a feed/discharge position) allowing a plate P punched with holes to be fed from the upper tray 41 to the drum 21. The upper and lower trays 41 and 42 in the feed/discharge position are shown by chain-dotted lines in FIG. 3. When the plate feed/discharge unit 20 is in the plate loading position, an image-recorded plate P is moved in the −Y direction from the lower tray 42 and is transported out of the image recorder 1.

Two roller pairs (entrance roller pairs 45a and 45b) side by side along the X axis and guide panels 49a and 49b are disposed between the above-mentioned slit 9 and the plate feed/discharge unit 20 to assist in loading a plate P onto the upper tray 41.

Figure 4:
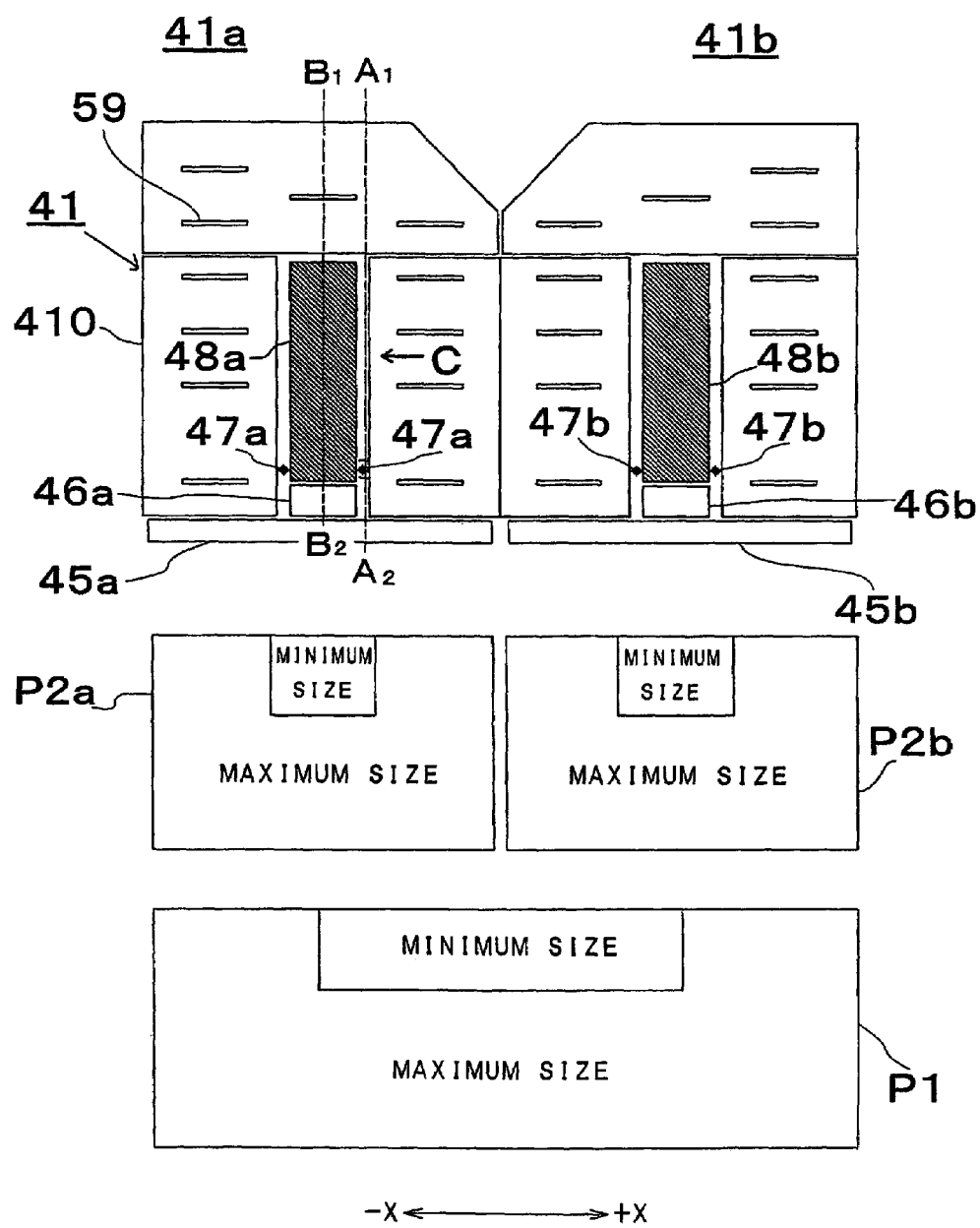
FIG. 4 is a top view of a plate feed/discharge unit.

The upper tray 41 of the plate feed/discharge unit 20 is constructed such that a plurality of components to be described later are attached to a single panel-like member (an upper tray body.410), and may be divided into two regions, i.e. a right-hand region and a left-hand region, depending on the usage thereof Specifically, as shown in FIG. 4 which is a top view of the upper tray 41, the upper tray 41 is divided into a first upper tray region 41a on the home side and a second upper tray region 41b on the away side.

The sizes of plates P loadable to the regions 41a and 41b are shown in FIG. 4 for reference. As shown in FIG. 4, each of the regions 41a and 41b can be loaded with a single one of the plates P (P2a, P2b) of various sizes ranging from a minimum size (e.g., 398 by 370 mm) to a maximum size (e.g., 1160 by 940 mm). Additionally, both of the regions 41a and 41b can be used together to be loaded with a single one of the plates P (P1) of various sizes ranging from a minimum size (e.g., 1160 by 940 mm) to a maximum size (e.g., 2382 by 1270 mm). Since the regions 41a and 41b are substantially identical in structure with each other, the first upper tray region 41a is taken as an example for description below (See FIGS. 4 and 5).

As illustrated in FIG. 4, the upper surface of the upper tray body 410, a loading transport roller pair 46a, two suction pads 47a, an entrance belt 48a, and twelve idle rollers 59 are exposed at the upper surface of the first upper tray region 41a. Each of the two suction pads 47a is moved in the upward and downward directions, as seen in FIG. 4, by a suction pad slide mechanism 54a to be described later, and is moved vertically with respect to the surface of the upper tray body 410 by a suction pad lifting mechanism 52a. The entrance belt 48a is driven by an entrance belt unit 70a to be described later in such a direction as to pull up a plate P onto the upper tray 41 and in its opposite direction.

The upper tray 41 has a length and a width large enough to receive the plate P of the maximum size for use in the image recorder 1. On the other hand, the movable range of the suction pads 47 and the entrance belt 48 is shorter than the plate P of the maximum size. However, such an arrangement can receive the full length of the plate P of the maximum size, which will be described in detail later.

Figure 5:
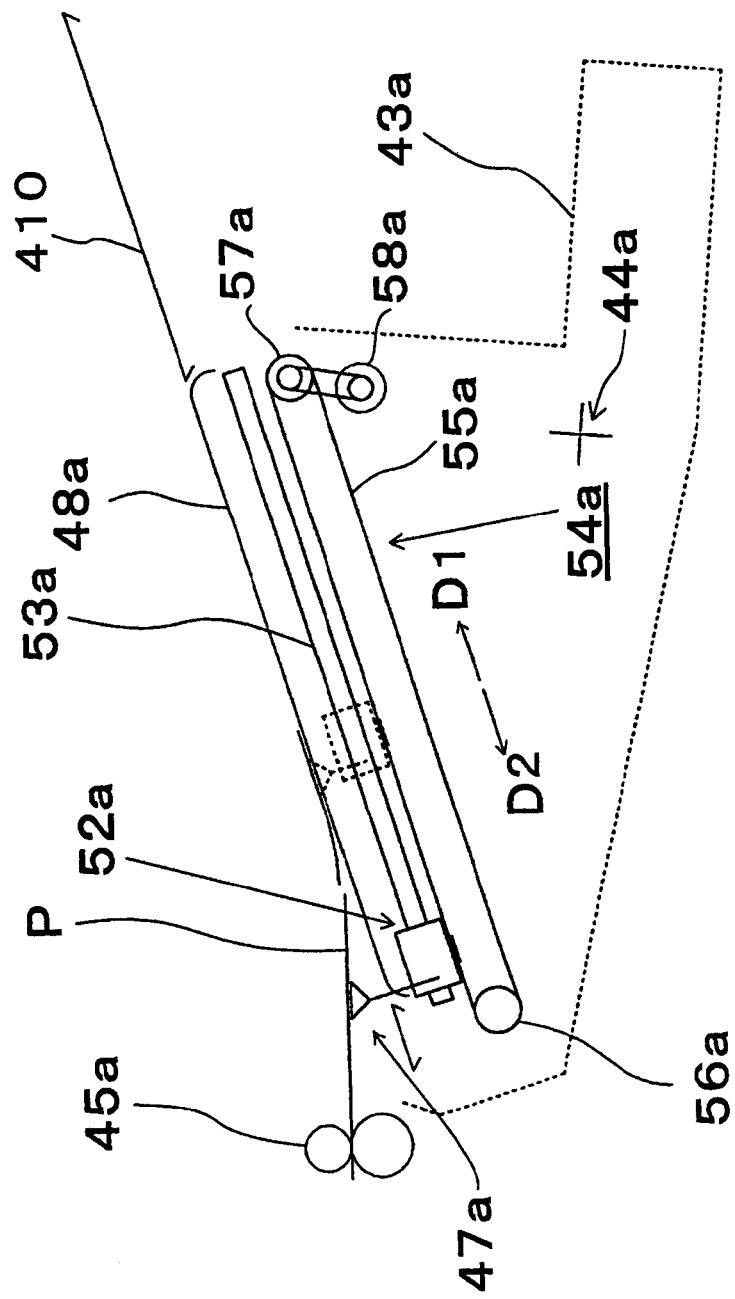
FIG. 5 is a sectional view of the plate feed/discharge unit.

FIG. 5 is a sectional view of the first upper tray region 41a taken along the dash-dot line A1-A2 of FIG. 4 as seen in the direction of the arrow C. The first upper tray region 41a includes the suction pad lifting mechanism 52a for vertically moving the suction pads 47a, and the suction pad slide mechanism 54a for reciprocally moving the suction pad lifting mechanism 52a along a guide member 53a in the directions indicated by the arrows D1 and D2.

The suction pad slide mechanism 54a includes the guide member 53a extending along the upper tray body 410, a drive belt 55a, first and second belt shafts 56a and 57a around which the drive belt 55a is looped, and a motor 58a for rotating the second belt shaft 57a. The first and second belt shafts 56a, 57a and the motor 58a are fixed to the back surface of the upper tray body 410 by a connecting means not shown.

The drive belt 55a and the suction pad lifting mechanism 52a are coupled to each other in such a manner that a lifting mechanism base 61a (to be described later) of the suction pad lifting mechanism 52a is secured to the drive belt 55a. Thus, rotation of the motor 58a of the suction pad slide mechanism 54a drives the drive belt 55a, thereby to allow the suction pad lifting mechanism 52a to move along the guide member 53a in the directions indicated by the arrows D1 and D2.

Figure 6:
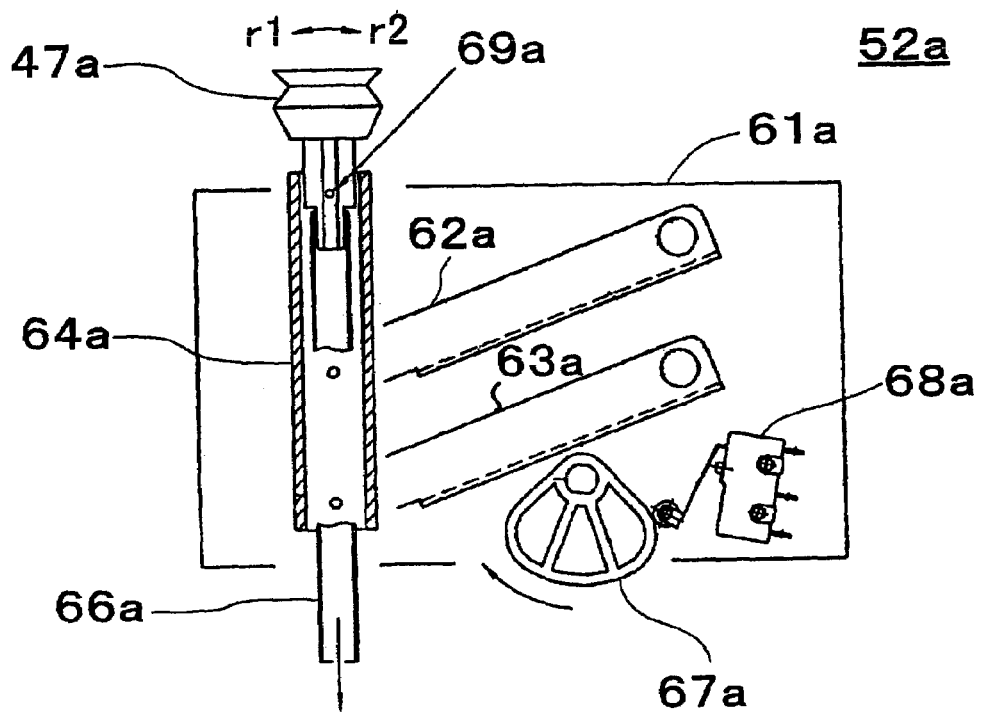
FIGS. 6 and 7 are sectional views of a suction pad lifting mechanism.

FIG. 6 is a schematic sectional view, on an enlarged scale, of the suction pad lifting mechanism 52a taken along the dash-dot line A1-A2 of FIG. 4 as seen in the direction of the arrow C. As shown in FIG. 6, the suction pad lifting mechanism 52a includes: the lifting mechanism base 61a which is a box-shaped member formed with predetermined openings in upper and lower surfaces thereof; first and second arms 62a and 63a (constituting a parallel link mechanism) each having one end rotatably supported by the inner surface of the lifting mechanism base 61a; a suction pad support pipe 64a held by the first and second arms 62a and 63a; a suction pad 47a and a suction hose 66a inserted in the suction pad support pipe 64a; a vacuum pump (not shown) coupled to the suction hose 66a; an eccentric cam 67a for pushing the second arm 63a upwardly to vertically move the suction pad 47a; a motor (not shown) for rotating the eccentric cam 67a; and a microswitch 68a for detecting the home position of the eccentric cam 67a.

The suction pad 47a is mounted to the inner surface of the suction pad support pipe 64a so as to be driven to pivot about a pin 69a in directions r1 and r2.

Figure 7:
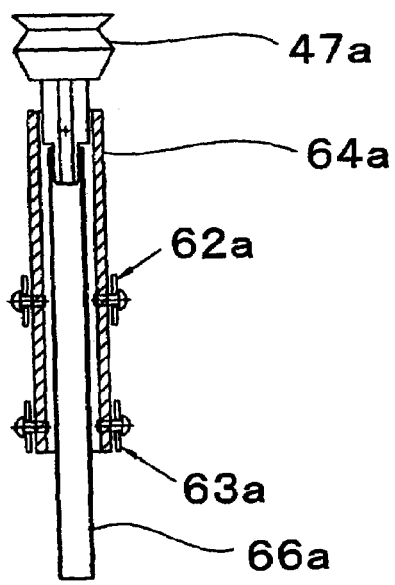

FIG. 7 is a partial sectional view of the suction pad support pipe 64a as seen from the left-hand side of FIG. 6. As shown in FIG. 7, the other end of each of the first and second arms 62a and 63a loosely grippingly holds the suction pad support pipe 64a.

Figure 8A:
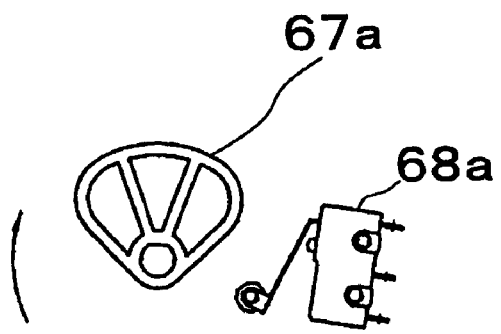
FIGS. 8A and 8B are views for illustrating the operation of an eccentric cam.
Figure 8B:
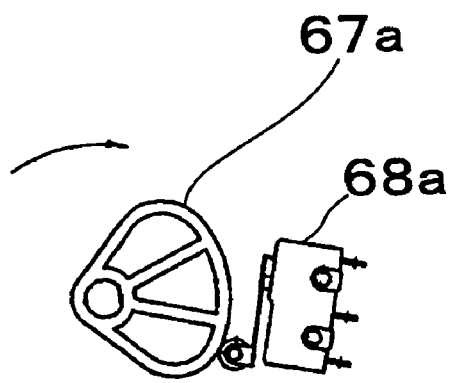

FIGS. 8A and 8B are views illustrating the detection of the home position of the eccentric cam 67a. The microswitch 68a is shown in the OFF position in FIG. 8A, and in the ON position in FIG. 8B. As illustrated in FIG. 8A, the eccentric cam 67a and the microswitch 68a are located so that a small-diameter portion of the eccentric cam 67a and a detection portion of the microswitch 68a do not make contact with each other. When a large-diameter portion of the eccentric cam 67a is oriented upward, the microswitch 68a is in the OFF position. When the eccentric cam 67a rotates, the large-diameter portion of the eccentric cam 67a presses the microswitch 68a (in a position shown in FIG. 8B). At this time, the microswitch 68a turns ON. The angular position of the eccentric cam 67a when the microswitch 68a makes an ON-to-OFF transition is defined as the home position thereof. Since the direction of rotation of the eccentric cam 67a is limited to one direction (indicated by the arrow in FIGS. 8A and 8B), the home position of the eccentric cam 67a is uniquely determined.

Figure 9A:
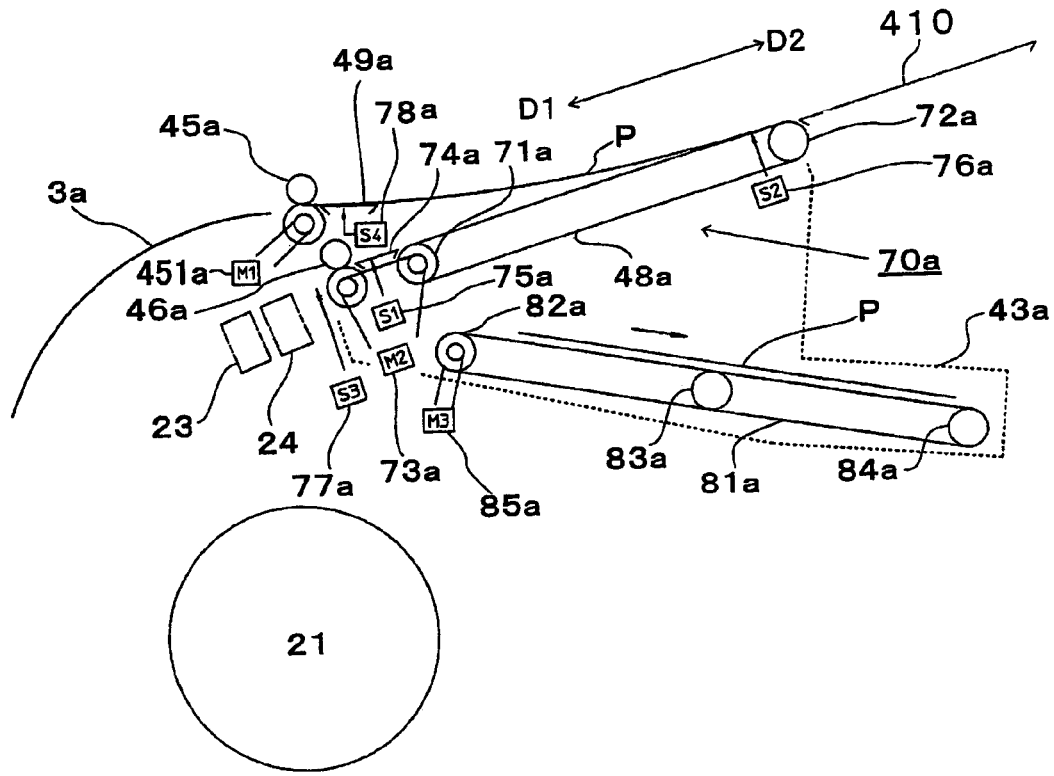
FIG. 9A is a sectional view of the plate feed/discharge unit.

FIG. 9A is a sectional view of the upper tray 41 (in the first upper tray region 41a) and the lower tray 42 taken along the dash-dot line B1-B2 of FIG. 4 as seen in the direction indicated by the arrow C.

The entrance belt unit 70a of the upper tray 41 includes: the entrance belt 48a; a driving roller 71a and a driven roller 72a around which the entrance belt 48a is looped; a pair of rollers (the loading transport roller pair 46a) disposed on the front end of the upper tray body 410 for feeding out a plate P on the upper tray 41; a motor 73a for simultaneously rotating the driving roller 71a and the loading transport roller pair 46a; a guide panel 74a disposed between the driving roller 71a and the loading transport roller pair 46a; a first sensor 75a for detecting a plate P on the guide panel 74a; a second sensor 76a for detecting a plate P near the driven roller 72a; a third sensor 77a for detecting the leading edge of a plate P in a location projecting out of the loading transport roller pair 46a; and a fourth sensor 78a for detecting a plate P on the guide panel 49a. The entrance roller pair 45a is driven by a motor 451a.

Each of the first to fourth sensors 75a, 76a, 77a, 78a is a reflective optical sensor which is in an ON state when a light beam for object detection emitted from a light emitting device is reflected from an object to return to a light receiving device. Such a sensor is in an OFF state in other cases, that is, when the light receiving device does not detect the light beam for object detection.

Figure 9B:
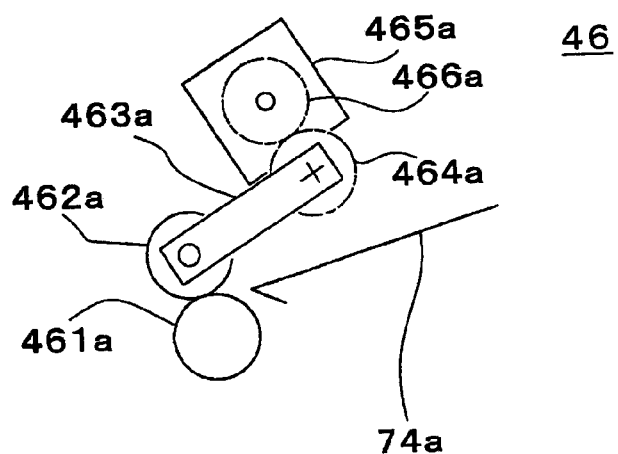
FIG. 9B is a sectional view of a loading transport roller.

FIG. 9B shows the loading transport roller pair 46a. As shown in FIG. 9B, the loading transport roller pair 46a includes a transport roller 461a rotatably driven by the motor 73a, and a nip roller 462a driven to rotate by the rotation of the transport roller 461a. The nip roller 462a is pivotably supported by a pivotal member 463a. A gear 464a is attached to the pivotal member 463a, and is in meshing engagement with a gear 466a of a motor 465a. Thus, when the motor 465a rotates, the pivotal member 463a is pivoted through the gears 464a and 466a to urge the nip roller 462a toward the transport roller 461a. This causes the transport roller 461a and the nip roller 462a to hold a plate P therebetween.

As shown in FIG. 3, discharge belts 81a and 81b are disposed in the lower tray 42. The discharge belts 81a and 81b are driven by respective drive mechanisms similar in construction to each other. The drive mechanism for the discharge belt 81a on the home side will be described as a representative example. The drive mechanism for the discharge belt 81a on the home side is shown in FIG. 9A. The discharge belt 81a is looped around three rollers 82a, 83a, 84a. A motor 85a is coupled to the shaft of the roller 82a. The rotation of the motor 85a drives the roller 82a to rotate, thereby causing the discharge belt 81a to transport a plate P placed thereon outwardly in the direction of the arrow.

(Drive Mechanism 90)

Figure 10:
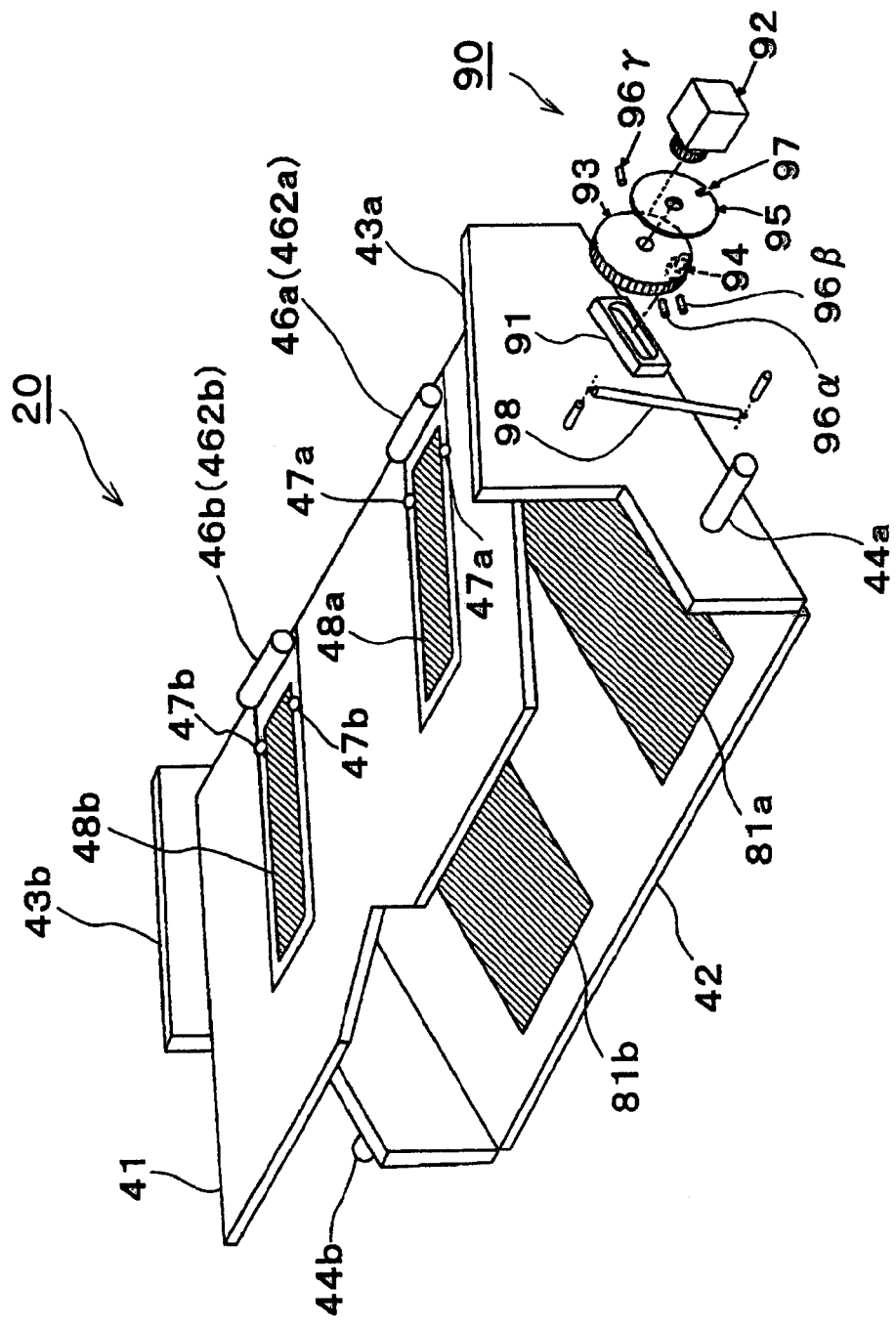
FIG. 10 is an exploded view of a drive mechanism.

FIG. 10 is a perspective view showing the plate feed/discharge unit 20 and the drive mechanism 90. The single drive mechanism 90 is disposed on each of the opposite sides of the plate feed/discharge unit 20. Although only the drive mechanism 90 on the home side is shown in FIG. 10, the similar drive mechanism 90 is also disposed on the away side.

Each of the drive mechanisms 90 includes a cam follower guide 91, a motor 92, a cam gear 93, a cam follower 94, a sensor detection panel 95, a sensor 96 α, a sensor 96β and a sensor 96γ, and has the function of pivoting the plate feed/discharge unit 20 about the rotary shafts 44a and 44b. Both of the drive mechanisms 90 on the home and away sides need not always be provided with respective sensor detection panels 95. The cam follower guide 91 has the outer shape of a rectangular parallelepiped with a through hole elongated along the Y axis. The cam follower guide 91 is secured to the side panel 43a so that the through hole thereof is opposed to the through hole of the cam follower guide 91 of the drive mechanism 90 on the away side, with the plate feed/discharge unit 20 therebetween. The motor 92 on the home side is disposed near the side panel 43a and fixed to the frame 11 so as to be opposed to the motor 92 of the drive mechanism 90 on the away side, with the plate feed/discharge unit 20 therebetween. The cam gear 93 is fixed to the frame 11 so as to be opposed to the side panel 43a. The cam gear 93 receives a driving force generated by the motor 92 to rotate about its own axis. The cam follower 94 is fixed to the outer periphery of one surface (opposed to the side panel 43a) of the cam gear 93, and makes a circular motion about the axis of the cam gear 93. The cam follower 94 has the shape of a disc with a diameter approximately equal to the vertical width of the through hole of the cam follower guide 91, and fits into the through hole as indicated by the dash-dot line of FIG. 10. Thus, the cam follower guide 91 and the cam gear 93 are coupled to each other by the cam follower 94, whereby the plate feed/discharge unit 20 is supported by the drive mechanism 90. A cylinder 98 is a member having a first end coupled to the side panel 43a of the plate feed/discharge unit 20 and a second end coupled to the frame 11 for smoothing the pivotal movement of the plate feed/discharge unit 20.

The sensor detection panel 95 which is disc-shaped is disposed concentrically with the cam gear 93, and rotates with the cam gear 93. The sensor detection panel 95 has a single slit 97 in the outer periphery thereof. The sensors 96α, 96β and 96γ are secured to the frame 11 so as to be able to detect the slit 97 formed in the sensor detection panel 95 being rotated. The use of the sensors 96α, 96β and 96γ allows the detection of the plate feed/discharge unit 20 reaching any one of the plate loading position, the punching position, and the feed/discharge position.

(Details of Punch Unit 23)

Figure 11:
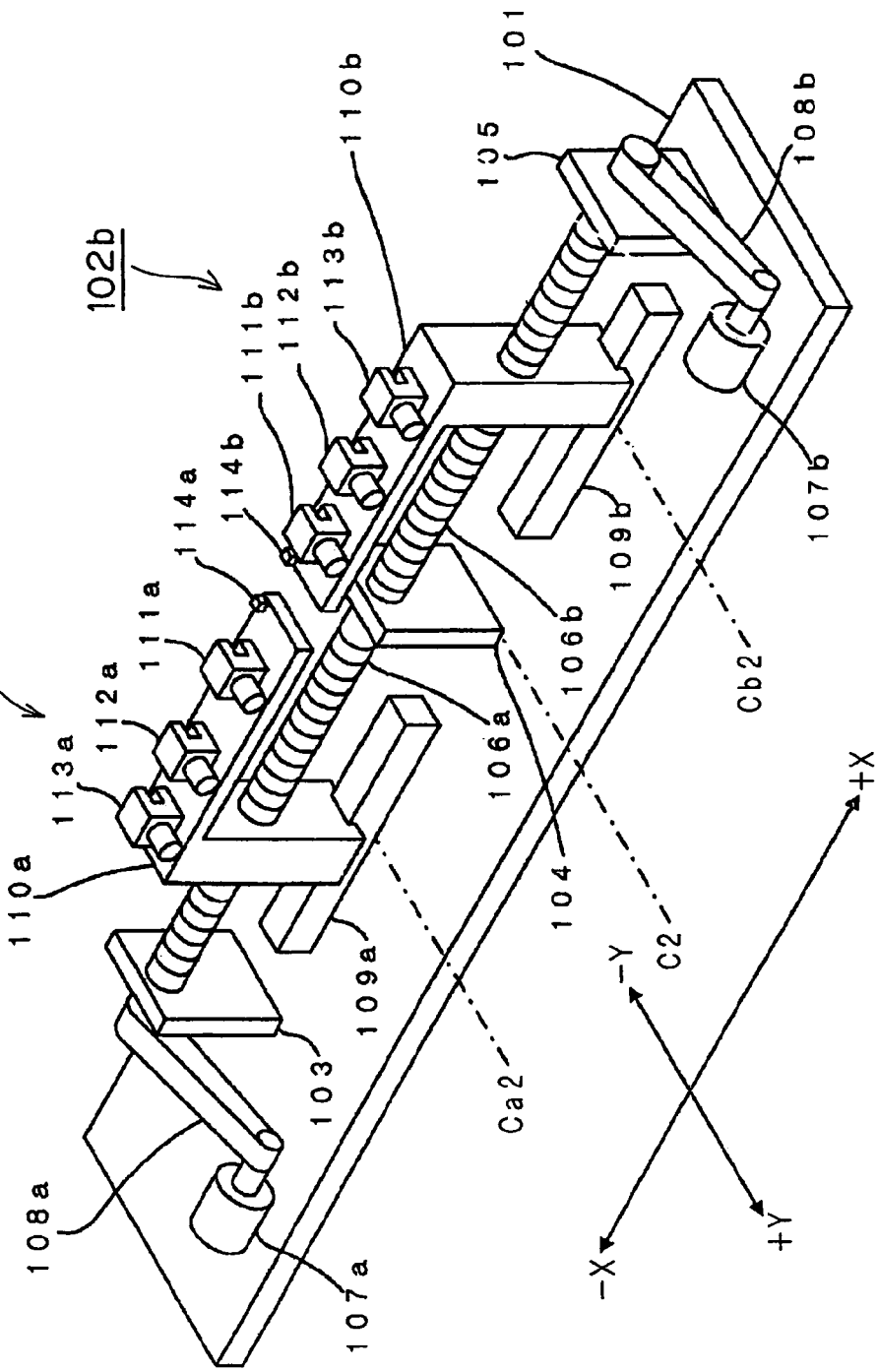
FIG. 11 is a perspective view of a punch unit.

FIG. 11 is a perspective view of the punch unit 23 as seen from the front side of the image recorder 1. The punch unit 23 generally comprises a horizontal panel 101 provided between the side panels 13a and 13b of the image recorder 1, and a pair of movable punch units (a first movable punch unit 102a and a second movable punch unit 102b) disposed on the horizontal panel 101.

The first movable punch unit 102a includes: holding panels 103 and 104; a feed screw 106a rotatably held between the holding panels 103 and 104; a motor 107a and a belt 108a for rotating the feed screw 106a; a rail 109a; a movable table 110a disposed slidably on the rail 109a and in threaded engagement with the feed screw 106a; punchers 111a, 112a and 113a placed on the movable table 110a; and a plate detection sensor 114a. The first movable punch unit 102a rotates the feed screw 106a by using the motor 107a and the belt 108a to move the movable table 110a and the punchers 111a, 112a and 113a placed on the movable table 110a along the rail 109a, thereby adjusting the locations of the movable table 110a and the punchers 111a, 112a and 113a along the X axis.

The second movable punch unit 102b includes: a holding panel 105; a movable table 110b; punchers 111b, 112b and 113b; and a plate detection sensor 114b. The locations of the movable table 110b and the punchers 111b, 112b and 113b placed on the movable table 110b are adjusted along the X axis by a mechanism similar to that of the first movable punch unit 102a. Specifically, the second movable punch unit 102b rotates a feed screw 106b by using a motor 107b and a belt 108b to move the movable table 110b and the punchers 111b, 112b and 113b placed on the movable table 110b along a rail 109b, thereby adjusting the locations of the movable table 110b and the punchers 111b, 112b and 113b along the X axis.

In the punch unit 23, the movement of the two movable tables 110a and 110b is controlled with reference to three X-axis positions. Specifically, for punching a single-mounting plate P1, the motors 107a and 107b of the first and second movable punch units 102a and 102b are controlled with reference to a reference line C2 lying at the X-axis central position of the punch unit 23. For punching a double-mounting plate P2a mounted in the first plate mounting region 27a, the motors 107a and 107b are controlled with reference to a reference line Ca2 lying at the X-axis central position of the first movable punch unit 102a. For punching a double-mounting plate P2b mounted in the second plate mounting region 27b, the motors 107a and 107b are controlled with reference to a reference line Cb2 lying at the X-axis central position of the second movable punch unit 102b.

It is desirable that the punch unit 23 is assembled so that the reference lines C2, Ca2 and Cb2 coincide with the X-axis centers (centerlines C1, Ca1 and Cb1) of the drum 21, the first plate mounting region 27a and the second plate mounting region 27b, respectively. Such an arrangement allows the above-mentioned punched hole for positioning to be brought into engagement or into loose engagement with a positioning pin on the drum 21 only by feeding out a plate P intactly straight toward the drum 21 after the plate P punched with the hole for positioning is returned to the plate feed/discharge unit 20. This facilitates the positioning of the plate P on the drum 21.

If each reference position along the X axis on the punch unit 23 does not coincide with the centerline of the drum 21 or the like, there arises a need to move the plate P along the X axis after the punch process of the plate P and before the feed out of the plate P toward the drum 21.

In the image recorder 1 according to this preferred embodiment, holes are punched in the plate P before image recording. The punched holes are classified into three types: a punched hole (referred to as a positioning hole) for use in determining the position of the plate P with respect to the drum 21 of the image recorder 1; a punched hole (referred to as an escape hole) formed to prevent the leading edge of the plate P from contacting the positioning pins provided upright on the drum 21; and a punched hole (referred to as a printing hole) for use in positioning the image-recorded plate P on a plate cylinder and the like of a printing apparatus.

The punchers 111a of the first movable punch unit 102a and the puncher 111b of the second movable punch unit 102b are punchers for selectively forming the positioning hole or the escape hole.

FIG. 12 is a perspective view showing principal parts of the puncher 111b. As shown in FIG. 12, the puncher 111b comprises a main body 120b having a through hole 122b formed therein for receiving a round punch 121b moving up and down. The through hole 122b extends from the upper surface of the main body 120b through the main body 120b. The round punch 121b has a perfectly circular sectional configuration. The round punch 121b is used for purposes of punching the positioning hole or escape hole in the leading edge of the plate P. The main body 120b further has a clearance 123b for guiding the plate P. The main body 120b has a function as a guide member.

The main body 120b further has a through hole 125b formed therein for receiving an elongated punch 124b moving up and down. The through hole 125b extends from the upper surface of the main body 120b through the main body 120b. The elongated punch 124b has an elongated sectional configuration such that a dimension thereof along the Y axis is equal to the diameter of the section of the round punch 121b, and a dimension thereof along the X axis is not less than the diameter of the section of the round punch 121b. The elongated punch 124b is mainly used for purposes of punching the escape hole in the leading edge of the plate P, but is sometimes used to punch the positioning hole, which will be described in detail later.

A reference pin 126b is attached to the forward end of the elongated punch 124b. The reference pin 126b moves up and down together with the elongated punch 124b. The reference pin 126b has a perfectly circular sectional configuration with a diameter which is one-half the diameter of the section of the round punch 121b. The reference pin 126b is a member for positioning the plate P inserted into the clearance 123b along the Y axis.

Since the through hole 125b is formed in a flat surface 127b defined by the clearance 123b, the reference pin 126b can escape to below the flat surface 127b when the elongated punch 124b moves down. Punching chips resulting from the punching by the round punch 121b and the elongated punch 124b fall through the through holes 122b and 125b out of the lower surface of the main body 120b, and are collected by an additionally prepared collecting mechanism not shown.

The round punch 121b, the elongated punch 124b and the reference pin 126b are positioned along the Y axis so that the outermost edges thereof as seen in the +Y direction (or on the front side) are aligned. Specifically, the round punch 121b, the elongated punch 124b and the reference pin 126b are disposed so that a line connecting the outermost edges thereof as seen in the +Y direction is parallel to the X axis. A point at which the reference pin 126b contacts the plate P may be deviated in the −Y direction from the above-mentioned location. In other words, the reference pin 126b may come into contact with the plate P in a location displaced in the −Y direction.

The round punch 121b and the elongated punch 124b may be vertically moved individually by a drive mechanism not shown. Alternatively, the round punch 121b and the elongated punch 124b may be vertically moved in operative association with each other in accordance with a predetermined vertical movement cycle. For example, a drive mechanism may be used which repeats the following vertical movement cycle: (1) The round punch 121b and the elongated punch 124b are initially in their raised position; (2) Next, only the round punch 121b is moved up and down; (3) Next, only the elongated punch 124b is moved up and down; (4) Finally, both of the round punch 121b and the elongated punch 124b are moved down.

The round punch 121b performs the operation of punching a hole in a manner to be described below. First, the elongated punch 124b is moved down until the tip of the reference pin 126b reaches the level of the flat surface 127b. In this state, a plate P is inserted into the clearance 123b, and is brought into contact with the reference pin 126b. This achieves the positioning of the plate P along the Y axis with respect to the puncher 111b. Since the diameter of the reference pin 126b is one-half the diameter of the round punch 121b, the plate P is positioned so that the leading edge of the plate P coincides with the line of the diameter of the round punch 121b along the X axis. In this state, when the round punch 121b is moved down, a semicircular hole is punched in the leading edge of the plate P. This punched hole is used as a positioning or escape hole. The positioning of the plate P along the X axis is determined by the processing of the side-to-side adjustment unit 24 to be described later.

The elongated punch 124b punches an elongated hole extending along the X axis in the plate P. This elongated hole is used as a positioning or escape hole.

For the formation of the elongated positioning hole, the plate P is inserted into the clearance 123b, with the reference pin 126b previously moved down, and the leading edge of the plate P is positioned using the reference pin 126b, following which the elongated punch 124b is further moved downwardly. After the plate P is positioned using the reference pin 126b, the elongated punch 124b is sometimes moved to another position and then moved downwardly to punch the elongated escape hole, which will be described in detail later.

The puncher 111a of the first movable punch unit 102a has a round punch 121a and an elongated punch 124a similar in construction to the round punch 121b and the elongated punch 124b of the puncher 111b of the second movable punch unit 102b. However, the round punch 121a and the elongated punch 124a are arranged in the reverse order, along the X axis, to the round punch 121b and the elongated punch 124b of the puncher 111b. In other words, the round punch 121a is spaced in the −X direction from the elongated punch 124a in the puncher 111a.

The puncher 112a (112b) of the first (second) movable punch unit 102a (102b) is a puncher for punching an elongated hole. This elongated hole is used as a positioning or escape hole.

FIG. 13 is a perspective view showing principal parts of the puncher 112a. As shown in FIG. 13, the puncher 112a comprises a main body 130a having a through hole 135a formed therein for receiving an elongated punch 134a moving up and down. The through hole 135a extends from the upper surface of the main body 130a through the main body 130a. A reference pin 136a is attached to the forward end of the elongated punch 134a. The reference pin 136a moves up and down together with the elongated punch 134a. Since the through hole 135a is formed in a flat surface 137a defined by a clearance 133a, the reference pin 136a can escape to below the flat surface 137a when the elongated punch 134a moves down. Further, since the through hole 135a is formed in the flat surface 137a as described above, punching chips resulting from the punching by the elongated punch 134a fall through the through hole 135a out of the lower surface of the main body 130a, and are collected by an additionally prepared collecting mechanism not shown.

The elongated punch 134a is mainly used for purposes of punching the escape hole in the leading edge of the plate P fed on the front side, but is sometimes used to punch the positioning hole.

The usage of the elongated punch 134a is similar to that of the elongated punch 124b of the puncher 111b described above. For the formation of the positioning hole, the reference pin 136a is previously moved down so as to allow for the positioning of the leading edge of the plate P inserted into the clearance 133a. For the formation of the escape hole, on the other hand, the positioning of the plate P along the y axis may be performed in another location by the reference pin 136a.

The elongated punch 134a and the reference pin 136a are positioned along the Y axis so that the outermost edges thereof as seen in the +Y direction (or on the front side) are aligned. Specifically, the elongated punch 134a and the reference pin 136a are disposed so that a line connecting the outermost edges thereof as seen in the +Y direction is parallel to the X axis.

The reference pin 136a has a perfectly circular sectional configuration with a diameter which is one-half the diameter of the section of the round punch 121a (121b).

As in the above-mentioned puncher 111a (111b), the elongated punch 134a is vertically moved by a drive mechanism not shown. The adjustment of the vertical position of the elongated punch 134a allows the elongated punch 134a to move fully downwardly, and allows the reference pin 136a to be situated in the clearance 133a for positioning of the plate P along the Y axis.

Since the puncher 112b of the second movable punch unit 102b is similar in construction to the puncher 112a of the first movable punch unit 102a, the puncher 112b will not be described in detail.

The reference pins 126a, 126b and the reference pins 136a, 136b are situated so that a line connecting the points at which the reference pins 126a, 126b, 136a, 136b make contact with the leading edge of the plate P (corresponding to the outermost edges of the reference pins 126a, 126b, 136a, 136b as seen in the −Y direction (or on the rear side)) is parallel to the axis of rotation of the drum 21 (or parallel to the X axis). Thus, the position of the plate P along the Y axis is determined by contact of the plate P with at least two of the reference pins 126a, 126b, 136a, 136b. The plate detection sensors 114a and 114b are situated so as to be able to detect the leading edge of the plate P at a location displaced by a small distance (e.g., 5 to 15 mm) in the −Y direction from the line connecting the outermost edges of the reference pins 126a, 126b, 136a, 136b as seen in the −Y direction.

The puncher 113a of the first movable punch unit 102a and the puncher 113b of the second movable punch unit 102b are punchers for punching printing holes. It should be noted that two or more punchers may be used to punch the printing holes. The punchers 113a and 113b may be disposed at different locations than those shown in FIG. 11. The printing holes may be of a variety of configurations such as a round configuration, an elongated configuration, an U-shaped configuration, and a V-shaped configuration. The punchers 113a and 113b of the image recorder 1 have punches 138a and 138b for punching round holes.

As discussed above, the plates P of a variety of sizes are mounted to the image recorder 1. It is hence necessary to punch holes in the plate P having different sizes in various locations depending on the sizes. The image recorder 1 according to this preferred embodiment, which can adjust the locations of the punchers 111a, 111b, 112a, 112b, 113a, 113b along the X axis as described above, is required only to comprise a minimum number of punchers.

(Details of Side-to-Side Adjustment Unit 24)

Figure 14:
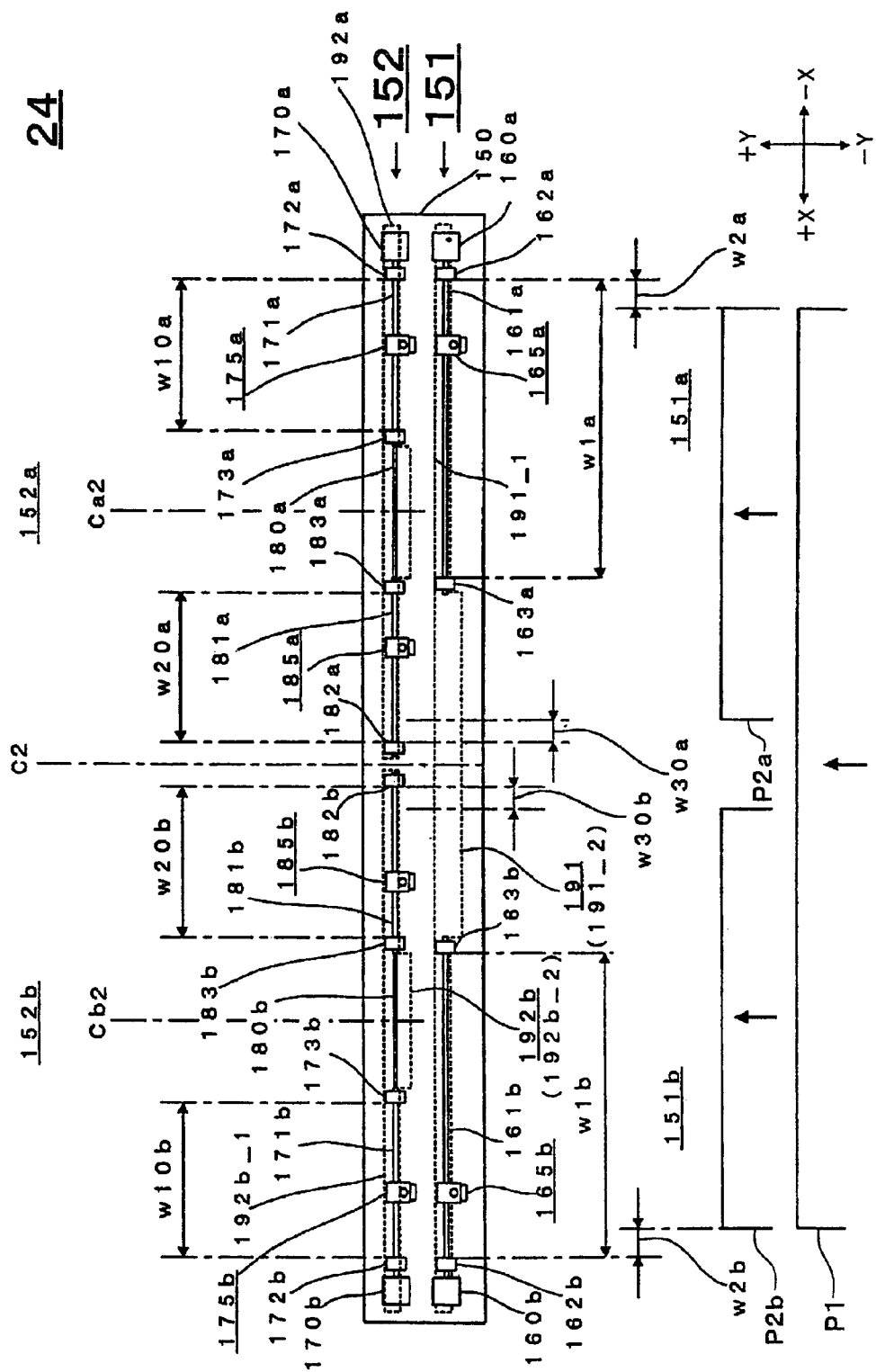
FIG. 14 is a top view of a side-to-side adjustment unit.

FIG. 14 is a plan view of the side-to-side adjustment unit 24. The reference line C2 indicates the X-axis central position of the punch unit 23; the reference line Ca2 indicates the X-axis central position of the first movable punch unit 102a; and the reference line Cb2 indicates the X-axis central position of the second movable punch unit 102b. A single-mounting plate P1 and double-mounting plates P2a and P2b to be positioned in the side-to-side adjustment unit 24 are also shown for reference, in addition to the plan view of the side-to-side adjustment unit 24. The plates P1, P2a and P2b shown in FIG. 14 are plates of the maximum size adaptable for the image recorder 1.

The side-to-side adjustment unit 24 comprises a base 150 provided between the side panels 13a and 13b of the image recorder 1, and a single-plate side-to-side adjustment unit 151 and a double-plate side-to-side adjustment unit 152 both placed on the base 150.

Figure 16:
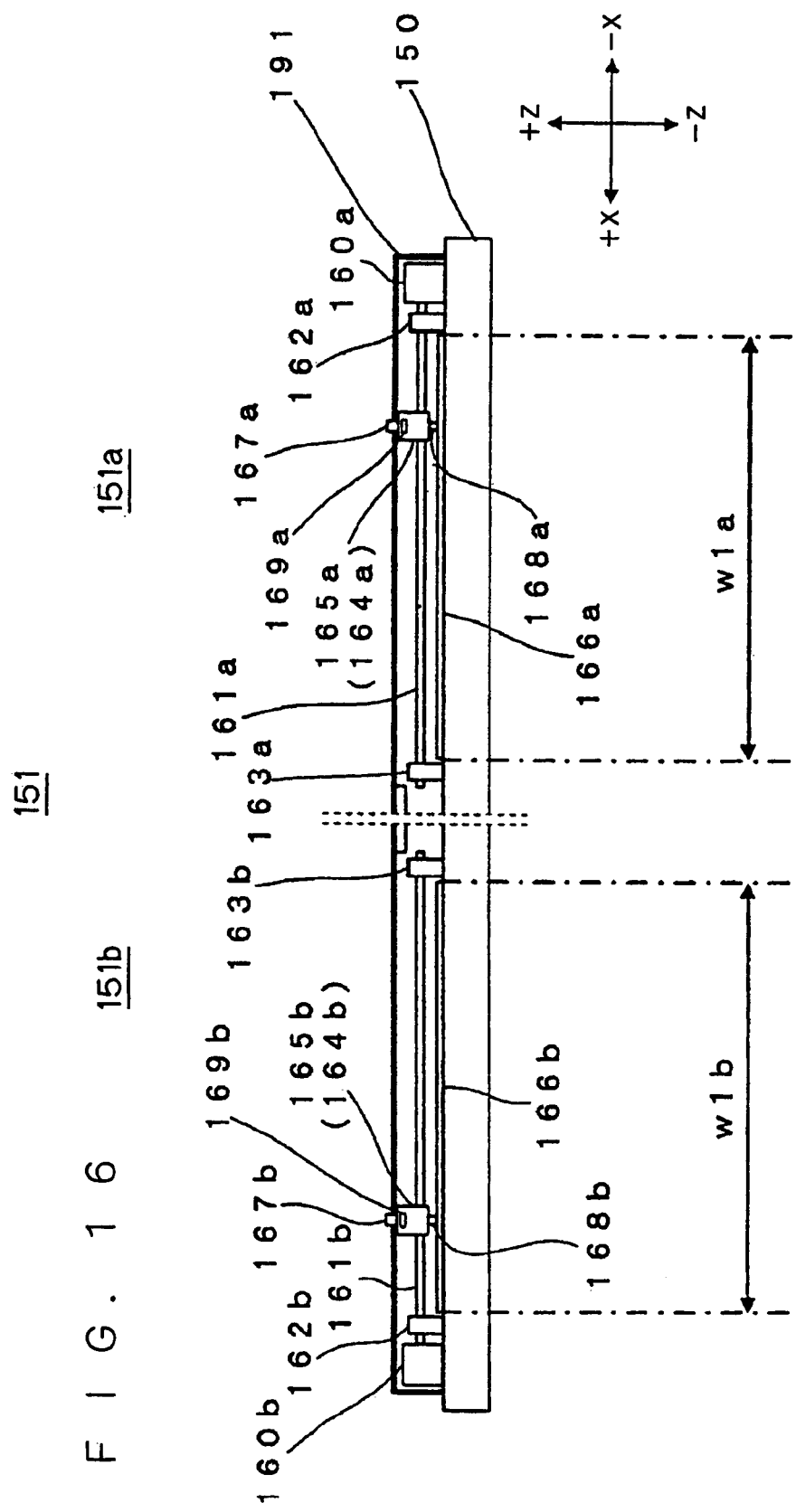
FIG. 16 is a front view of a single-plate side-to-side adjustment unit.

The details of the single-plate side-to-side adjustment unit 151 will be described with reference to FIGS. 14 and 16. FIG. 16 is a view of the single-plate side-to-side adjustment unit 151 as viewed from the rear side of the image recorder 1. A central portion of the single-plate side-to-side adjustment unit 151 is not shown in FIG. 16.

The single-plate side-to-side adjustment unit 151 includes a right-hand roller moving section 151a for pressing the home-side edge of the single-mounting plate P1 in the +X direction, a left-hand roller moving section 151b for pressing the away-side edge of the plate P1 in the −X direction, and a large guide 191 for guiding the plate P1 to a level (vertical position) high enough for the plate P1 to make contact with side-to-side adjustment rollers 167a and 167b of the respective right-hand and left-hand roller moving sections 151a and 151b.

The right-hand roller moving section 151a includes: a motor 160a fixed on the base 150; a ball screw 161a coupled to the driving shaft of the motor 160a; bearings 162a and 163a for rotatably supporting the ball screw 161a; a right-hand nut portion 165a having a nut body 164a in threaded engagement with the ball screw 161a; and a support rail 166a for preventing the right-hand nut portion 165a from rotating about the ball screw 161a.

The motor 160a is preferably a stepping motor. A sensor for detecting the location of the right-hand nut portion 165a is disposed near the bearing 162a. The electrical unit 25 generates a control signal, based on the location of the right-hand nut portion 165a outputted from the sensor to apply the control signal to the motor 160a, thereby precisely moving the right-hand nut portion 165a along the X axis.

The side-to-side adjustment roller 167a is rotatably attached to the upper surface of the nut body 164a of the right-hand nut portion 165a. A slider 168a moving in the support rail 166a is attached to the lower surface of the nut body 164a. A plate edge detection sensor 169a is attached to the front surface of the nut body 164a. A relationship between the support rail 166a and the slider 168a will be described in detail later.

Since the left-hand roller moving section 151b has the same mechanism as the right-hand roller moving section 151a, components of the left-hand roller moving section 151b are identified by similar reference numerals to, the corresponding components of the right-hand roller moving section 151a except that a character "b" substituted for "a" is added, and will not be described in detail.

The motors 160a and 160b of the right-hand and left-hand roller moving sections 151a and 151b are integrally controlled so that a distance along the X axis (referred to hereinafter as an X-distance) between the side-to-side adjustment roller 167a and the reference line C2 is always equal to an X-distance between the side-to-side adjustment roller 167b and the reference line C2. It is desirable that the reference line C2 of the punch unit 23 coincides with the X-axis centerline of the drum 21, as discussed above. The movable range of the right-hand nut portion 165a is indicated by w1a in FIGS. 14 and 16. Specifically the right-hand nut portion 165a is movable within the range of the support rail 166a. Similarly, the left-hand nut portion 165b is movable within the range of the support rail 166b, and the movable range is indicated by w1b.

As shown in FIG. 14, the home positions (or the outermost movable positions in the side-to-side adjustment unit 24) of the respective right-hand and left-hand nut portions 165a and 165b are out of the paths of movement of the double-mounting plates P2a and P2b. In other words, retractable distances w2a and w2b are greater than the dimensions of the right-hand and left-hand nut portions 165a and 165b along the X axis. Thus, when the double-mounting plate P2a or P2b is mounted to the side-to-side adjustment unit 24, retracting the right-hand and left-hand nut portions 165a and 165b in their home positions prevents the right-hand and left-hand nut portions 165a and 165b from contacting the plate P2a or P2b.

(Double-Plate Side-to-Side Adjustment Unit 152)

Figure 17:
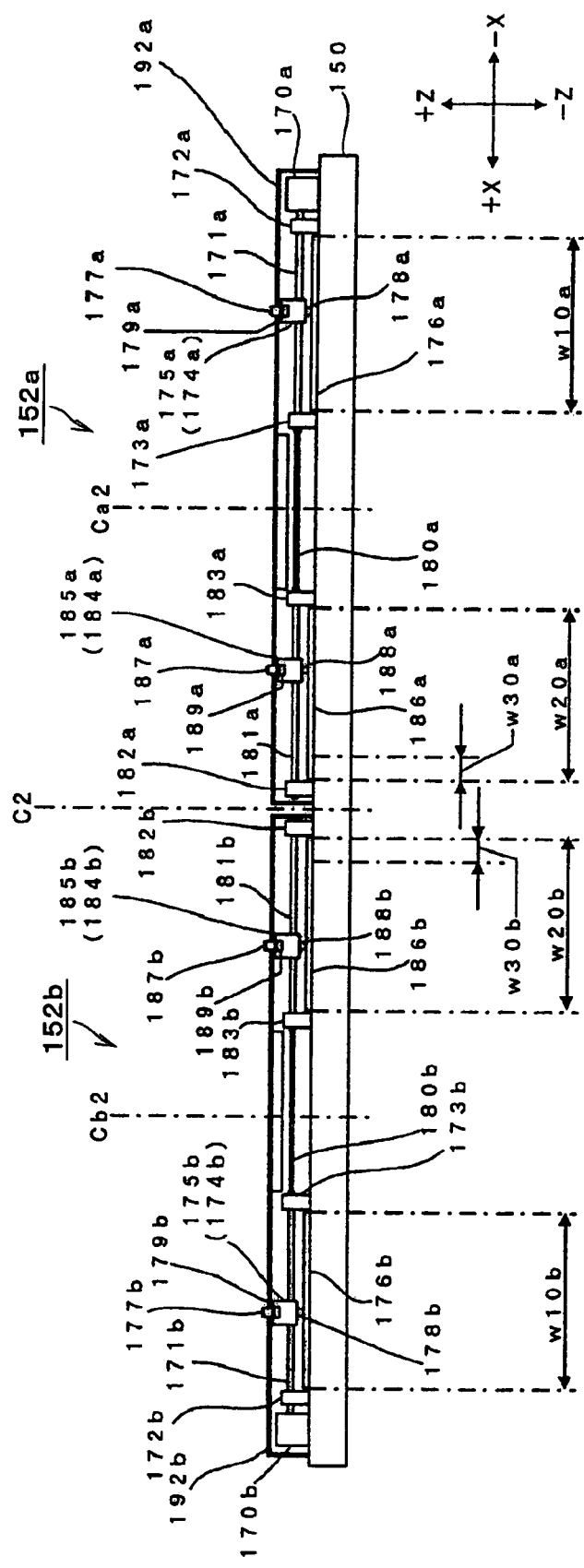
FIG. 17 is a front view of a double-plate side-to-side adjustment unit.

Next, the double-plate side-to-side adjustment unit 152 will be described with reference to FIGS. 14 and 17. FIG. 17 is a view of the double-plate side-to-side adjustment unit 152 as viewed from the rear side of the image recorder 1.

The double-plate side-to-side adjustment unit 152 includes a first side-to-side adjustment section 152a for centering the double-mounting plate P2a to be mounted in the first plate mounting region 27a of the drum 21, and a second side-to-side adjustment section 152b for centering the double-mounting plate P2b to be mounted in the second plate mounting region 27b.

The first side-to-side adjustment section 152a includes: a motor 170a fixed on the base 150; an outer ball screw 171a coupled to the driving shaft of the motor 170a; bearings 172a and 173a for rotatably supporting the outer ball screw 171a; an outer nut portion 175a having a nut body 174a in threaded engagement with the outer ball screw 171a; an outer support rail 176a for preventing the outer nut portion 175a from rotating about the outer ball screw 171a; a coupling shaft 180a coupled to an end of the outer, ball screw 171a which is closer to the bearing 173a; an inner ball screw 181a coupled to the outer ball screw 171a through the coupling shaft 180a; bearings 182a and 183a for rotatably supporting the inner ball screw 181a; an inner nut portion 185a having a nut body 184a in threaded engagement with the inner ball screw 181a; an inner support rail 186a for preventing the inner nut portion 185a from rotating about the inner ball screw 181a; and a small guide 192a.

The threaded direction of the inner ball screw 181a is opposite from that of the outer ball screw 171a. Thus, the outer and inner nut portions 175a and 185a in threaded engagement with the respective ball screws 171a and 181a are moved toward or away from each other by the motor 170a. Adjustment is made so that a distance between the outer nut portion 175a and the reference line Ca2 is always equal to a distance between the inner nut portion 185a and the reference line Ca2. It is desirable that the reference line Ca2 which is the X-axis central position of the first movable punch unit 102a coincides with the X-axis centerline Ca1 of the first plate mounting region 27a, as discussed above.

The motor 170a is preferably a stepping motor. A sensor for detecting the location of the outer nut portion 175a is disposed near the bearing 172a. The electrical unit 25 generates a control signal, based on the location of the outer nut portion 175a outputted from the sensor to apply the control signal to the motor 170a, thereby precisely moving the outer and inner nut portions 175a and 185a along the X axis.

The movable range of the outer nut portion 175a is indicated by w10a in FIGS. 14 and 17. Specifically, the outer nut portion 175a is movable within the range of the outer support rail 176a. Similarly, the inner nut portion 185a is movable within the range of the inner support rail 186a, and the movable range is indicated by w20a in FIGS. 14 and 17.

Side-to-side adjustment rollers 177a and 187a are rotatably attached to the upper surfaces of the nut bodies 174a and 184a of the outer and inner nut portions 175a and 185a, respectively. Sliders 178a and 188a moving in the support rails 176a and 186a are attached to the lower surfaces of the nut bodies 174a and 184a, respectively. Plate edge detection sensors 179a and 189a are attached to the front surfaces of the nut bodies 174a and 184a, respectively. Relationships between the support rails 176a, 186a and the sliders 178a, 188a will be described in detail later.

Since the second side-to-side adjustment section 152b has the same mechanism as the first side-to-side adjustment section 152a, components of the second side-to-side adjustment section 152b are identified by similar reference numerals to the corresponding components of the first side-to-side adjustment section 152a except that a character "b" substituted for "a" is added, and will not be described in detail. The center of movement of the outer and inner nut portions 175b and 185b of the second side-to-side adjustment section 152b along the X axis is the reference line Cb2 (the dash-dot line Cb2 in FIGS. 14 and 17) which is the X-axis central position of the second movable punch unit 102b. It is desirable that the reference line Cb2 coincides with the X-axis centerline Cb1 of the second plate mounting region 27b, as discussed above.

As shown in FIG. 14, the movable ranges w20a and w20b of the inner nut portions 185a and 185b overlap the path of movement of the single-mounting plate P1. There is a danger that the inner nut portions 185a and 185b make contact with the single-mounting plate P1 to hinder the movement of the plate P1. To prevent this, the side-to-side adjustment unit 24 is constructed so that the inner nut portions 185a and 185b pivot about the ball screws 181a and 181b within ranges w30a and w30b (see FIGS. 14 and 17), respectively, to go out of the path of movement of the single-mounting plate P1.

Figure 15:
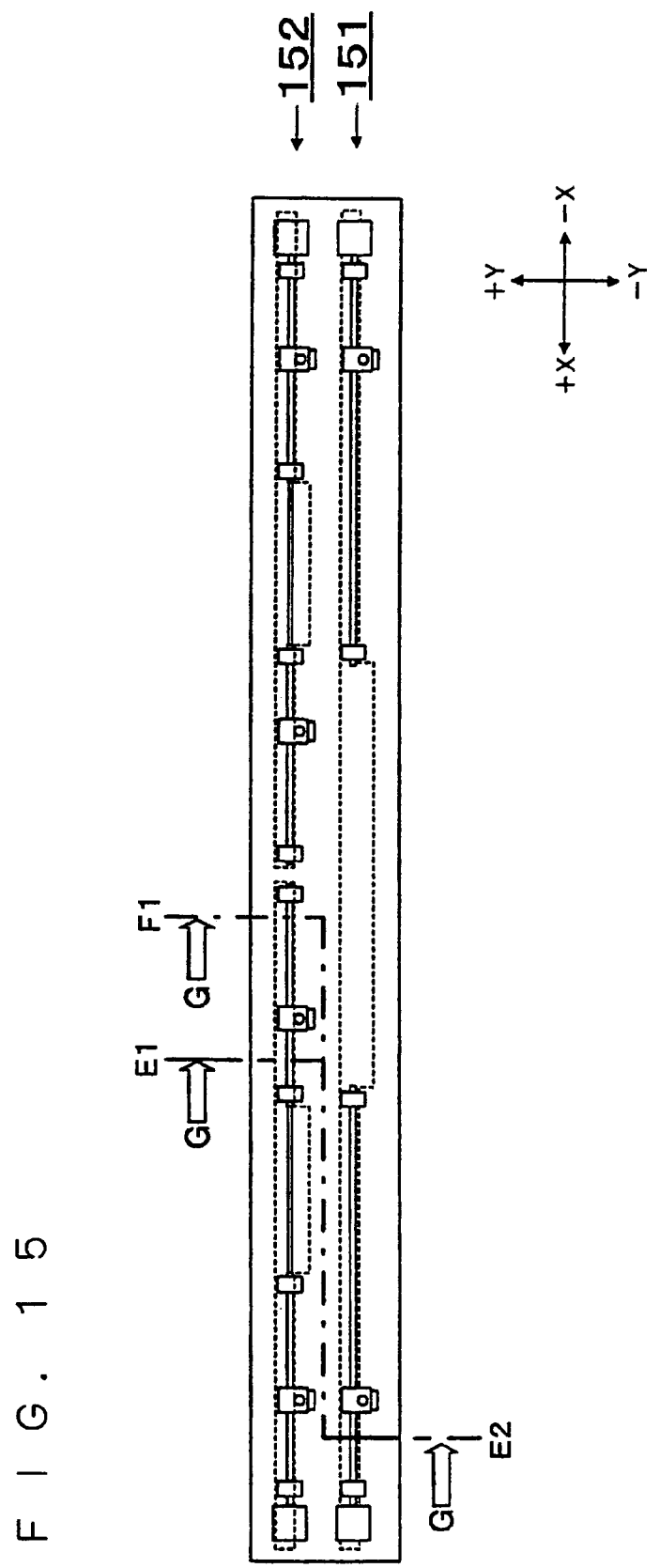
FIG. 15 is a top view illustrating sectional positions of the side-to-side adjustment unit.

A construction for achieving this will be described with reference to FIGS. 15, 18 and 19. FIG. 15 is a view showing sectional positions of the side-to-side adjustment unit 24.

FIG. 18 is a sectional view of the base 150, the single-plate side-to-side adjustment unit 151 and the double-plate side-to-side adjustment unit 152 taken along the lines E1-E2 of FIG. 15 as seen in the direction of the arrow G. FIG. 19 is a sectional view of the base 150, the single-plate side-to-side adjustment unit 151 and the double-plate side-to-side adjustment unit 152 taken along the lines F1-E2 of FIG. 15 as seen in the direction of the arrow G;

The slider 168b of the left-hand nut portion 165b of the single-plate side-to-side adjustment unit 151 is a bearing supported rotatably (about an axis parallel to the Z axis) by the nut body 164b, and moves along the X axis (or in a direction perpendicular to the plane of FIG. 18) while rotating in the support rail 166b. The ball screw 161b rotates in a clockwise direction as seen in FIG. 18 to produce a driving force for the nut body 164b. Since the side surfaces of the support rail 166b restrict the rotation of the slider 168b about the ball screw 161b, the nut body 164b does not rotate in operative association with the rotation of the ball screw 161b.

The large guide 191 is provided over the left-hand nut portion 165b. As illustrated in FIGS. 14 and 18, the large guide 191 has a main body portion 191_1, and a protruding portion 191_2 projecting in the −Y direction. The level (or vertical position) at which the main body portion 191_1 is provided is substantially the same as that of the lower end of the side-to-side adjustment roller 167b of the left-hand nut portion 165b. It is apparent from FIG. 18 that the protruding portion 191_2 is bent downwardly from the main body portion 191_1. The lower end of the protruding portion 191_2 is adjusted so as to lie under the side-to-side adjustment roller 167b, and is capable of raising the plate P to a level high enough for the plate P to make contact with the side-to-side adjustment roller 167b to guide the plate P to the main body portion 191_1.

The plate edge detection sensor 169b is attached to the rear side of the nut body 164b. The plate edge detection sensor 169b detects the plate P coming onto the large guide 191.

The slider 188b of the inner nut portion 185b of the double-plate side-to-side adjustment unit 152 is a bearing supported rotatably (about an axis parallel to the Z axis) by the nut body 184b, and moves along the X axis (or in a direction perpendicular to the plane of FIG. 18) while rotating in the inner support rail 186b. The inner ball screw 181b rotates in a clockwise direction as seen in FIG. 18 to produce a driving force for the nut body 184b. Since the side surfaces of the inner support rail 186b restrict the rotation of the slider 188b about the inner ball screw 181b, the nut body 184b does not rotate in operative association with the rotation of the ball screw 181b.

The small guide 192b is provided over the inner nut portion 185b. As illustrated in FIGS. 14 and 18, the small guide 192b has a main body portion 192b_1, and a protruding portion 192b_2 projecting in the −Y direction. The level (or vertical position) at which the main body portion 192b_1 is provided is substantially the same as that of the lower end of the side-to-side adjustment roller 187b of the inner nut portion 185b. It is apparent from FIG. 18 that the protruding portion 192b_2 is bent downwardly from the main body portion 192b_1. The lower end of the protruding portion 192b_2 is adjusted so as to lie under the side-to-side adjustment roller 187b.

The plate edge detection sensor 189b is attached to the rear side of the nut body 184b. The plate edge detection sensor 189b detects that the plate P passed over the large guide 191 comes onto the small guide 192b.

Figure 19:
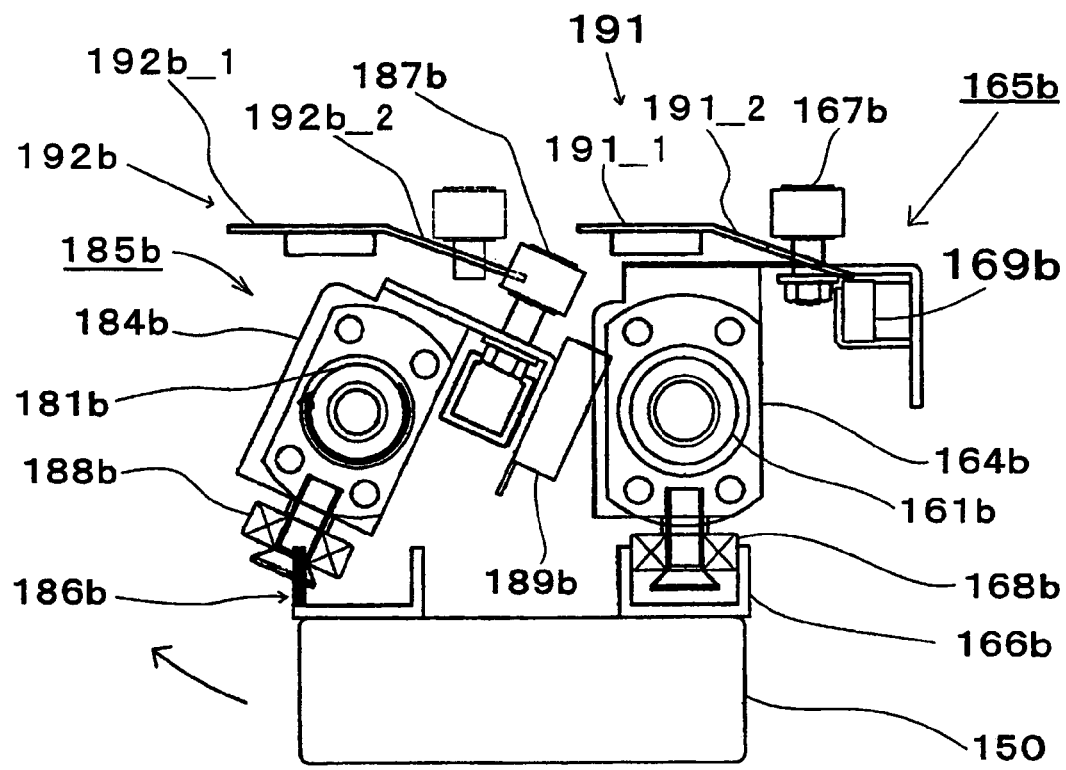
FIG. 19 is a sectional view of the side-to-side adjustment unit taken along the dash-dot lines F1-E2 of FIG. 15 as seen in the direction of the arrow G.

FIG. 19 is a sectional view within the pivotal retractable range w30b shown in FIG. 14. Within the pivotal retractable range w30b as shown in FIG. 19, a side surface of the inner support rail 186b on the front side is cut. This removes the restriction on the rotation by the inner support rail 186b within the pivotal retractable range w30b, which has been imposed in other ranges, to cause the inner nut portion 185b to pivot in the clockwise direction in operative association with the rotation of the inner ball screw 181b. Then, the side-to-side adjustment roller 187b is situated below the plate P when loaded. Therefore, the side-to-side adjustment roller 187b does not interfere with the plate P.

(Electrical Unit 25)

The electrical unit 25 is mounted to the frame 11 of the image recorder 1, as shown in FIG. 3. The electrical unit 25 is electrically connected to the above-mentioned components of the image recorder 1, and controls the operations of the image recorder 1 while sending and receiving signals to and from the components.

(General Sequence)

Plate handling in the image recorder 1 will be described below. As discussed above, the drum 21 of the image recorder 1 is capable of mounting thereon one single-mounting plate P1, one double-mounting plate P2 or two double-mounting plates P2 at the same time. Details of the plate handling, e.g. the operations of the punch unit 23 and the side-to-side adjustment unit 24, differ depending on whether one single-mounting plate P1, one double-mounting plate P2 or two double-mounting plates P2 are mounted on the drum 21. Therefore, common plate handling independent of the number and sizes of plates will be described first with reference to FIGS. 20 through 29 and FIGS. 30 through 33.

FIGS. 20 through 29 are schematic views showing the pivotal operation of the plate feed/discharge unit 20 in respective steps. FIGS. 30 through 33 are flowcharts showing a sequence of the plate handling.

The states of the components in the initial step of the operation of introducing a plate P onto the plate feed/discharge unit 20 are as follows. The angular position of the plate feed/discharge unit 20 is the plate loading position. The suction pad slide mechanism 54 moves the suction pad lifting mechanism 52 in the directions D1 and D2 so that the suction pads 47 can fix by suction the leading edge portion of the plate P being transported from the entrance roller pair 45. The suction pad lifting mechanism 52 maintains the suction pads 47 in the lowered position. The nip roller 462 of the loading transport roller pair 46 of the upper tray 41 is urged toward the transport roller 461 (which state is referred to as a nip ON state) (See FIG. 9b).

The drum 21 is rotated to and stopped at a plate receiving position. When the plate feed/discharge unit 20 is pivoted to the plate feed/discharge position with the drum 21 in the plate receiving position, a tangent line to the loading transport roller pair 46 of the upper tray 41 intersects the positioning pins provided upright on the drum 21. The pressing portions 310 of the leading edge clamp 31 on the surface of the drum 21 are open by the leading edge clamp opening/closing mechanism not shown.

In the side-to-side adjustment unit 24, all of the nut portions 165a, 165b, 175a, 175b, 185a and 185b are retracted to their home positions.

Figure 30:
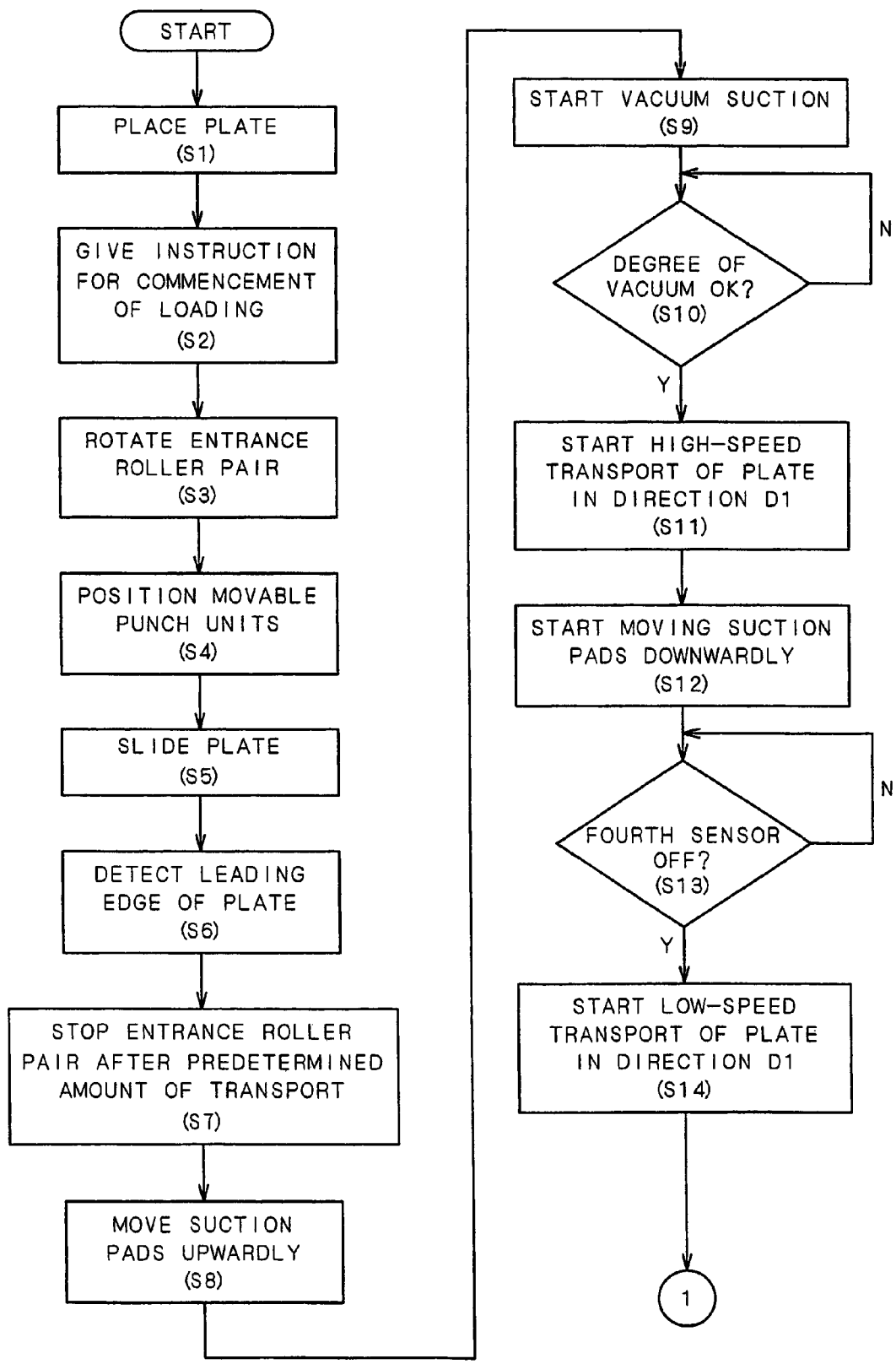
FIGS. 30 through 33 are flowcharts illustrating plate handling in the image recorder.

First, an operator places a virgin plate P on the set table 2 (See FIG. 2) (Step S1 of FIG. 30). Next, the operator enters the number and sizes of plates P placed on the set table 2 through the control panel 6 to the image recorder 1, and gives an instruction for the commencement of loading of the virgin plate P to the image recorder 1 (Step S2).

The electrical unit 25 of the image recorder 1 starts the rotation of the entrance roller pair 45 (Step S3).

The electrical unit 25 also drives the motors 107a and 107b of the punch unit 23 to move the movable tables 110a and 110b of the first and second movable punch units 102a and 102b to a location depending on the number and sizes of plates P entered in Step S2 (Step S4).

Figure 20:
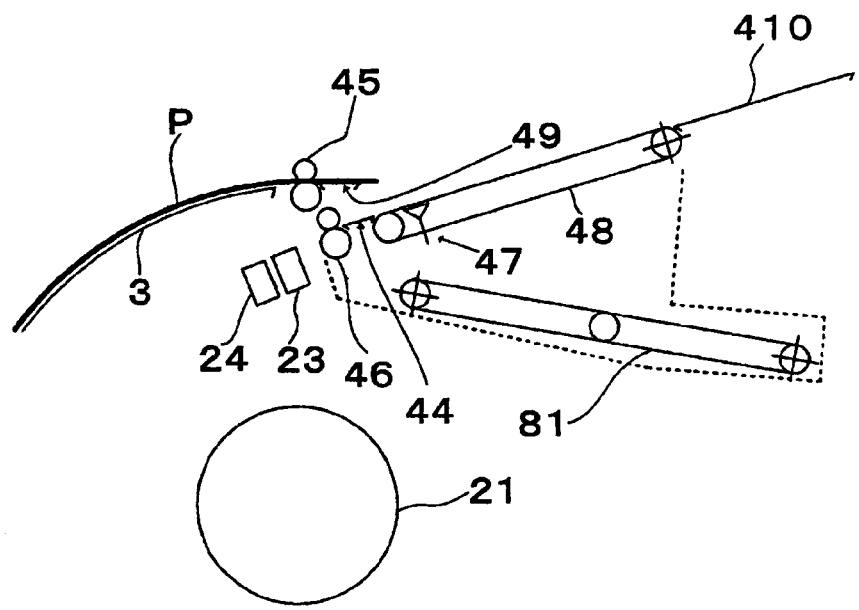
FIGS. 20 through 29 are views illustrating the operation of the plate feed/discharge unit.

Next, the operator slides the plate P along the plate guide 3 to introduce the plate P through the slit 9 (See FIG. 3) formed in the front surface of the image recorder 1 into the image recorder 1. The leading edge of the plate P is inserted between the rotating entrance roller pair 45, and the transport of the plate P is started (Step S5). The plate P is moved toward the upper tray 41 while being supported by the guide panel 49. Such a situation is shown in FIG. 20.

Next, a light beam for object detection emitted from the fourth sensor 78 (See. FIG. 9A) is intercepted by the leading edge of the plate P, whereby the fourth sensor 78 turns ON. Thus, the fourth sensor 78 detects the leading edge of the moving plate P (Step S6).

Figure 21:
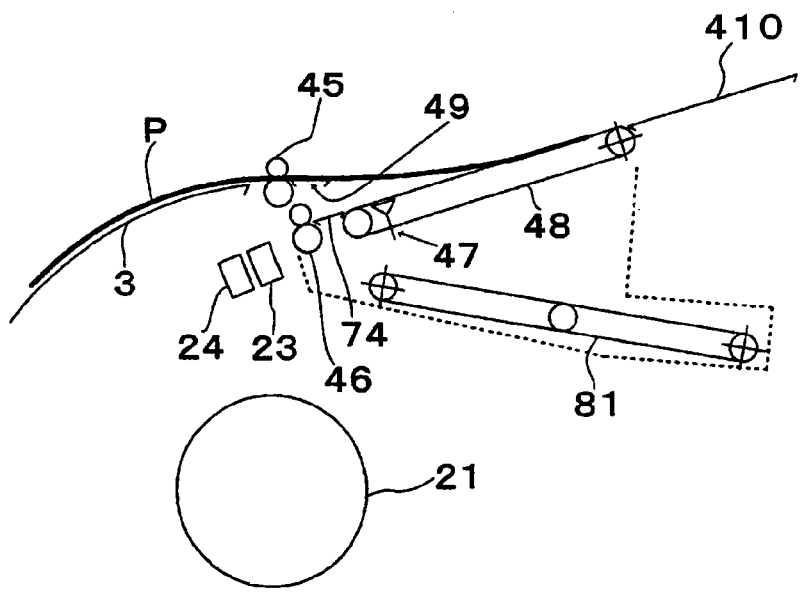

The electrical unit 25 stops the rotation of the entrance roller pair 45 after an elapse of predetermined time since the detection of the leading edge of the plate P by the fourth sensor 78 (Step S7). FIG. 21 shows a situation in which the entrance roller pair 45 is stopped rotating.

The above-mentioned predetermined time until the stop of rotation of the entrance roller pair 45 varies depending on the dimension of the plate P in a feed direction (in which the plate P is transported). This is because the location in which the plate P is supported by suction of the suction pads 47 varies depending on the size of the plate P. Since it is desirable that the suction pads 47 hold by vacuum suction the plate P at a location as close to the leading edge as possible in order to increase the raising efficiency of the plate P by the suction pads 47, a relatively short plate P is so controlled when in use. However, as discussed above, the movable range of the suction pads 47 is shorter than the length of the upper tray 41. For this reason, when a relatively long plate P is used, the suction pads 47 hold by vacuum suction a portion of the plate P which is apart from the leading edge of the plate P. In other words, such an arrangement allows the raising of plates P of all sizes even though the movable range of the suction pads 47 is shorter than the length of the upper tray 41.

Figure 22:
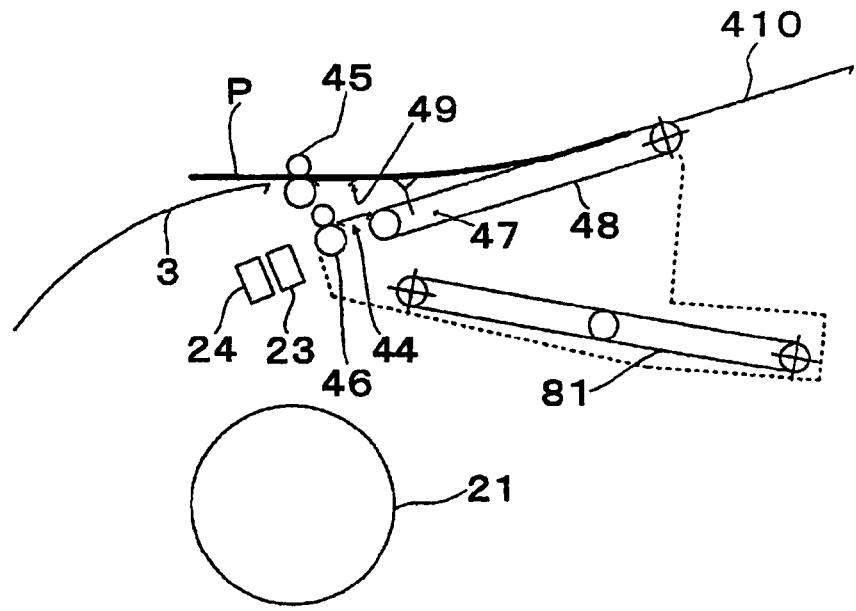

Next, the suction pad lifting mechanism 52 (See FIG. 5) moves the suction pads 47 upwardly to a location at which the suction pads 47 can support the back surface of the plate P by vacuum suction (Step S8). The upward movement of the suction pads 47 is achieved by rotating the eccentric cam 67 to push up the second arm 63, as described with reference to FIG. 6. While being moved upwardly, each of the suction pads 47 pivots about the pin 69 in the direction indicated by the arrow r2 of FIG. 6 so as to be parallel to the back surface of the plate P. FIG. 22 shows such a situation.

Then, the vacuum pump not shown starts the vacuum suction of the suction pads 47 (Step S9), and a sensor not shown measures the degree of vacuum of the suction pads 47. When it is recognized that the plate P is fixed by vacuum suction to the suction pads 47 (Step S10), the operation of raising the plate P onto the upper tray 41 at high speeds is started (Step S11).

In Step S11, the following components perform parallel operation. At the same time that the entrance roller pair 45 feeds out the plate P, the suction pad slide mechanism 54 moves the suction pad lifting mechanism 52 inclusive of the suction pads 47 holding the back surface of the plate P by vacuum suction along the guide member 53 in the direction D1 of FIG. 5. The entrance belt 48 is driven in such a direction as to move the plate P in the direction D1.

The suction pad lifting mechanism 52 gradually moves the suction pads 47 downwardly in operative association with this plate raising operation (Step S12).

The above-mentioned plate raising operation continues until the fourth sensor turns OFF (Step S13). The fourth sensor 78 turns OFF when the trailing edge of the plate P passes over the fourth sensor 78.

After the trailing edge of the plate P passes over the fourth sensor 78, the plate raising operation is changed from the high-speed operation to a low-speed operation (Step S14). This lessens the impact of the trailing edge of the plate P falling from the guide panel 49 onto the upper tray body 410.

The low-speed plate raising operation in Step S13 continues until the first sensor 75 turns ON. The turning-ON of the first sensor 75 provides recognition of the timing of the fall of the trailing edge of the plate P from the guide panel 49 onto the upper tray body 410.

When the first sensor 75 turns ON (Step S15 of FIG. 31), the plate raising operation is temporarily suspended (Step S16). Then, the high-speed plate raising operation is started again (Step S17). This operation continues until the second sensor 76 (See FIG. 9A) detects the leading edge of the plate P to turn ON.

Figure 23:
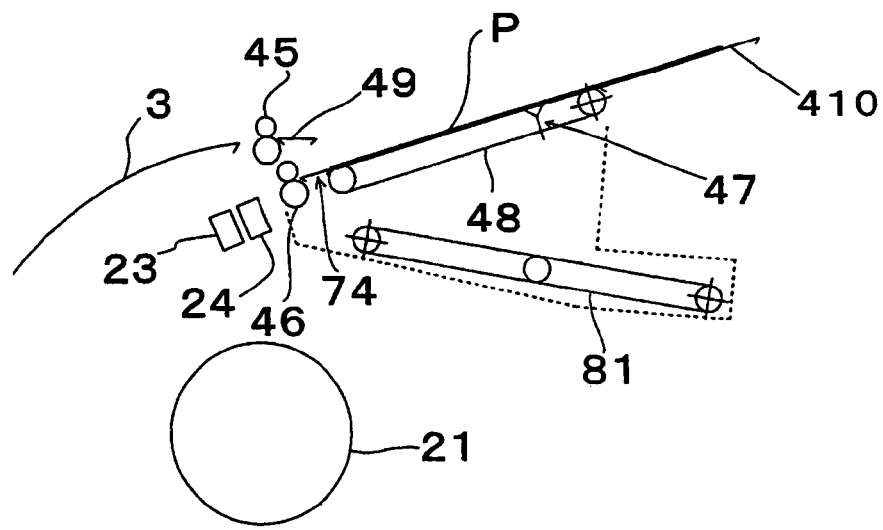

The turning-ON of the second sensor 76 allows recognition that the entire length of the plate P is received by the upper tray 41 of the plate feed/discharge unit 20. FIG. 23 shows such a situation. When the second sensor 76 turns ON (Step S18), the plate raising operation is completed (Step S19).

The image recorder 1 according to this preferred embodiment uses the suction pads 47 which fix the plate P by vacuum suction to raise or pull up the plate P onto the upper tray 41. This ensures the raising of the plate P if the upper tray 41 is inclined at a large angle. Additionally, the image recorder 1 can provide an increased angle of inclination of the upper tray 41, thereby to reduce the footprint of the upper tray 41 as compared with the conventional one.

The suction pads 47 are movable between the vertical position of the upper surface of the upper tray body 410 and a position extended from the upper surface. The use of this function may lessen the impact upon the plate P when the trailing edge of the plate P falls from the guide panel 49 onto the upper surface of the upper tray 41.

Additionally, since the plate P is raised while being fixed by the suction pads 47, the plate P is prevented from meandering while being moved along the upper tray 41.

After the completion of the loading of the plate P on the upper tray 41, the plate feed/discharge unit 20 is pivoted to the punching position (Step S20).

During the pivotal movement of the plate feed/discharge unit 20, the suction pads 47 continue fixing the plate P by vacuum suction. This prevents the plate P from being deviated from its proper position during the pivotal movement of the plate feed/discharge unit 20.

After the completion of the pivotal movement of the plate feed/discharge unit 20 to the punching position, the transport of the plate P in the direction D2 is started (Step S21).

In Step S21, the following components perform parallel operation. The suction pad slide mechanism 54 moves the suction pad lifting mechanism 52 inclusive of the suction pads 47 holding the back surface of the plate P by vacuum suction along the guide member 53 in the direction D2 of FIG. 5. The entrance belt 48 and the loading transport roller pair 46 are driven in such a direction as to move the plate P in the direction D2.

After passing through the guide panel 74, the leading edge of the plate P moves along the large guide 191 and the small guide 192 of the side-to-side adjustment unit 24 (See FIG. 18). When the plate detection sensor 114 (See FIG. 11) provided on the punch unit 23 is turned ON by the leading edge of the plate P to detect that the leading edge of the plate P comes to near the punchers (Step S22), the plate transport operation in the direction D2 is stopped (Step S23).

Next, the motor 465 for the loading transport roller pair 46 is driven to move e nip roller 462 to a location spaced apart from the transport roller 461 (which state is referred to as a nip OFF state). At the same time, the suction pads 47 complete the holding of the plate P by vacuum suction (Step S24). This releases the fixing of the ate P to the upper tray 41.

Next, the plate P is moved in the direction indicated D2 at low speeds for a redetermined length of time (Step S25). This plate transport is carried out only by the entrance belt 48 and the transport roller 461 of the loading transport roller pair 46. The late P is moved in the direction D2 at low speeds to come into contact with two of the reference pins 126a, 126b, 136a and 136b of the punch unit 23. The plate P which has been released from the fixing to the upper tray 41 has flexibility in movement along the X axis and the Y axis. Thus, the plate P slides on the upper tray 41, and the leading edge of the plate P positively comes into contact with the reference pins. All of the nut portions 165, 175 and 185 of the side-to-side adjustment unit 24, which are retracted to their home positions, do not interfere with the movement of the plate P along the guides 191 and 192 of the side-to-side adjustment unit 24. In particular, the inner nut portions 185a and 185b of the double-plate side-to-side adjustment unit 152, which are pivoted aside at their home positions, do not interfere with the movement of the single-mounting plate P1.

In Step S26, the side-to-side adjustment process is performed on the plate P. When the single-mounting plate P1 is used, the right-hand and left-hand nut portions 165a and 165b of the single-plate side-to-side adjustment unit 151 are moved at constant speeds from their home positions toward the X-axis center to effect the centering of the plate P1. The centering causes the X-axis center of the single-mounting plate P1 to coincide with the reference line C2 of the punch unit 23. As discussed above, it is desirable that the reference line C2 coincides with the X-axis centerline C1 of the drum 21.

When the double-mounting plate P2 is used, corresponding ones of the outer and inner nut portions 175 and 185 of the double-plate side-to-side adjustment unit 152 are moved at constant speeds from their home positions toward the X-axis center to effect the centering of the plate P2. The centering causes the X-axis center of the plate P2a for mounting in the first plate mounting region 27a to coincide with the reference line Ca2 of the first movable punch unit 102a, and causes the X-axis center of the plate P2b for mounting in the second plate mounting region 27b to coincide with the reference line Cb2 of the second movable punch unit 102b. As discussed above, it is desirable that the reference line Ca2 coincides with the X-axis centerline Ca1 of the first plate mounting region 27a and that the reference line Cb2 coincides with the X-axis centerline Cb1 of the second plate mounting region 27b.

Next, the pivotal member 463 is pivoted by the motor 465 to move the nip roller 462 toward the transport roller 461. Thus, the plate is held and fixed between the nip roller 462 and the transport roller 461 (Step S27).

Thereafter, the movable punch units 102a and 102b of the punch unit 23 are used to perform the punching process depending on the number and sizes of plates P (Step S28). The punching process will be detailed later.

Figure 24:
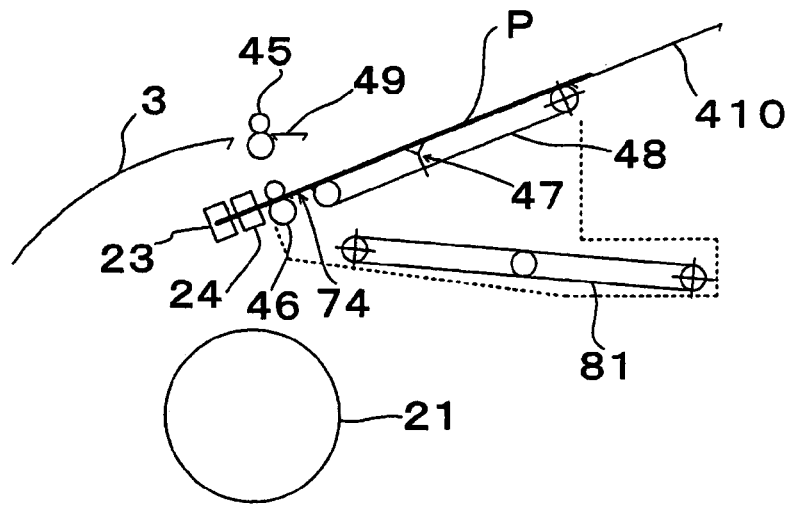

The punching process produces at least a positioning hole and a printing hole in the leading edge of the plate P, and produces an escape hole, as needed. FIG. 24 shows such a situation.

Next, at the same time that the suction pad slide mechanism 54 moves the suction pads 47 in the direction D1, the entrance belt 48 is driven in such a direction as to move the plate P in the direction D1. Thus, the plate P is moved back in the direction D1 (Step S29 of FIG. 32). The moving back of the plate P continues until the leading edge of the plate P as seen in the direction D2 reaches the loading transport roller pair 46. When the third sensor 77 (See FIG. 9A) detects the leading edge of the plate P passing thereover to turn OFF (Step S30), the movement of the plate P in the direction D1 is stopped (Step S31).

Figure 25:
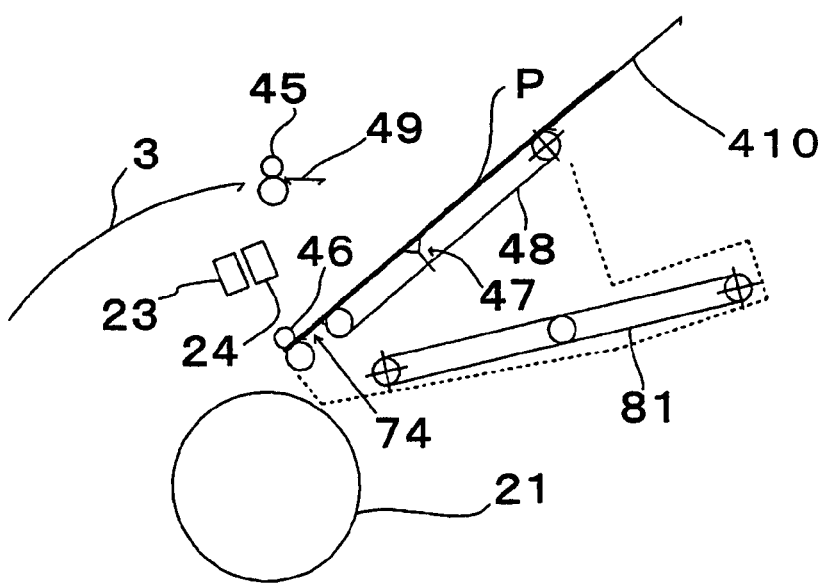

Next, the plate feed/discharge unit 20 is pivoted to the feed/discharge position (Step S32). At this time, the drum 21 is already stopped at the plate receiving position, and the pressing portions 310 of the leading edge clamp 31 are open. FIG. 25 shows such a situation.

Next, the plate P is moved in the direction D2 for a predetermined length of time (Steps S33 through S35). This transport in the direction D2 is carried out initially by driving the entrance belt 48 (in such a direction as to move the plate P in the direction D2) and rotating the loading transport roller pair 46 (Step S33). The loading transport roller pair 46 enters the nip OFF state in midstream (Step S34). Thereafter, the transport is carried out only by driving the entrance belt 48 (Step S35). This is so for purposes of releasing the fixing of the plate P to the upper tray 41 to increase the flexibility in movement of the plate P, thereby easily bringing the positioning hole punched in the leading edge of the plate into engagement with the positioning pin on the drum 21.

The predetermined length of time in Steps S33 through S35 is generally as long as the time required to bring the leading edge of the plate P being transported into contact with the positioning pin provided upright on the outer peripheral surface of the drum 21 to effect the positioning of the plate P.

After the completion of the positioning of the leading edge of the plate P, suction through the suction hole of the drum 21 is started (Step S36). Next, the pressing portions 310 of the leading edge clamp 31 are closed by the action of the leading edge clamp opening/closing mechanism not shown to secure the leading edge of the plate P (Step S37). Next, the drum 21 starts rotating at low speeds (Step S38). This causes the plate P to be gradually wound around the outer peripheral surface of the drum 21. In the winding process step, a squeegee roller may be used to improve the intimate contact of the plate P with the outer peripheral surface of the drum 21 in a manner well known in the art.

The rotation of the drum 21 is stopped when the plate P is wound throughout its length around the outer peripheral surface of the drum 21 (Step S39). Next, the fixing of the trailing edge of the plate P by the trailing edge clamp 32 (Step S40) and the pivotal movement of the plate feed/discharge unit 20 to the plate loading position (Step S41) are carried out concurrently.

If two plates P are placed on the upper tray 41 of the plate feed/discharge unit 20, the operation in Steps S32 through S41 is performed on the two plates P concurrently.

Figure 26:
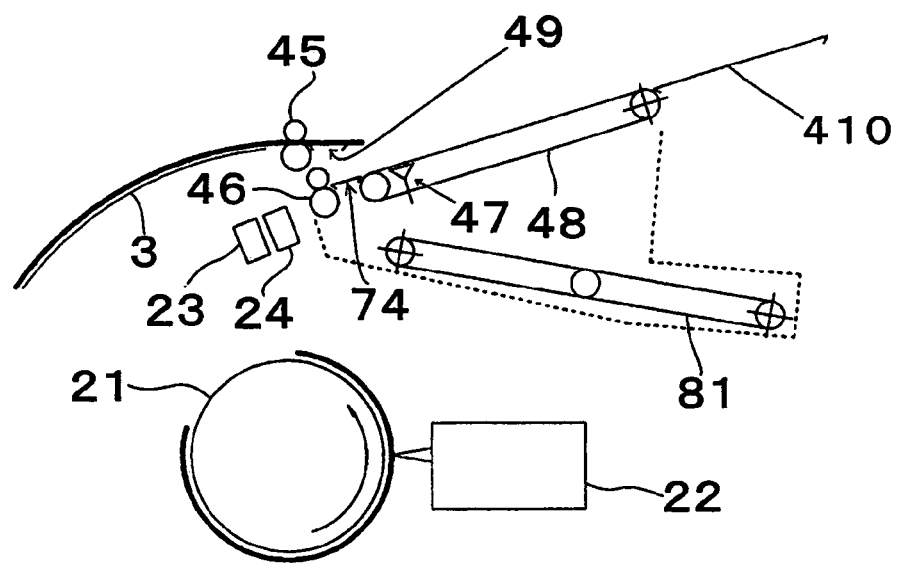

Next, the recording heads 22a and 22b record an image on the plate P fixed on the outer peripheral surface of the drum 21 (Step S42). The control of the recording heads 22 differs depending on the number and sizes of plates P fixed on the outer peripheral surface of the drum 21. More specifically, when only one double-mounting plate P2 is mounted, the image recording is performed by one of the recording heads 22 corresponding to the plate mounting region 27 in which the plate P2 is mounted. When two double-mounting plates P2 are mounted, the image recording is performed individually by the two recording heads 22. When one single-mounting plate P1 is mounted, the image recording is performed by one or both of the two recording heads 22. FIG. 26 shows such a situation.

While an image is being recorded on the plate P, the next plate P may be loaded to the plate feed/discharge unit 20. In this case, the operation in the steps S1 to S31 is performed concurrently with the image recording on the plate P.

After the completion of the image recording on the plate P mounted on the drum 21, the plate P is subjected to a discharge process. First, the plate feed/discharge unit 20 is pivoted to the feed/discharge position (Step S43 of FIG. 33). Next, the trailing edge clamp opening/closing mechanism not shown causes the trailing edge clamp 32 to release the trailing edge of the plate P (Step S44). Then, the elasticity of the plate P brings the trailing edge of the plate P out of contact with the outer peripheral surface of the drum 21. In this state, the drum 21 is rotated at low speeds in the reverse direction. (Step S45). Next, the discharge belt 81 of the plate feed/discharge unit 20 starts being driven (Step S46).

Figure 27:
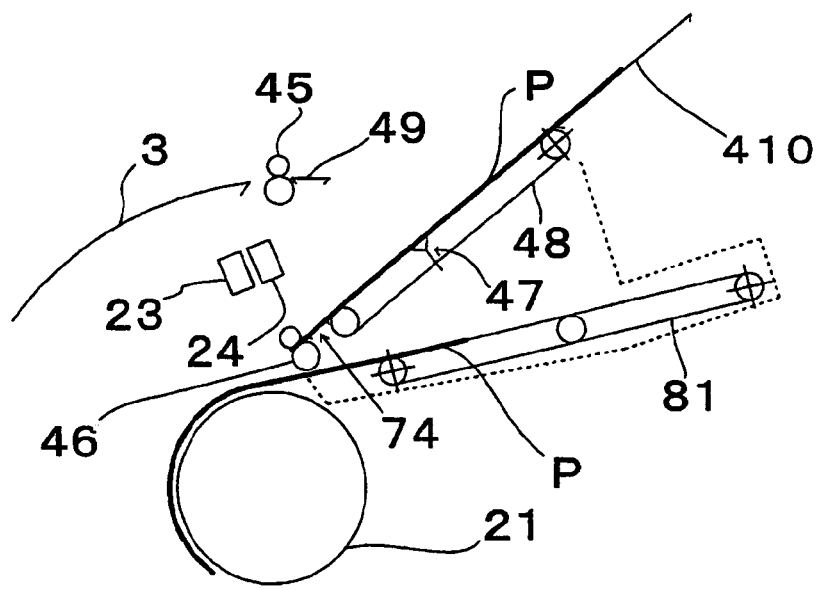

As the drum 21 rotates in the reverse direction, the plate P is discharged onto the discharge belt 81. FIG. 27 shows such a situation. The leading edge clamp 31 is opened in desired timed relation (Step S47) to discharge the plate P throughout its entire length onto the discharge belt 81. Thereafter, the vacuum suction in the drum 21 is stopped (Step S48).

Figure 28:
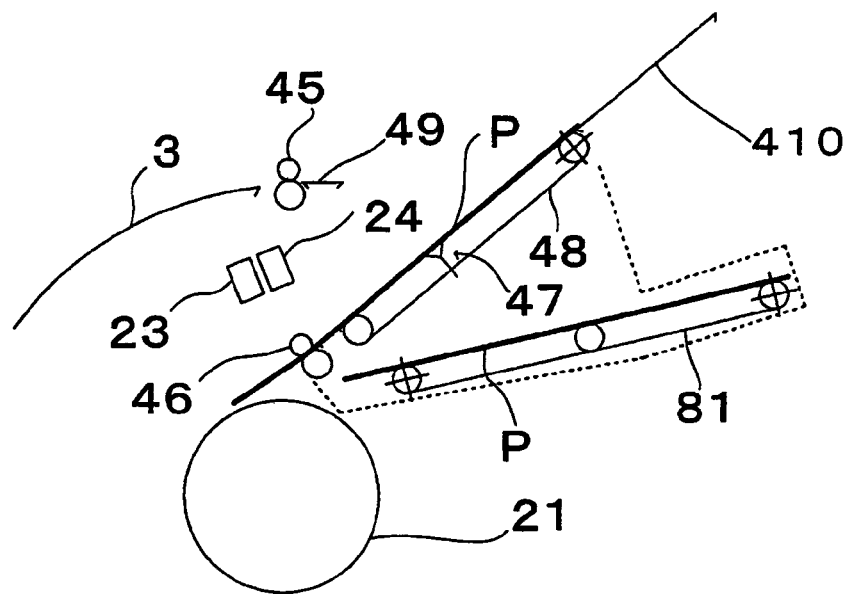

After the plate P is discharged throughout its entire length onto the discharge belt 81, the next plate P placed on the upper tray 41 starts being loaded to the drum 21, as shown in FIG. 28. More specifically, the process starting from Step S32 is performed.

Figure 29:
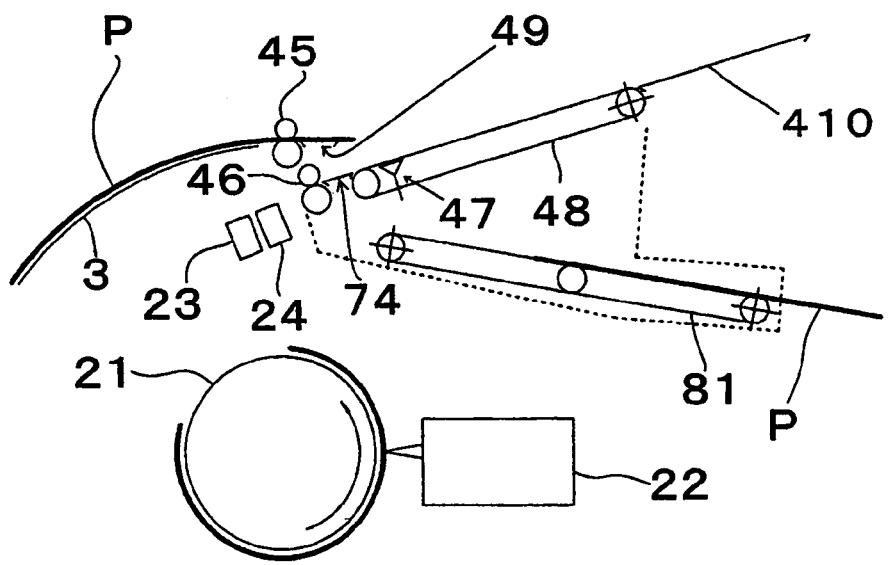

The plate P with an image recorded thereon is discharged from the discharge belt 81 to an automatic development apparatus not shown. FIG. 29 shows such a situation.

(Detailed Description of Punching Process)

Figure 34:
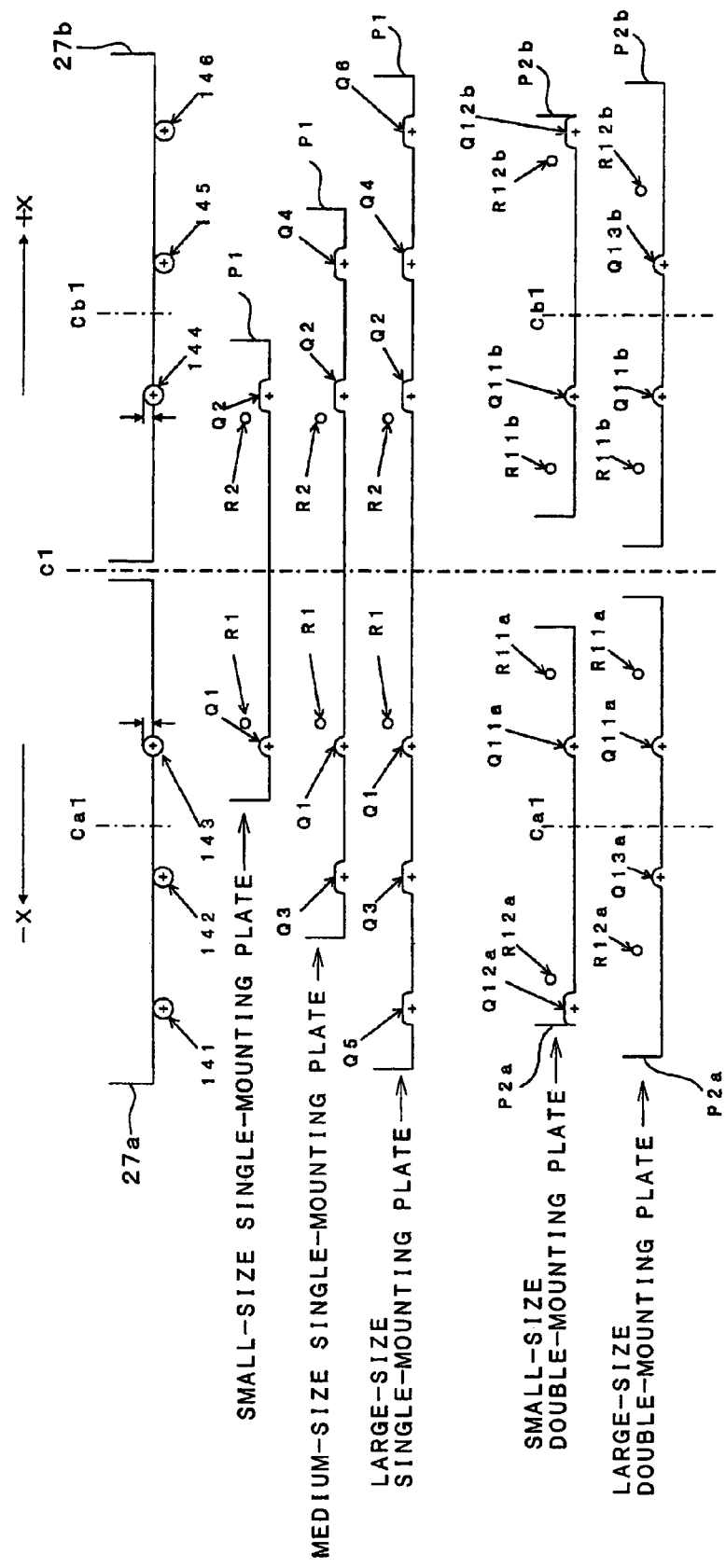
FIG. 34 is a view showing a positional relationship between positioning pins disposed on the surface of a drum, and the number and location of punches during the mounting of one or two plates on the surface of the drum.

Details of the punching process will be described with reference to FIG. 34. FIG. 34 is a schematic view showing a positional relationship between positioning pins 141 to 146 disposed on the surface of the drum 21, and the number and location of punches during the mounting of one or two plates P on the surface of the drum 21.

Referring to FIG. 34, six positioning pins (first to sixth positioning pins 141 to 146) are mounted upright on the surface of the drum 21. Each of the positioning pins 141 to 146 are of a perfectly circular sectional configuration, and has a diameter equal to that of the round punches 121a and 121b of the punchers 111a and 111b. The sectional configuration of the pins 141 and 146 need not always be perfectly circular, but may be other configurations so far as a portion of each of the pins 141 to 146 which is to come into contact with the plate P has a curvature equal to that of the holes punched by the round punches 121a and 121b.

The first to third positioning pins 141 to 143 are disposed on the surface of the drum 21 so as to define one edge of the first plate mounting region 27a, and the fourth to sixth positioning pins 144 to 146 are disposed on the surface of the drum 21 so as to define one edge of the second plate mounting region 27b.

The first to third positioning pins 141 to 143 and the fourth to sixth positioning pins 144 to 146 are symmetrical with respect to the centerline C1 of the drum 21.

The first to third positioning pins 141 to 143 are equally spaced along the X axis. Likewise, the fourth to sixth positioning pins 144 to 146 are equally spaced along the X axis so that the spacing between adjacent ones of the fourth to sixth positioning pins 144 to 146 is equal to the spacing between adjacent ones of the first to third positioning pins 141 to 143. The spacing between adjacent positioning pins may be set at various values depending on the length of the leading edge of the plate P to be used, and need not be limited to the above-mentioned spacing.

The first, second, fifth and sixth positioning pins 141, 142, 145 and 146 are at the same location as seen in the circumferential direction of the drum 21. The third and fourth positioning pins 143 and 144 are spaced a distance corresponding to the radius of the pins 141 to 146 in the backward direction of the rotation of the drum 21 apart from the first, second, fifth and sixth positioning pins 141, 142, 145 and 146.

The X-axis distance from the centerline C1 of the drum 21 to the third positioning pin 143 is equal to that from the centerline C1 to the fourth positioning pin 144.

Selectively bringing the first to sixth positioning pins 141 to 146 into contact with the leading edge of the plate P fed from the upper tray 41 of the plate feed/discharge unit 20 allows the positioning of plates P having a variety of sizes on the drum 21. The pressing portions 310 of the above-mentioned leading edge clamp 31 are mounted to the drum 21 so as to be able to press the leading edge of the plate P positioned by the positioning pins 141 to 146.

There are shown in FIG. 34 the configurations of the holes punched in the leading edges of plates P (P1, P2a, P2b) and the positioning pins 141 to 146 for contact with the leading edges of the plates P (P1, P2a, P2b) in respective techniques of mounting the plates P. The plates P shown herein include single-mounting plates P1 of small, medium and large sizes, and double-mounting plates P2a, P2b of small and large sizes.

In the image recorder 1, only two of the positioning pins are brought into contact with the leading edge of the plate P during the positioning of the plate P. At least one of the two positioning pins is brought into engagement with a semicircular hole punched by the round punch 121. The other positioning pin is brought into loose engagement with an elongated hole punched by the elongated punch 124 so as to contact a straight portion of the elongated hole or is brought into contact with a straight portion of the leading edge of the plate in which no holes are punched.

As shown in FIG. 34, elongated escape holes Q3, Q4, Q5, Q6, Q12a, Q12b or semicircular escape holes Q13a, Q13b are punched in portions of the leadings edges of the plates P which have the possibility of interfering with any one of the positioning pins. 141 to 146. Thus, every plate P is positioned so that the leading edge thereof is parallel to the axial direction of the drum 21.

The small-size single-mounting plate P1 refers to a plate P1 having an X-axis dimension sufficiently less than the spacing between the second and fifth positioning pins 142 and 145.

The medium-size single-mounting plate P1 refers to a plate P1 having an X-axis dimension equal to or greater than the maximum length of the leading edge of the small-size single-mounting plate P1 and sufficiently less than the spacing between the first and sixth positioning pins 141 and 146. The plate P1 of this size is punched with the elongated escape holes Q3 and Q4 since there is a danger that opposite end portions of the leading edge thereof make contact with the second or fifth positioning pin 142 or 145.

The large-size single-mounting plate P1 refers to a plate P1 having an X-axis dimension equal to or greater than the maximum length of the leading edge of the medium-size single-mounting plate P1. The plate P1 of this size is punched with the elongated escape holes Q5 and Q6 in addition to the elongated escape holes Q3 and Q4 since there is a danger that opposite end portions of the leading edge thereof make contact with the first or sixth positioning pin 141 or 146.

The single-mounting plate P1 of any size is positioned on the drum 21 by bringing a round hole punched therein into engagement with the third positioning pin 143 and bringing an elongated hole punched therein into loose engagement with the fourth positioning pin 144. As required, one or more elongated holes are punched as the escape hole(s). As discussed above, the third and fourth positioning pins 143 and 144 are forward of the other positioning pins as seen in the plate feed direction. Thus, if the positioning holes and the escape holes are equal in depth (or a dimension of the hole in the circumferential direction of the drum), the leading edge of the plate P at the positioning holes makes contact with the positioning pins earlier than at the remaining portions. Therefore, the leading edge of the plate P does not contact the other positioning pins not to be used for the positioning of the plate P.

The small-size double-mounting plate P2 (P2a) for mounting in the first plate mounting region 27a refers to a plate P2 having an X-axis dimension equal to or greater than that which allows the positioning of the plate using the second and third positioning pins 142 and 143 and less than that which ensures the positioning of the plate using the first and third positioning pins 141 and 143.

The large-size double-mounting plate P2 (P2a) for mounting in the first plate mounting region 27a refers to a plate P2 having an X-axis dimension equal to or greater than that which ensures the positioning of the plate using the first and third pins 141 and 143.

The definition of the small and large sizes of the double-mounting plates P2 (P2b) for mounting in the second plate mounting region 27b will be omitted herein by reference to the above description.

Each single-mounting plate P1 is punched with printing holes R1 and R2. The double-mounting plate P2a for mounting in the first plate mounting region 27a is punched with printing holes R11a and R12a. The double-mounting plate P2b for mounting in the second plate mounting region 27b is punched with printing holes R11b and R12b.

The spacing between the printing holes shown is given merely as an example. When plates are fed from the same image recorder to a plurality of types of printing apparatuses (e.g., when the printing apparatuses are selectively used depending on the plate size), the spacing between the printing holes may be changed for each printing apparatus. The image recorder 1 according to this preferred embodiment, which comprises the punch unit 23 capable of adjusting the locations of the punches along the X axis, can easily make such change in location of the printing holes.

As discussed above, the image recorder 1 produces the punched holes Q1 to Q6, Q11a, Q11b, Q12a,Q12b, Q13a, Q13b in addition to the printing holes. To produce these punched holes, punching is required at a maximum of six locations for the holes (for the large-size single-mounting plate P1) except the printing holes. The image recorder 1 can easily perform the punching at the six locations since all of the punchers are movable and each of the two punchers 111*a* and 111*b* among the four punchers 111*a*, 111*b*, 112*a* and 112*b* has two punches.

The punching process (or the operation corresponding to Step S28 of FIG. 31) will be detailed for each size of the plates P.

(Punching Process for Small-Size Single-Mounting Plate P1)

Figure 35:
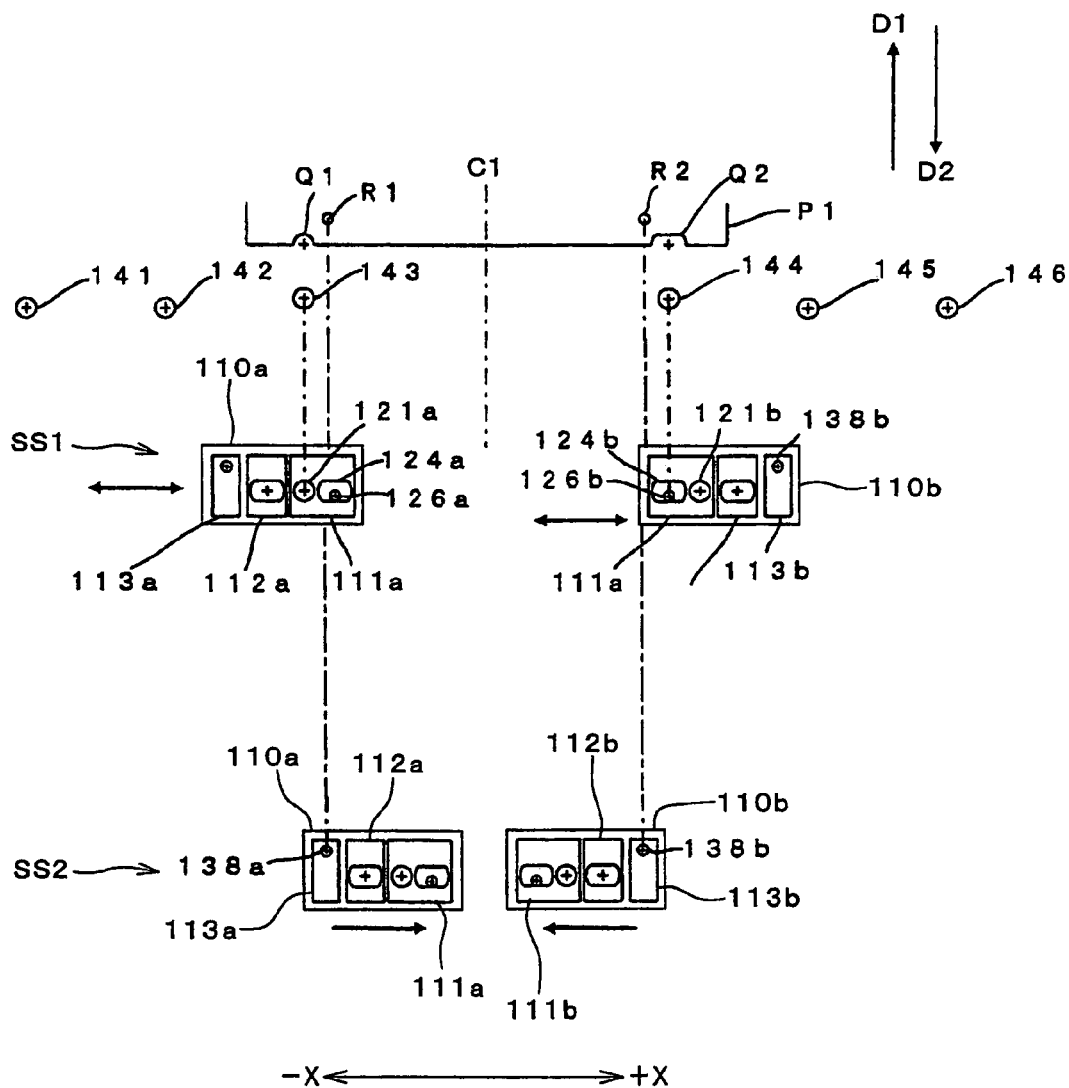
FIG. 35 is a view showing a positional relationship between a small-size single-mounting plate and the positioning pins, and a positional relationship between the punchers when punching the small-size single-mounting plate.

FIG. 35 is a view showing a positional relationship between the small-size plate P1 on the drum 21 and the positioning pins, and a movement direction of and a positional relationship between the punchers 111 to 113 when punching the plate P1 (in operating states SS1 and SS2). As shown in FIG. 35, the leading edge of the plate P1 is punched with the semicircular positioning hole Q1 and the elongated positioning hole Q2. The hole Q1 is for engagement with the third positioning pin 143, and the hole Q2 is for loose engagement with the fourth positioning pin 144. The leading edge of the plate P1 is further punched with the printing holes R1 and R2 to be used in printing operation in a subsequent step or the like.

The operating state SS1 of FIG. 35 shows the movement direction of and positional relationship between the punchers 111 to 113 in the operation of Step S4 described above with reference to FIG. 30. This operation moves the movable tables 110*a* and 110*b* of the punch unit 23 to the locations depending on the number and sizes of the plates P, and moves down the reference pins. The heavy arrows in FIG. 35 indicate that the movable tables 110*a* and 110*b* are moving along the X axis in this step.

Figure 36:
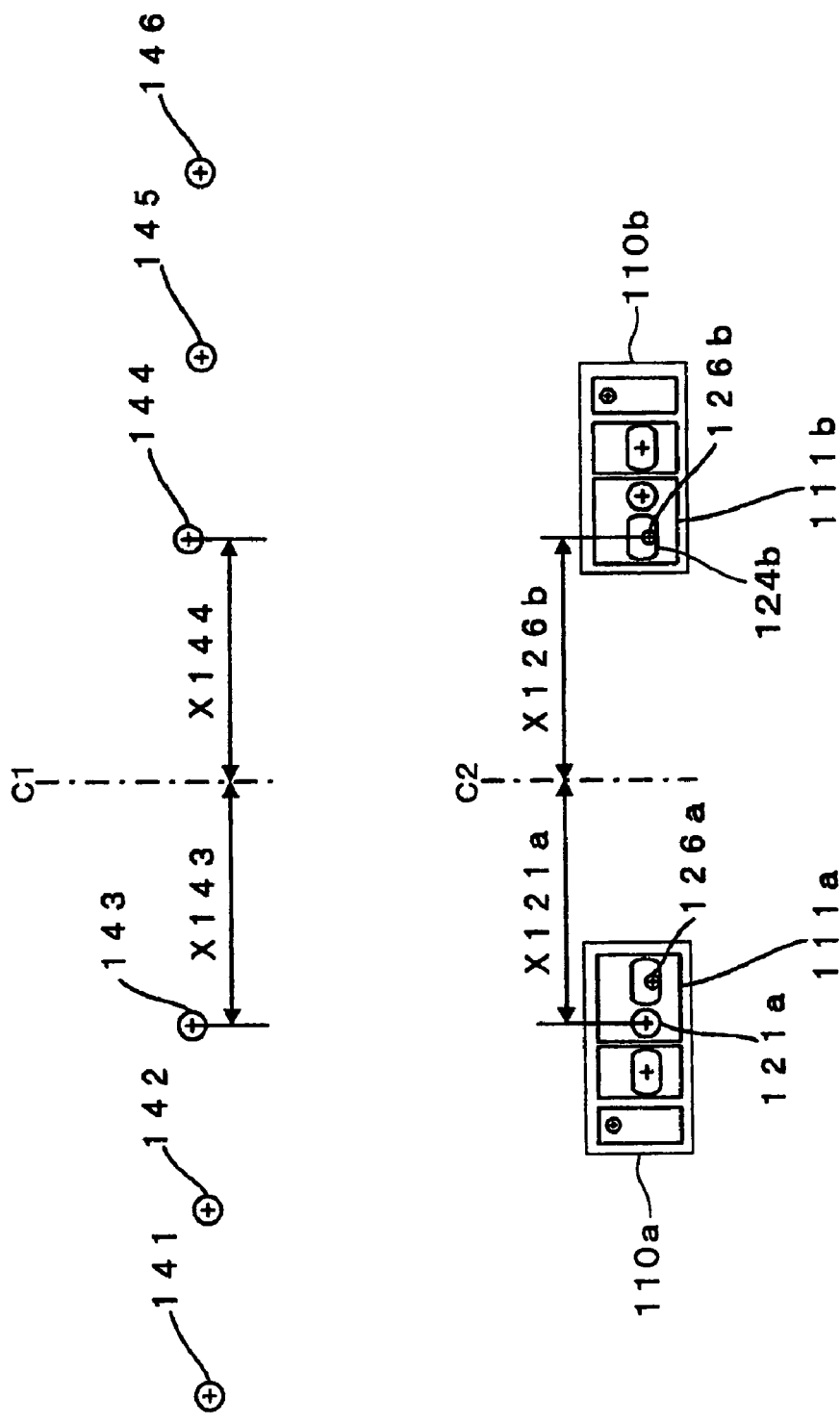
FIG. 36 is a schematic view showing a positional relationship between the punches, reference pins and the positioning pins.
Figure 37:
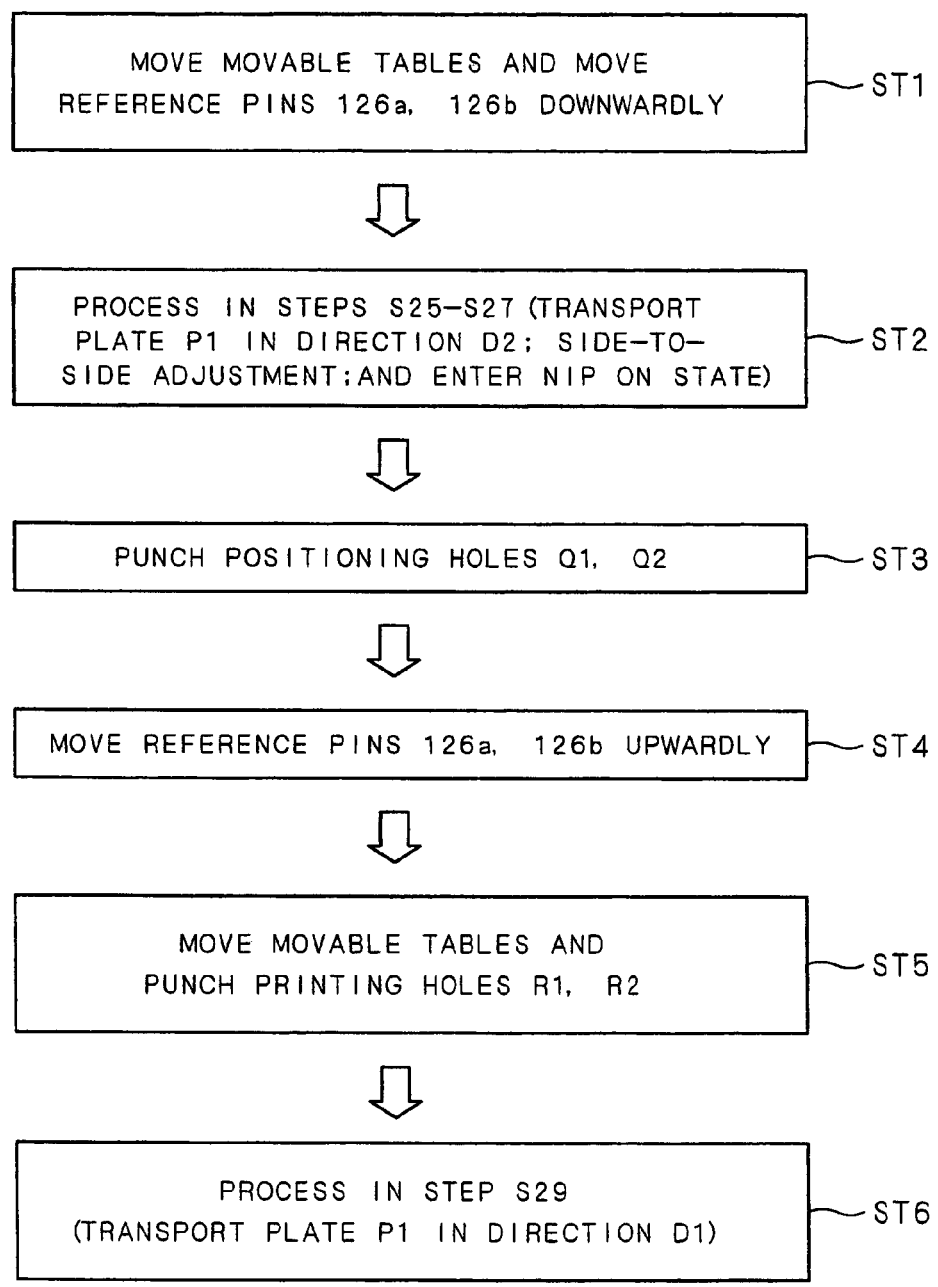
FIG. 37 illustrates the operation of punching holes in the small-size single-mounting plate in time sequence.

The operating state SS1 will be described in detail with reference to FIGS. 36 and 37. FIG. 36 is a view showing a positional relationship between the first to sixth positioning pins 141 to 146 on the drum 21 and the punchers 111*a* and 111*b* when punching the holes Q1 and Q2. FIG. 37 is a diagram illustrating the operation for punching the holes Q1, Q2, R1 and R2 in time sequence. The heavy open arrows in FIG. 37 indicate the passage of time.

For the small-size single-mounting plate P1, the movable table 110*a* of the first movable punch unit 102*a* moves, thereby to move the punchers 111*a*, 112*a*, 113*a* along the X axis as indicated by the left-hand arrow at the operating state SS1 as seen in FIG. 35. This moves the punchers 111*a*, 112*a*, 113*a* to such a location that an X-axis distance x121*a* from the center of the round punch 121*a* to the reference line C2 of the punch unit 23 is equal to an X-axis distance x143 from the center of the third positioning pin 143 to the centerline C1 of the drum 21, as illustrated in FIG. 36.

At the same time, the movable table 110*b* of the second movable punch unit 102*b* moves, thereby to move the punchers 111*b*, 112*b*, 113*b* to such a location that an X-axis distance x126*a* from the center of the reference pin 126*b* to the reference line C2 of the punch unit 23 is approximately equal to an X-axis distance x144 from the center of the fourth positioning pin 144 to the centerline C1 of the drum 21. That is, the punchers 111*b*, 112*b*, 113*b* move along the X axis as indicated by the right-hand arrow at the operating state SS1 as seen in FIG. 35.

Next, a drive mechanism not shown of the puncher 111*a* moves the reference pin 126*a* down to the level of the clearance 123*a* (See FIG. 12). Similarly, in the puncher 111*b*, the reference pin 126*b* is moved down to the level of the clearance 123*b* (See FIG. 12). The operation described heretofore corresponds to a process ST1 shown in FIG. 37.

Next, a process ST2 corresponding to Steps S25 through S27 is performed. Specifically, the step of transporting the plate P1 at low speeds until the leading edge of the plate P1 comes into contact with the reference pins 126*a*, 126*b* (Step S25), the side-to-side adjustment step (Step S26), and the step of entering the nip ON state (Step S27) are carried out in succession.

This achieves the positioning of the leading edge of the plate P with respect to the punch unit 23.

Next, the round punch 121*a* of the puncher 111*a* punches the semicircular positioning hole Q1 in the leading edge of the plate P1. At the same time, the elongated punch 124*b* of the puncher 111*b* punches the elongated positioning hole Q2 in the leading edge of the plate P1 (in a process ST3).

Next, the reference pins 126*a* and 126*b* are moved upwardly to above the clearances 133*a* and 133*b*, respectively (in a process ST4).

The operating state SS1 is now completed, and then the operating state SS2 starts. In the operating state SS2, the first and second movable punch units 102*a* and 102*b* move, thereby to move the punchers 113*a* and 113*b* to such locations (shown at the operating state SS2 of FIG. 35) in which the punchers 113*a* and 113*b* can punch the printing holes R1 and R2, respectively. That is, the punchers 113*a* and 113*b* move along the X axis as indicated by the arrows at the operating state SS2 of FIG. 35. Next, in the locations at which the movement is completed, the punchers 113*a* and 113*b* are driven to punch the printing holes R1 and R2 in the plate P1 (in a process ST5).

When the punchers 113*a* and 113*b* in the locations shown in FIG. 36 can punch the printing holes R1 and R2, it is not necessary to move the movable tables 110*a* and 110*b* in the process ST5.

The above-mentioned technique of punching the holes includes moving the reference pins 126*a* and 126*b* upwardly prior to the aforementioned movement of the first and second movable punch units 102*a* and 102*b*, to prevent the reference pins 126*a* and 126*b* from interfering with the leading edge of the plate P1. This achieves satisfactory movement of the first and second movable punch units 102*a* and 102*b* if the leading edge of the plate P1 is wavy.

Thereafter, the plate P1 is transported in the direction D1 (in a process ST6). This process corresponds to Step S29 of FIG. 32.

(Punching Process for Medium-Size Single-Mounting Plate P1)

Figure 38:
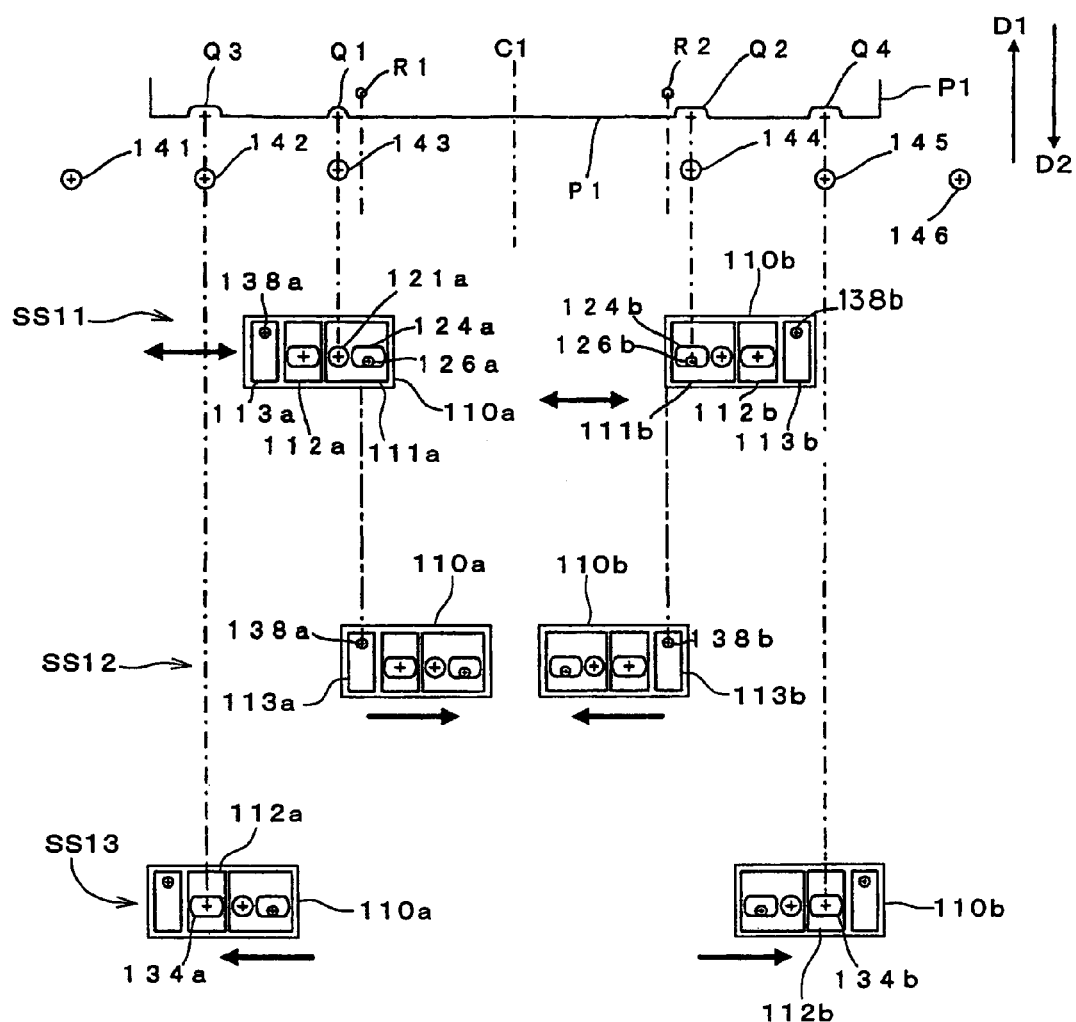
FIG. 38 is a view showing a positional relationship between a medium-size single-mounting plate and the positioning pins, and a positional relationship between the punchers when punching the medium-size single-mounting plate.

FIG. 38 is a view showing a positional relationship between the medium-size plate P1 on the drum 21 and the positioning pins, and a movement direction of and a positional relationship between the punchers 111 to 113 when punching the plate P1 (in operating states SS11 through SS13). The operating states SS11 and SS12 shown in FIG. 38 are identical with the operating states SS1 and SS2 shown in FIG. 35, and will not be described.

As shown in FIG. 38, the leading edge of the medium-size plate P1 is punched with the semicircular hole Q1 and the elongated holes Q2, Q3, Q4. The semicircular hole Q1 is for engagement with the third positioning pin 143, and the elongated positioning hole Q2 is for loose engagement with the fourth positioning pin 144. The provision of the elongated escape holes Q3 and Q4 in the plate P1 prevents the plate P1 from making contact with the second and fifth positioning pins 142 and 145. The leading edge of the plate P1 is further punched with the printing holes R1 and R2 to be used in printing operation in a subsequent step or the like.

Figure 39:
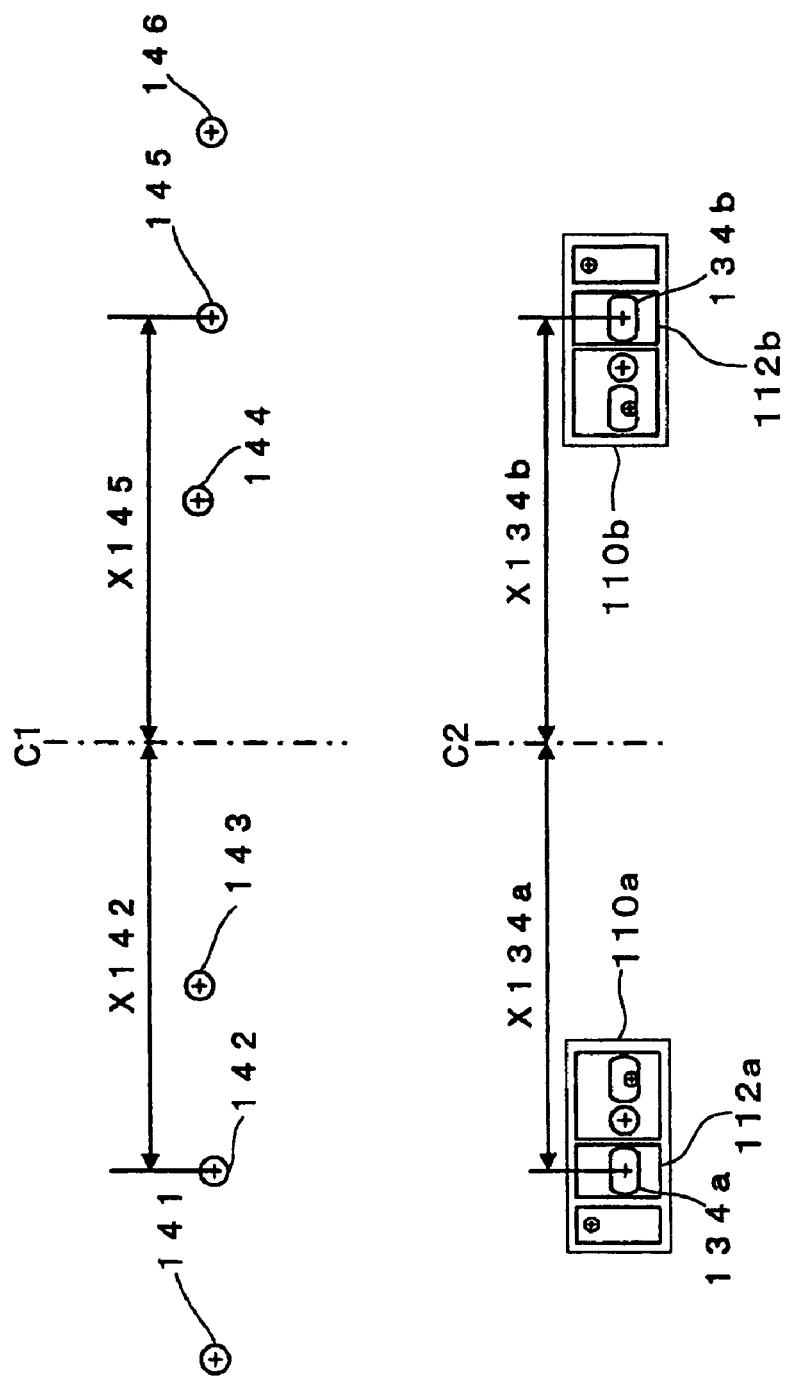
FIG. 39 is a schematic view showing a positional relationship between the punches, the reference pins and the positioning pins.
Figure 40:
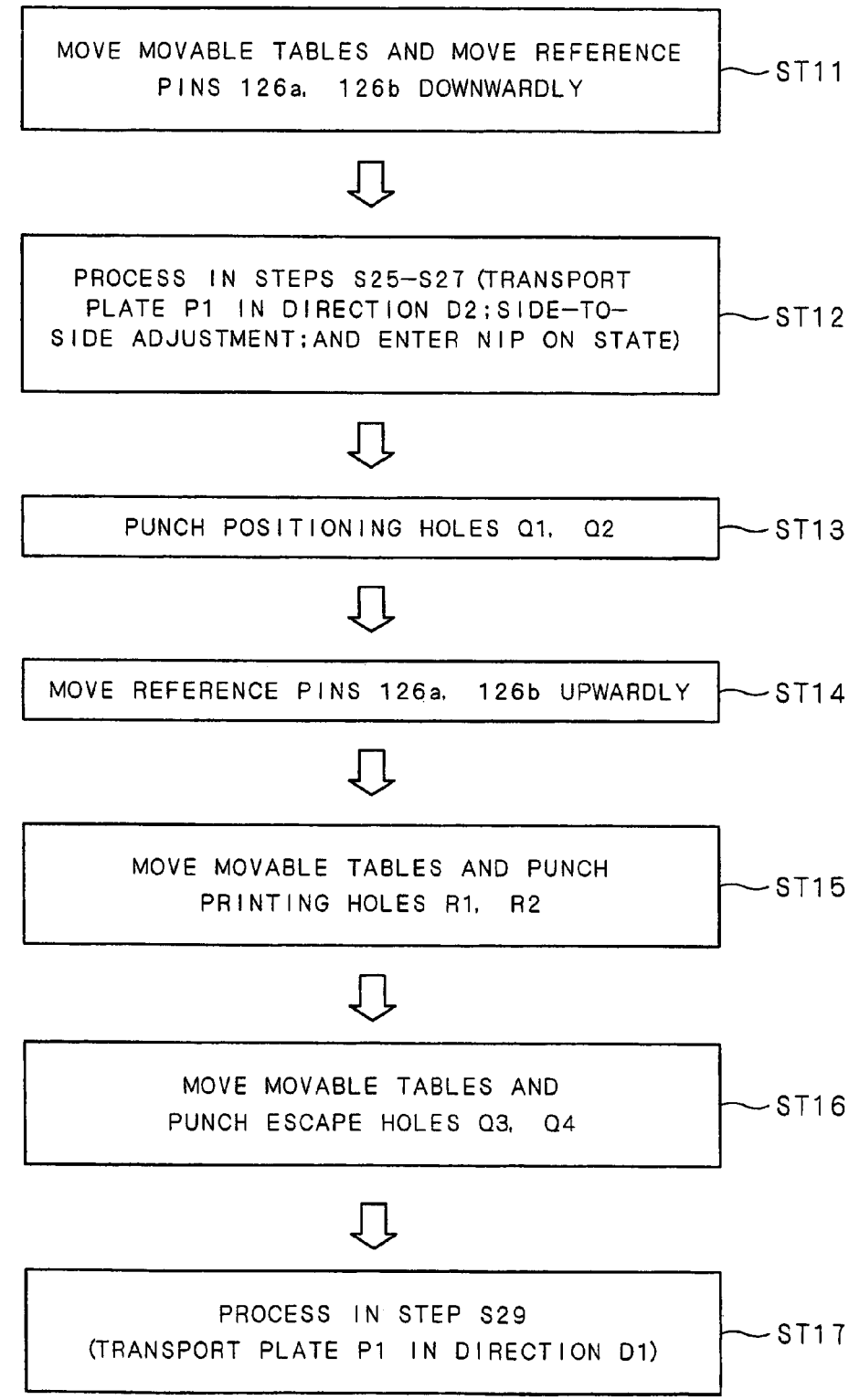
FIG. 40 illustrates the operation of punching holes in the medium-size single-mounting plate in time sequence.

FIG. 39 is a view showing a positional relationship between the first to sixth positioning pins 141 to 146 on the drum 21 and the punchers 111 to 113 when punching the elongated holes Q3 and Q4 in the operating state SS13. FIG. 40 is a diagram illustrating the operation for punching the holes Q1 to Q4 and the printing holes R1 and R2 in time sequence. The punching process for the medium-size plate P1 will be described with reference to FIGS. 39 and 40. Processes ST11 through ST15 shown in FIG. 40 are identical in operation with the processes ST1 through ST5 described above with reference to FIG. 37, and will not be described herein.

Upon punching the printing holes in the leading edge of the plate P in the process ST15 of FIG. 40, the image recorder 1 is placed into the operating state SS13. In the operating state SS13, the movable tables 110a and 110b of the first and second movable punch units 102a and 102b move, thereby to move the punchers 112a and 112b to such locations (shown in FIG. 39) that the punchers 112a and 112b can punch the escape holes Q3 and Q4, respectively. That is, the punchers 112a and 112b move along the X axis as indicated by the arrows at the operating state SS13 of FIG. 38.

Specifically, the first movable punch unit 102a moves the movable table 110a so that an X-axis distance xl34a from the center of the elongated punch 134a to the reference line C2 of the punch unit 23 is equal to an X-axis distance x142 from the center of the second positioning pin 142 to the centerline C1 of the drum 21, as illustrated in FIG. 39.

Similarly, the second movable punch unit 102b moves the movable table 110b so that an X-axis distance x134b from the center of the elongated punch 134b to the reference line C2 of the punch unit 23 is equal to an X-axis distance x145 from the center of the fifth positioning pin 145 to the centerline C1 of the drum 21. Since the elongated punches 134a and 134b are longer along the X axis than the positioning pins 142 and 145, the equality between the distances x134a and x142 and the equality between the distances x134b and x145 need not be exact.

Referring again to FIG. 40, in the locations at which the movement is completed, the punchers 112a and 112b of the respective movable punch units 102a and 102b are driven to punch the escape holes Q3 and Q4 in the plate P1 (in a process ST16).

Thereafter, the plate P1 is transported in the direction D1. This operation corresponds to Step S29 of FIG. 32 (in a process ST17).

(Punching Process for Large-Size Single-Mounting Plate P1)

Figure 41:
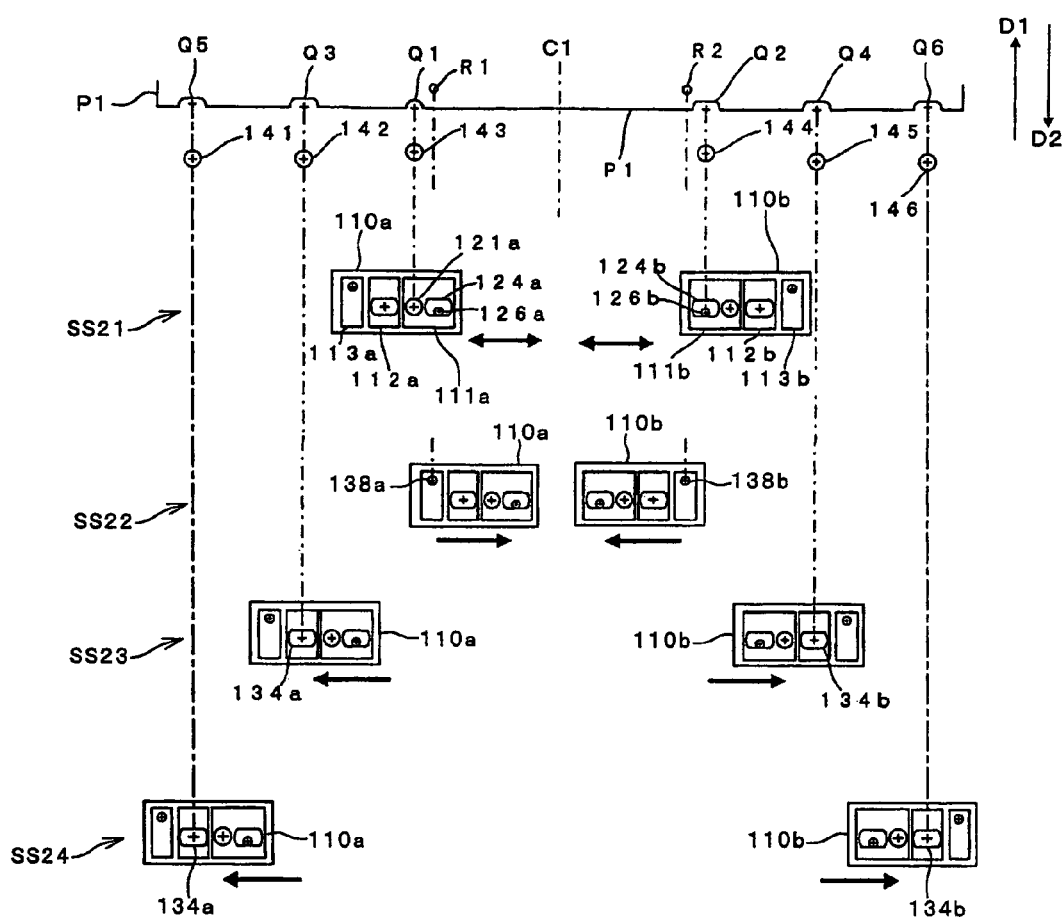
FIG. 41 is a view showing a positional relationship between a large-size single-mounting plate and the positioning pins, and a positional relationship between the punchers when punching the large-size single-mounting plate.

FIG. 41 is a view showing a positional relationship between the large-size plate P1 on the drum 21 and the positioning pins, and a movement direction of and a positional relationship between the punchers 111 to 113 when punching the plate P1 (in operating states SS21 through SS24). The operating states SS21 through SS23 shown in FIG. 41 are identical with the operating states SS11 through SS13 shown in FIG. 38, and will not be described.

As shown in FIG. 41, the leading edge of the plate P1 is punched with the semicircular positioning hole Q1, the elongated positioning hole Q2, the elongated escape holes Q3 to Q6, and the printing holes R1 and R2. The semicircular positioning hole Q1 is for engagement with the third positioning pin 143, and the elongated positioning hole Q2 is for loose engagement with the fourth positioning pin 144. The provision of the elongated escape holes Q3 to Q6 in the plate P1 prevents the plate P1 from making contact with the first, second, fifth and sixth positioning pins 141, 142, 145 and 146.

Figure 42:
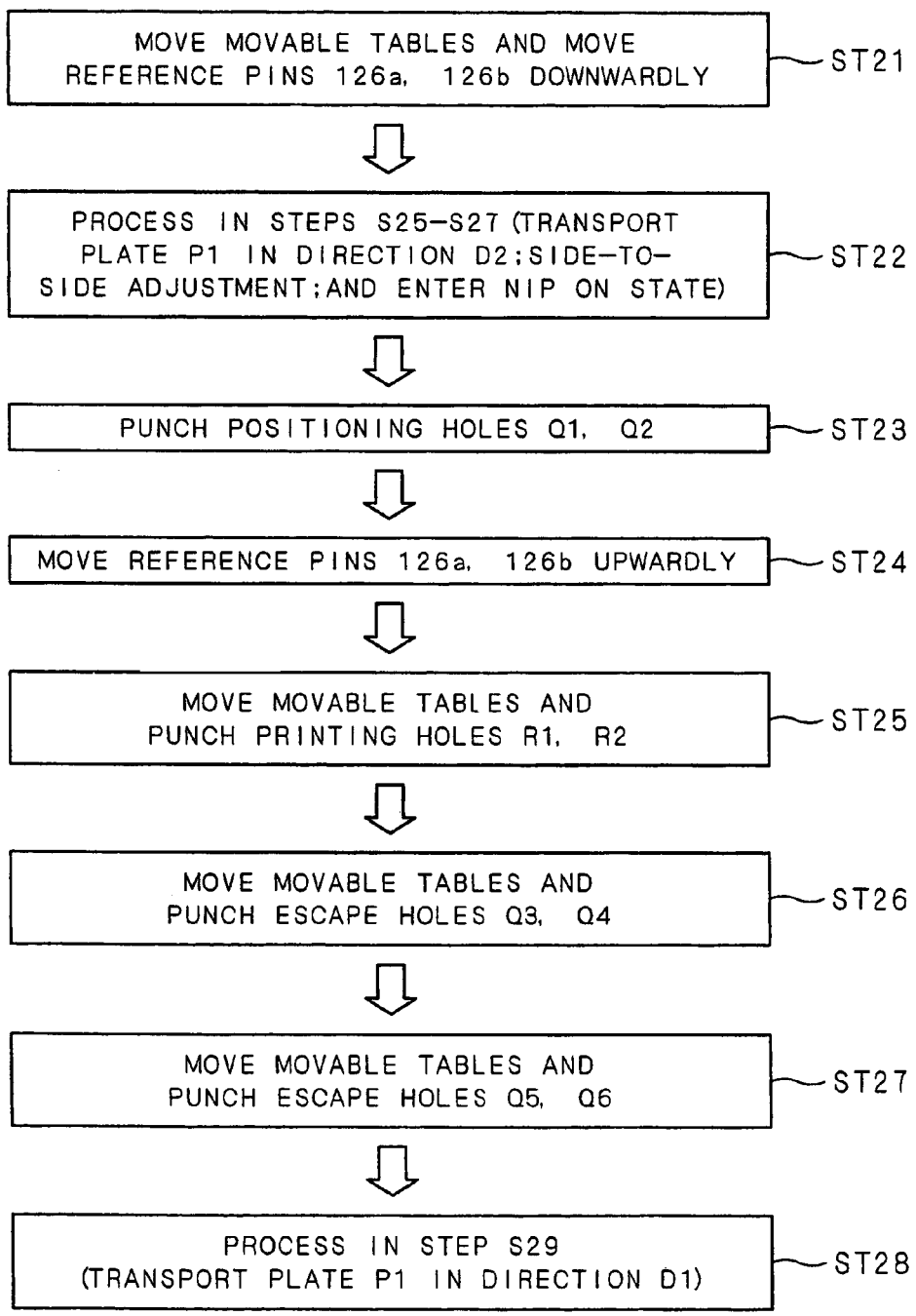
FIG. 42 illustrates the operation of punching holes in the large-size single-mounting plate in time sequence.

FIG. 42 is a diagram illustrating the operation for punching the holes Q1 to Q6, and the printing holes R1 and R2 in time sequence.

Processes ST21 through ST25 shown in FIG. 42 are identical in operation with the processes ST1 through ST5 described above with reference to FIG. 37. A process ST26 shown in FIG. 42 is identical in operation with the process ST16 described above with reference to FIG. 40. For this reason, the processes ST21 through ST26 will not be described in detail herein.

Upon punching the escape holes Q3 and Q4 in the leading edge of the plate P1 in the process ST26 of FIG. 42, the image recorder 1 is placed into the operating state SS24. In the operating state SS24, the movable tables 110a and 110b of the first and second movable punch units 102a and 102b move, thereby to move the punchers 112a and 112b to such locations that the punchers. 112a and 112b can punch the escape holes Q5 and Q6, respectively. That is, the punchers 112a and 112b move along the X axis as indicated by the arrows at the operating state SS24 of FIG. 41.

Specifically, the first movable punch unit 102a moves the movable table 110a so that the X-axis distance x134a from the center of the elongated punch 134a to the reference line C2 of the punch unit 23 is equal to an X-axis distance x141 (not shown) from the center of the first positioning pin 141 to the centerline C1 of the drum 21.

Similarly, the second movable punch unit 102b moves the movable table 110b so that the X-axis distance x134b from the center of the elongated punch 134b to the reference line C2 of the punch unit 23 is equal to an X-axis distance x146 (not shown) from the center of the sixth positioning pin 146 to the centerline C1 of the drum 21.

Next, in the locations at which the movement is completed, the punchers 112a and 112b of the first and second movable punch units 102a and 102b are driven to punch the escape holes Q5 and Q6 in the plate P1 (in a process ST27).

Thereafter, the plate P1 is transported in the direction D1. This operation corresponds to Step S29 of FIG. 32 (in a process ST28).

(Punching Process for Small-Size Double-Mounting Plates P2)

Figure 43:
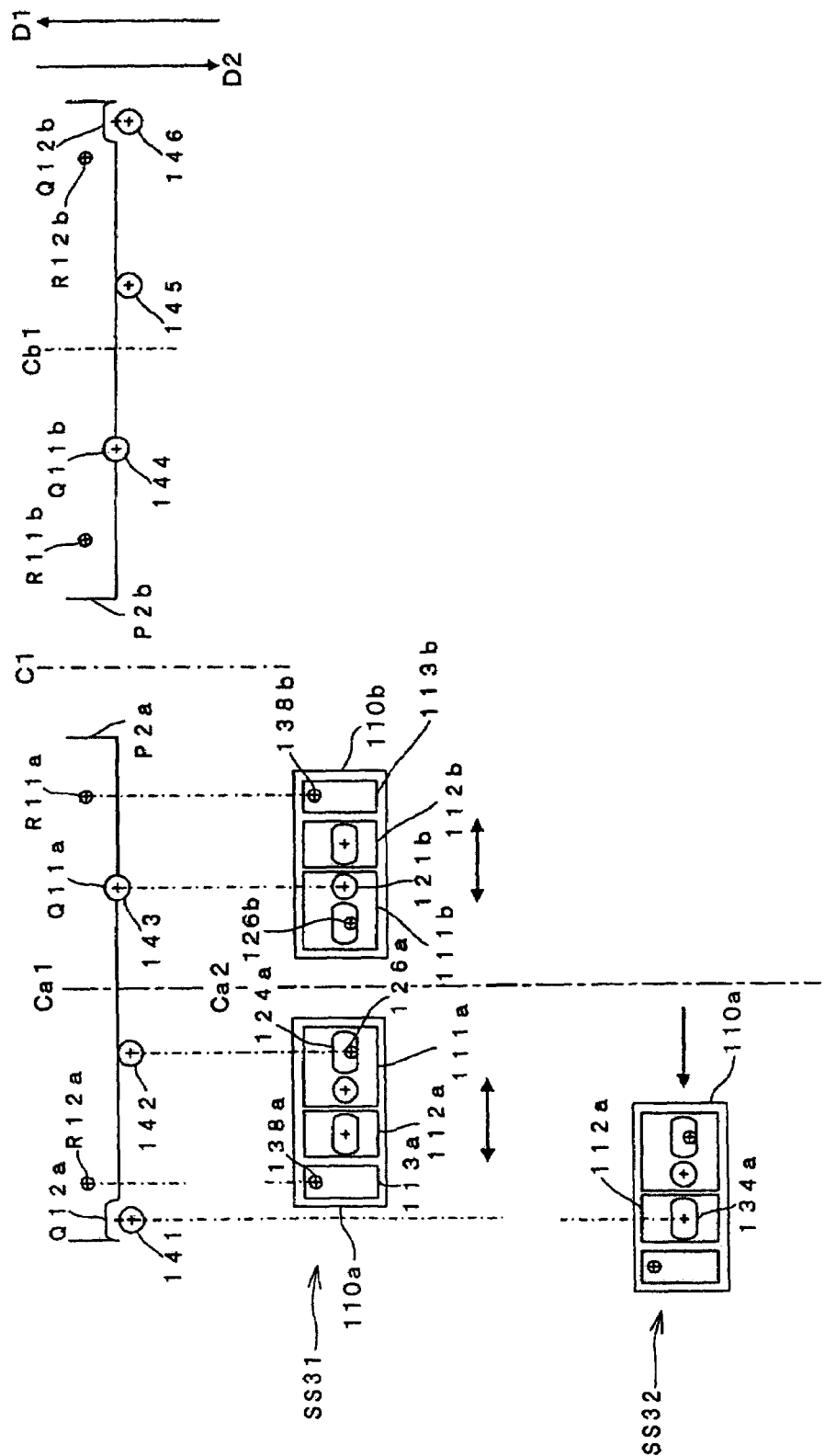
FIG. 43 is a view showing a positional relationship between a small-size double-mounting plate and the positioning pins, and a positional relationship between the punchers when punching the small-size double-mounting plate.

FIG. 43 is a view showing a positional relationship between the small-size double-mounting plates P2a, P2b on the drum 21 and the positioning pins, and a movement direction of and a positional relationship between the punchers 111 to 113 when punching the plate P2a (in operating states SS31 and SS32).

When the image recorder 1 performs the punching process on the two plates P2a and P2b, the order in which the punching process is performed, in principle, is: first the plate P2a (or the plate P2 for mounting in the first plate mounting region 27a), and then the plate P2b (or the plate P2 for mounting in the second plate mounting region 27b). However, when the movable tables 110a and 110b are in the second plate mounting region 27b at the beginning of the punching process, the punching process may be performed first on the plate P2b.

As shown in FIG. 43, the leading edge of the plate P2a (P2b) is punched with the semicircular positioning hole Q11a (Q11b), the elongated escape hole Q12a (Q12b), and the printing holes R11a (R11b) and R12a (R12b).

The operating state SS31 of FIG. 43 indicates the operation in Step S4 described above with reference to FIG. 30. This operation moves the movable tables 110a and 110b of the punch unit 23 to the locations depending on the number and sizes of the plates P.

Figure 44:
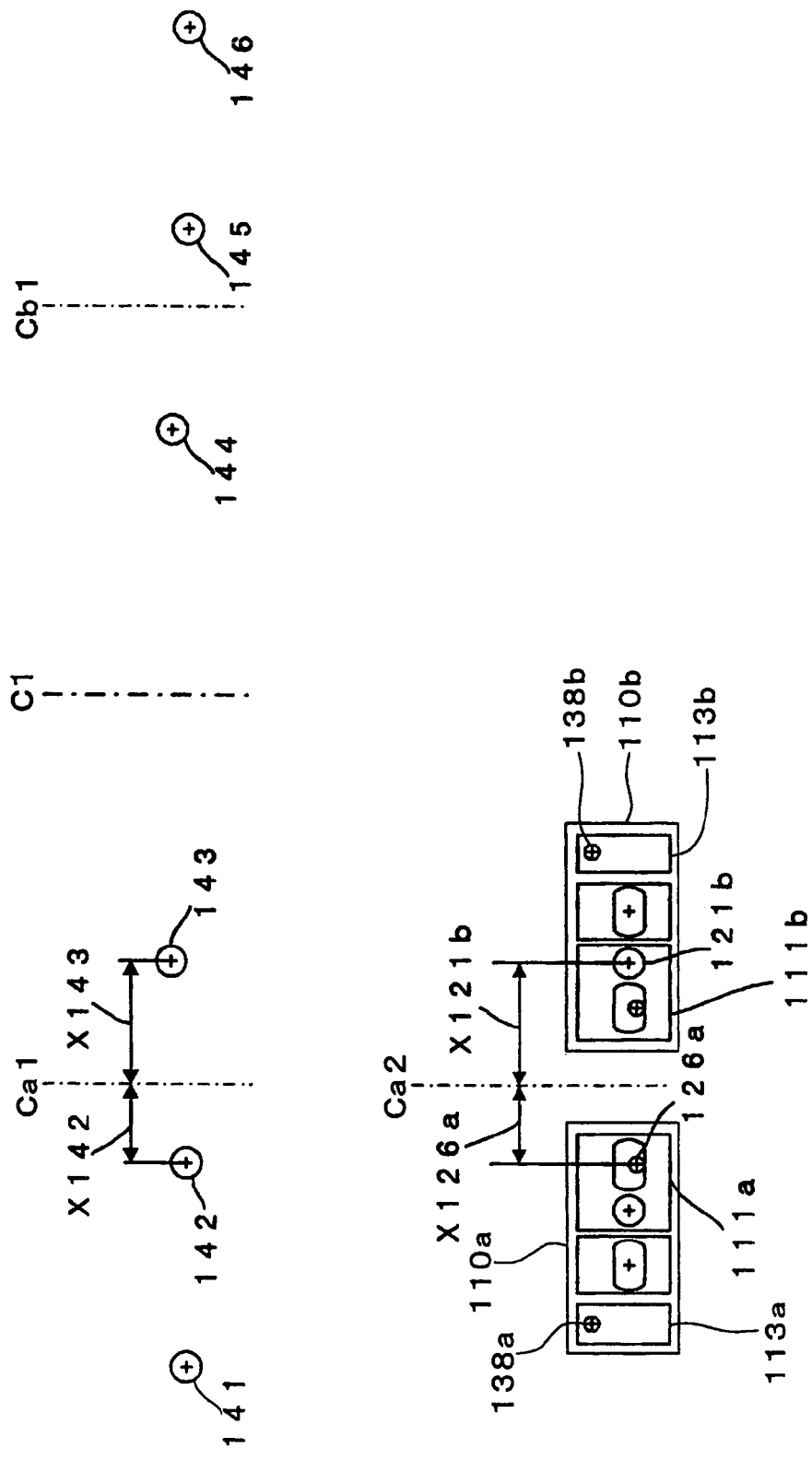
FIG. 44 is a schematic view showing a positional relationship between the punches, the reference pins and the positioning pins.
Figure 45:
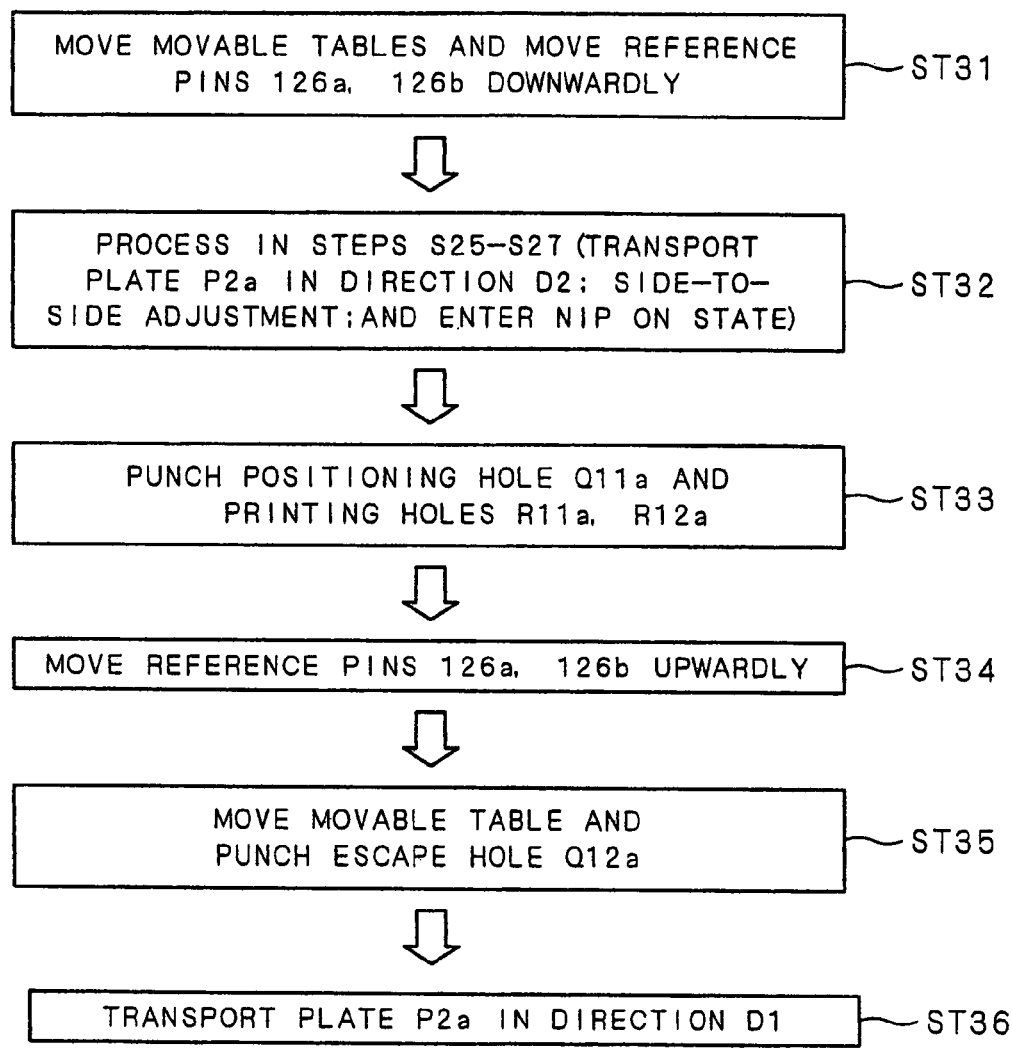
FIG. 45 illustrates the operation of punching holes in the small-size double-mounting plate in time sequence.

FIG. 44 is a view showing a positional relationship between the first to sixth positioning pins 141 to 146 on the drum 21 and the punchers 111a and 111b when punching the holes Q11a and Q12a in the operating state SS31. FIG. 45 is a diagram illustrating the operation for punching the holes Q11a, Q12a and the printing holes R11a, R12a in the plate P2a in time sequence. The operating state SS31 will be described with reference to FIGS. 44 and 45.

First, the first movable punch unit 102a moves the movable table 110a so that an X-axis distance x126a from the reference line Ca2 of the first movable punch unit 102a to the center of the reference pin 126a is equal to the X-axis distance x142 from the centerline Ca1 of the first plate mounting region 27a to the center of the second positioning pin 142.

Similarly, the second movable punch unit 102b moves the movable table 110b so that an X-axis distance x121b from the reference line Ca2 of the first movable punch unit 102a to the center of the round punch 121b is equal to the X-axis distance x143 from the centerline Ca1 of the first plate mounting region 27a to the center of the third positioning pin 143, as illustrated in FIG. 44.

Concurrently with the above movement, the reference pin 126a of the puncher 111a is moved down to the level of the clearance 123a, and the reference pin 126b of the puncher 111b is moved down to the level of the clearance 123b. The operation described heretofore corresponds to a process ST31 shown in FIG. 45.

Figure 31:
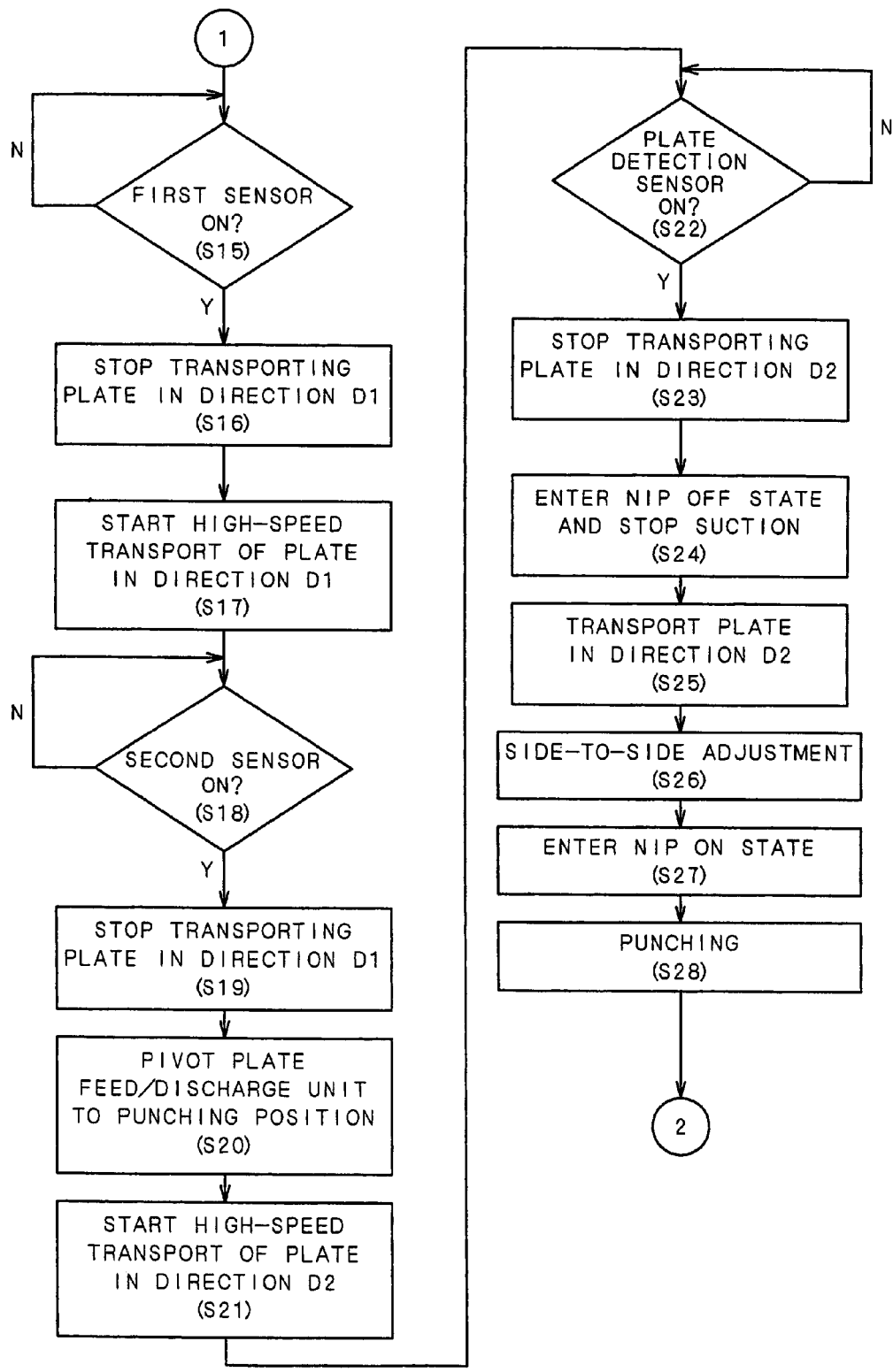
Figure 32:
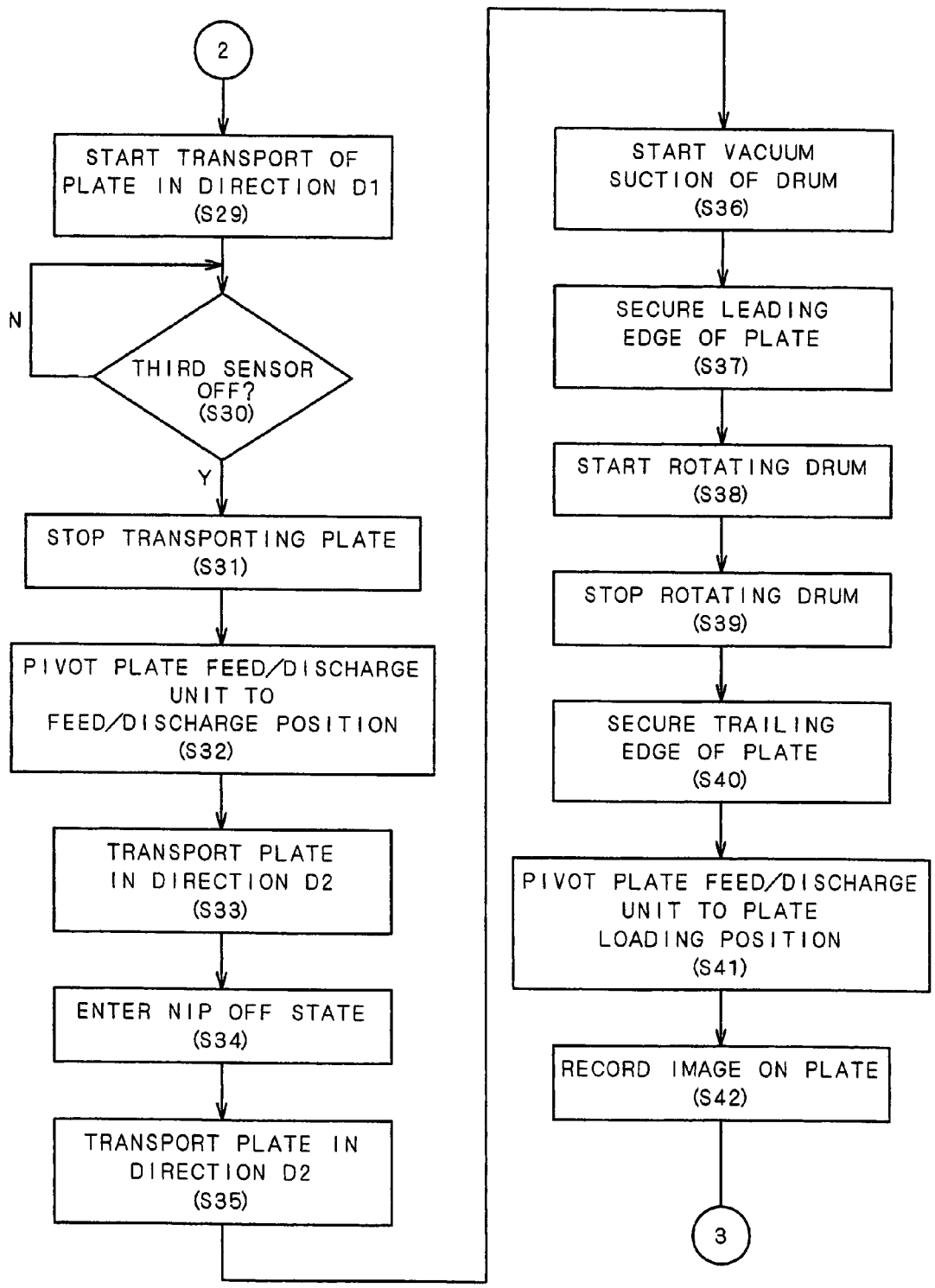
Figure 33:
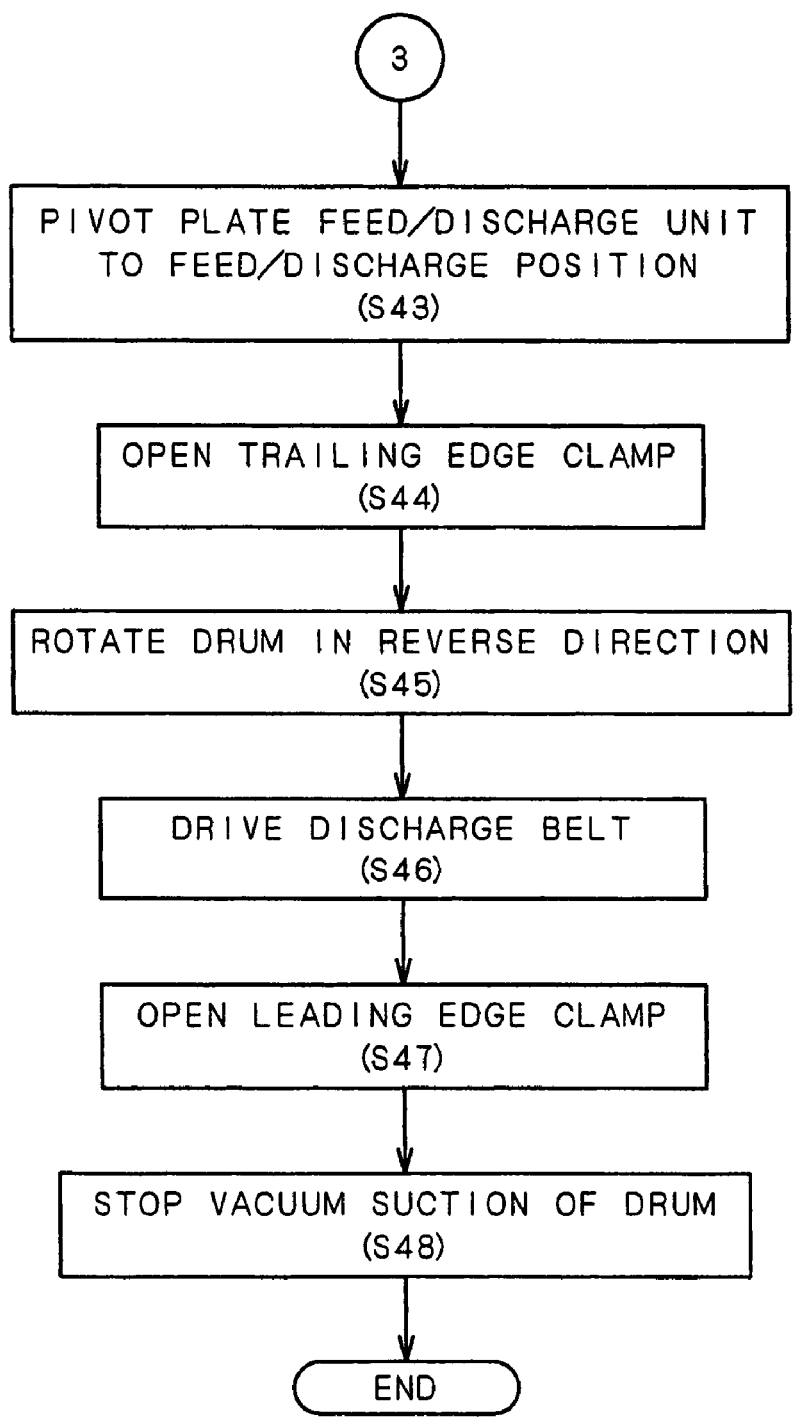

Next, operation in Steps S25 through S27 of FIG. 31 is performed (in a process ST32). Specifically, the step of transporting the plate P2a at low speeds until the leading edge of the plate P2a comes into contact with the reference pins 126a, 126b (Step S25), the side-to-side adjustment step (Step S26), and the step of entering the nip ON state (Step S27) are carried out in succession.

Next, a drive mechanism not shown of the puncher 111b causes the round punch 121b to punch the semicircular positioning hole Q11a in the leading edge of the plate P2a. At the same time, the punchers 113a and 113b are driven to cause the punches 138a and 138b to punch the printing holes R12a and R11a, respectively, in the leading edge of the plate P2a (in a process ST33).

To produce a multicolor print with high accuracy by printing images recorded on respective plates of different colors one over another on a printing material, it is necessary that all of the plates have the same positional relationship between the recorded image and the printing holes. The location of the recorded image on the plate is influenced by the location of the positioning holes. Therefore, attainment of a high-quality multicolor image involves the need that all of the plates have accurately the same positional relationship between the printing holes and the positioning holes.

In the image recorder 1, the punchers 111b and 113b are manufactured so that the positional relationship between the punch 138b for punching the printing hole R11a and the round punch 121b for punching the positioning hole Q11a is identical with the positional relationship between the holes R11a and Q11a. This provides a constantly fixed positional relationship between the printing hole R11a and the positioning hole Q11a in all of the plates, thereby to produce a high-accuracy multicolor print.

Next, the reference pins 126a and 126b are moved upwardly to above the clearances 133a and 133b, respectively (in a process ST34).

Then, the movable table 110a of the first movable punch unit 102a is moved, thereby to move the puncher 112a to such a location that the puncher 112a can punch the escape hole Q12a. That is, the puncher 112a moves along the X axis as indicated by the arrow at the operating state SS32 of FIG. 43. More specifically, the movable table 110a is moved so that an X-axis distance from the center of the elongated punch 134a to the reference line Ca2 of the first movable punch unit 102a is equal to an X-axis distance from the center of the first positioning pin 141 to the centerline Ca1 of the first plate mounting region 27a.

Next, in the location at which the movement is completed, the punch 138a is driven to punch the escape hole Q12a in the leading edge of the plate P2a (in a process ST35).

Thereafter, the plate P2a is transported in the direction D1 back onto the upper tray 41 (in a process ST36).

Figure 46:
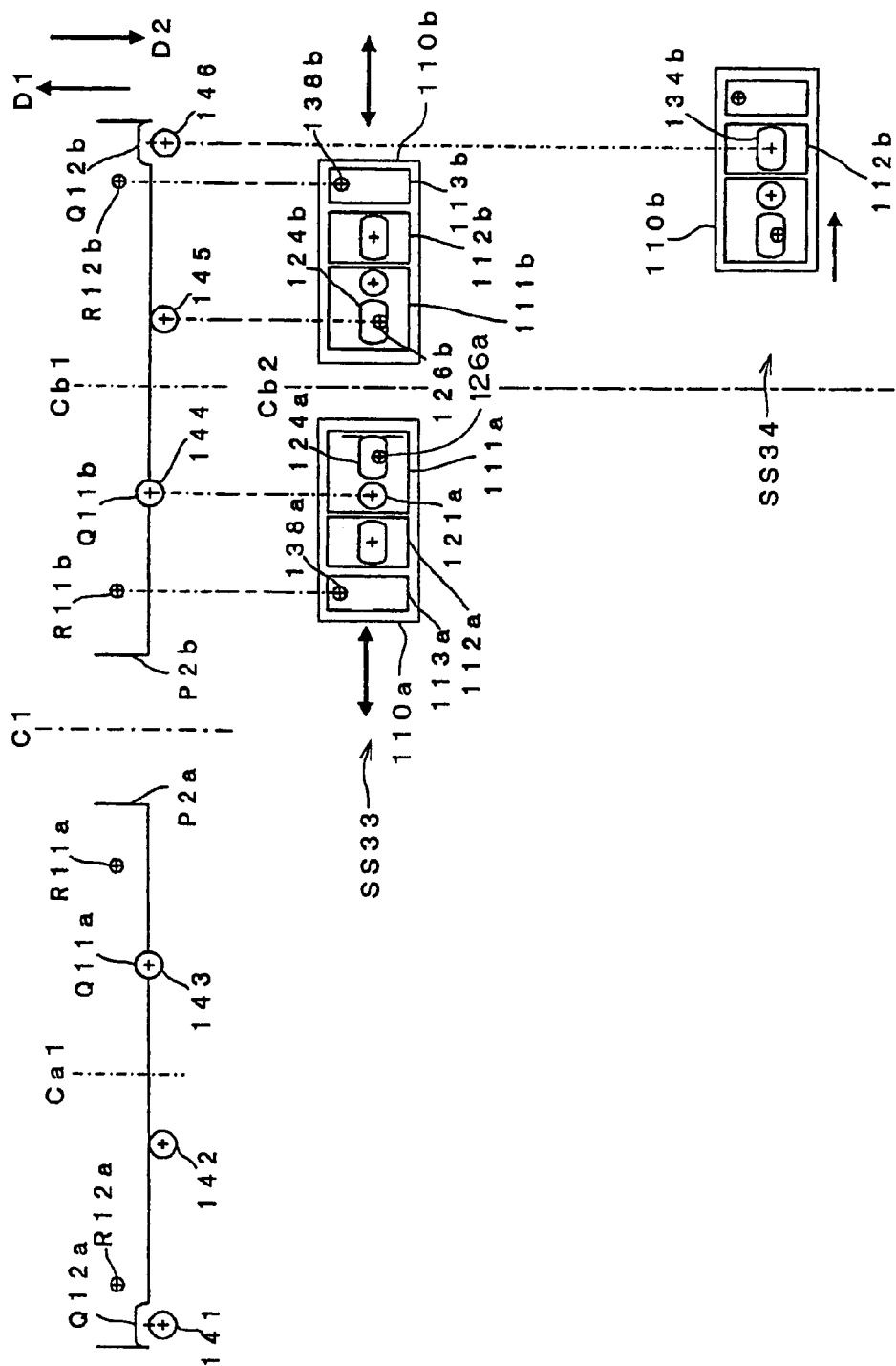
FIG. 46 is a view showing a positional relationship between a small-size double-mounting plate and the positioning pins, and a positional relationship between the punchers when punching the small-size double-mounting plate.
Figure 47:
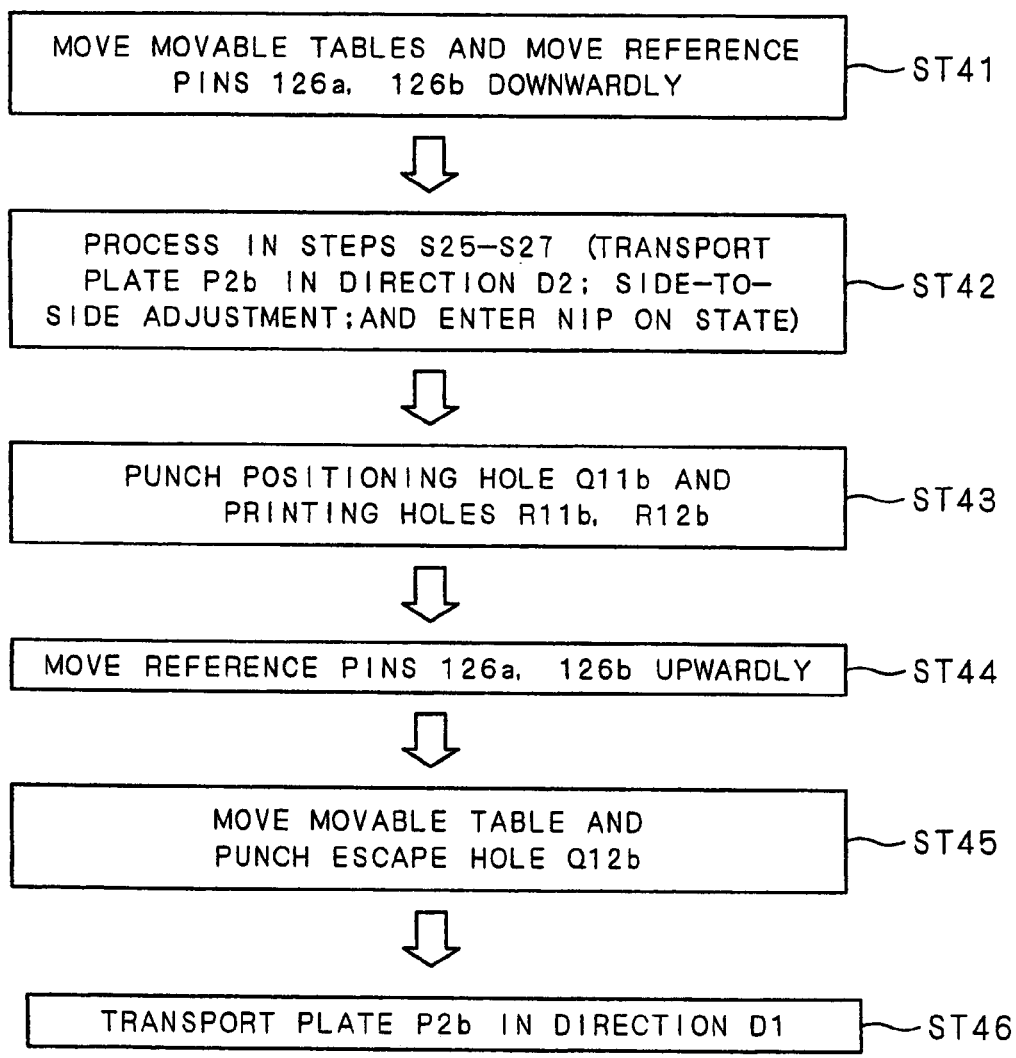
FIG. 47 illustrates the operation of punching holes in the small-size double-mounting plate in time sequence.

When the punching process on the plate P2a is completed, the punching process is then performed on the plate P2b. FIG. 46 is a view showing a positional relationship between the small-size double-mounting plates P2a, P2b on the drum 21 and the positioning pins, and a movement direction of and a positional relationship between the punchers 111 to 113 when punching the plate P2b (in operating states SS33 and SS34). FIG. 47 is a diagram illustrating the operation for punching the holes Q11b, Q12b and the printing holes R11b, R12b in the plate P2b in time sequence. The operating state SS34 will be described with reference to FIGS. 46 and 47.

First, the first and second movable tables 110a and 110b are moved to predetermined locations. That is, the operation corresponding to Step S4 described above with reference to FIG. 30 is performed. This operation moves the first and second movable tables 110a and 110b of the punch unit 23 to the locations depending on the number and sizes of the plates P (in the operating state SS33).

Specifically, the second movable punch unit 102b moves the movable table 110b so that an X-axis distance from the reference line Cb2 of the second movable punch unit 102b to the center of the reference pin 126b is equal to an X-axis distance from the centerline Cb1 of the second plate mounting region 27b to the center of the fifth positioning pin 145.

The first movable punch unit 102a moves the movable table 110a so that an X-axis distance from the reference line Cb2 of the second movable punch unit 102b to the center of the round punch 121a is equal to an X-axis distance from the centerline Cb1 of the second plate mounting region 27b to the center of the fourth positioning pin 144.

Concurrently with the above movement, the reference pin 126a of the puncher 111a is moved down to the level of the clearance 123a, and the reference pin 126b of the puncher 111b is moved down to the level of the clearance 123b. The operation described heretofore corresponds to a process ST41 shown in FIG. 47.

Next, operation in Steps S25 through S27 of FIG. 31 is performed (in a process ST42). Specifically, the step of transporting the plate P2b at low speeds until the leading edge of the plate P2b comes into contact with the reference pins 126a, 126b (Step S25), the side-to-side adjustment step (Step S26), and the step of entering the nip ON state (Step S27) are carried out in succession.

Next, the drive mechanism not shown of the puncher 111a causes the round punch 121a to punch the semicircular positioning hole Q11b in the leading edge of the plate P2b. At the same time, the punchers. 113a and 113b are driven to cause the punches 138a and 138b to punch the printing holes R11b and R12b, respectively, in the leading edge of the plate P2b (in a process ST43).

In the image recorder 1, the punchers 111a, 111b and 113a are manufactured so that the positional relationship between the punch 138a for punching the printing hole R11b and the round punch 121a for punching the positioning hole Q11b is identical with the positional relationship between the holes R11b and Q11b. This provides a constantly fixed positional relationship between the printing hole R11b and the positioning hole Q11b in all of the plates, thereby to produce a high-accuracy multicolor print.

Next, the reference pins 126a and 126b are moved upwardly to above the clearances 133a and 133b, respectively (in a process ST44).

Then, the image recorder 1 is placed into the operating state SS34. The second movable punch unit 102b moves the movable table 110b, thereby to move the puncher 112b to such a location that the puncher 112b can punch the escape hole Q12b. More specifically, the movable table 110b is moved so that an X-axis distance from the center of the elongated punch 134b to the reference line Cb2 of the second movable punch unit 102b is equal to an X-axis distance from the center of the sixth positioning pin 146 to the centerline Cb1 of the second plate mounting region 27b.

Next, in the location at which the movement is completed, the elongated punch 134b is driven to punch the escape hole Q12b in the leading edge of the plate P2b (in a process ST45).

Thereafter, the plate P2b is transported in the direction D1 back onto the upper tray 41 (in a process ST46).

This completes the punching process on the small-size double-mounting plates P2a and P2b.

(Punching Process for Large-Size Double-Mounting Plates P2)

Figure 48:
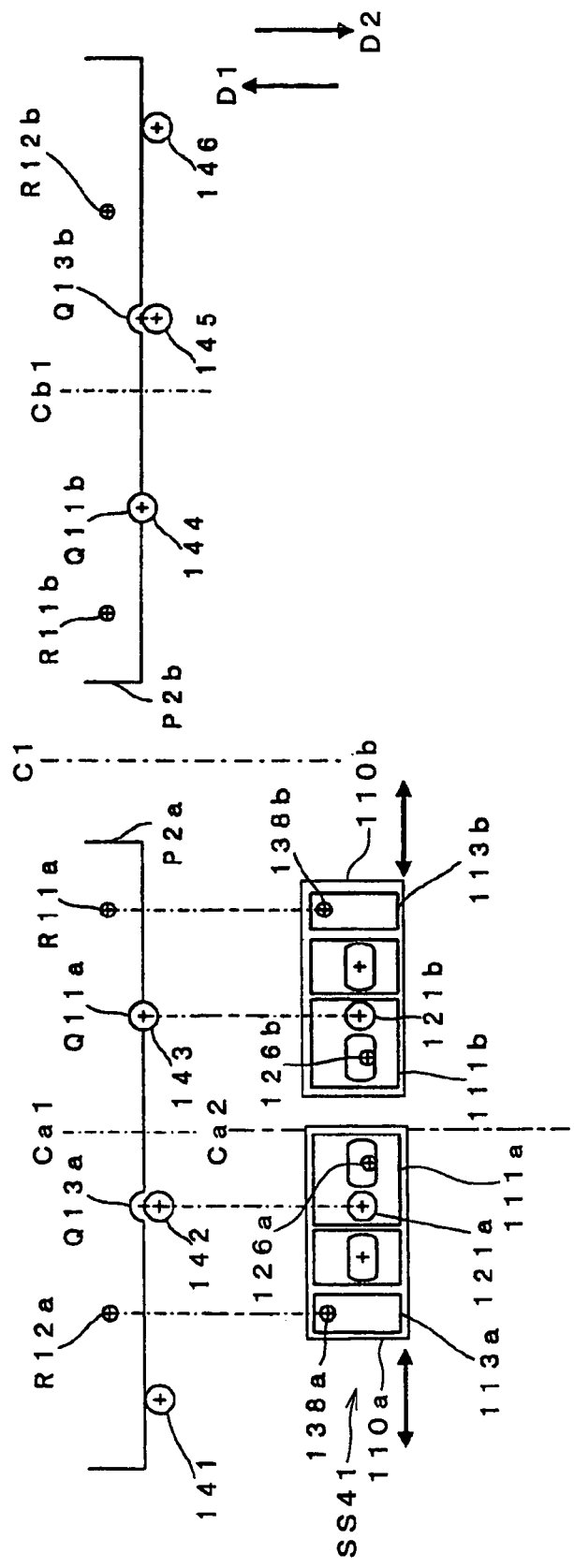
FIG. 48 is a view showing a positional relationship between a large-size double-mounting plate and the positioning pins, and a positional relationship between the punchers when punching the large-size double-mounting plate.
Figure 49:
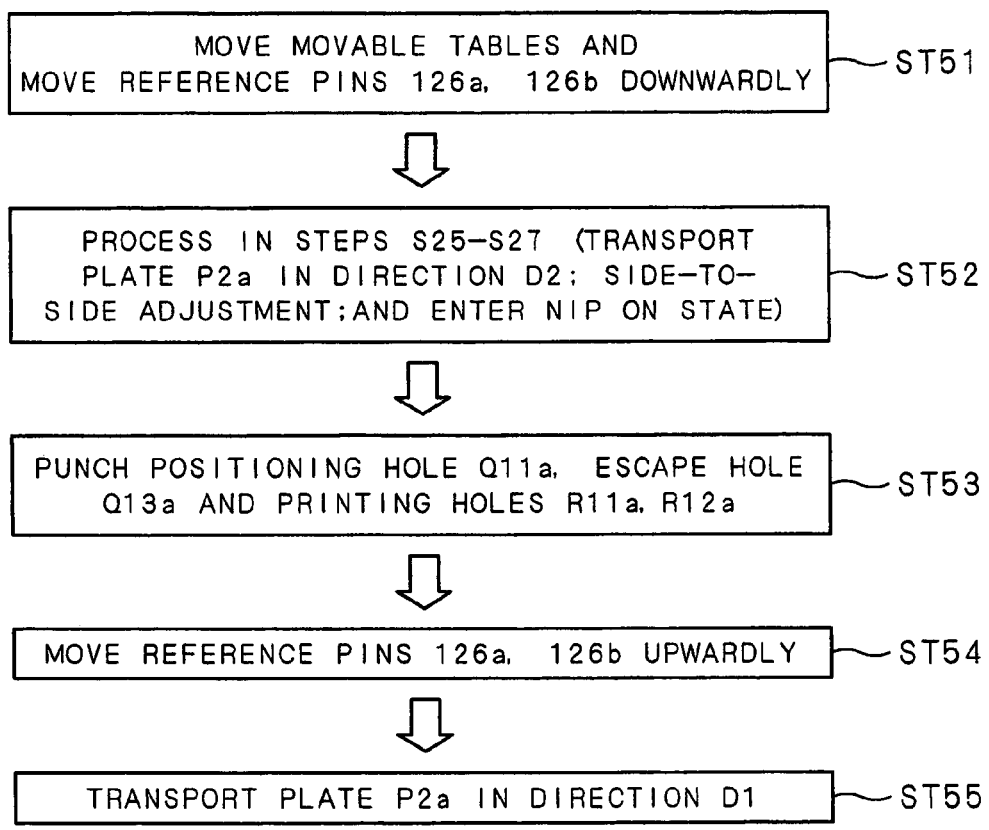
FIG. 49 illustrates the operation of punching holes in the large-size double-mounting plate in time sequence.

FIG. 48 is a view showing a positional relationship between the large-size double-mounting plates P2a, P2b on the drum 21 and the first to sixth positioning pins 141 to 146, and a movement direction of and a positional relationship between the punchers 111a, 111b, 113a and 113b when punching the plate P2a (in an operating state SS41). FIG. 49 is a diagram illustrating the operation for punching the holes Q11a, Q13a and the printing holes R11a, R12a in the plate P2a in time sequence.

As shown in FIG. 48, the leading edge of the plate P2a (P2b) is punched with the semicircular positioning hole Q11a (Q11b), the semicircular escape hole Q13a (Q13b), and the printing holes R11a (R11b) and R12a (R12b).

The operating state SS41 of FIG. 48 indicates the operation in Step S4 described above with reference to FIG. 30. When the large-size double-mounting plates P2 are used, the first and second movable punch units 102a and 102b are controlled in a manner to be described below.

The first movable punch unit 102a moves the movable table 110a so that an X-axis distance from the center of the round punch 121a of the puncher 113a to the reference line Ca2 of the first movable punch unit 102a is equal to an X-axis distance from the center of the second positioning pin 142 on the drum 21 to the centerline Ca1.

The second movable punch unit 102b moves the movable table 110b so that an X-axis distance from the center of the round punch 121b of the puncher 111b to the reference line Ca2 of the first movable punch unit 102a is equal to an X-axis distance from the center of the third positioning pin 143 on the drum 21 to the centerline Ca1.

Concurrently with the above movement, the reference pin 126a of the puncher 111a is moved down to the level of the clearance 123a, and the reference pin 126b of the puncher 111b is moved down to the level of the clearance 123b. The operation described heretofore corresponds to a process ST51 shown in FIG. 49.

Next, operation in Steps S25 through S27 of FIG. 31 is performed (in a process ST52).

Next, the puncher 111a is driven to cause the round punch 121a to punch the semicircular escape hole Q13a in the leading edge of the plate P2a. At the same time, the puncher 111b is driven to cause the round punch 121b to punch the semicircular positioning hole Q11a in the leading edge of the plate P2a. Also simultaneously, the punchers 113a and 113b are driven to punch the printing holes R12a and R11a, respectively, in the leading edge of the plate P2a (in a process ST53).

Next, the reference pins 126a and 126b are moved upwardly (in a process ST54). Thereafter, the plate P2a is transported in the direction D1 back onto the upper tray 41 (in a process ST55).

Figure 50:
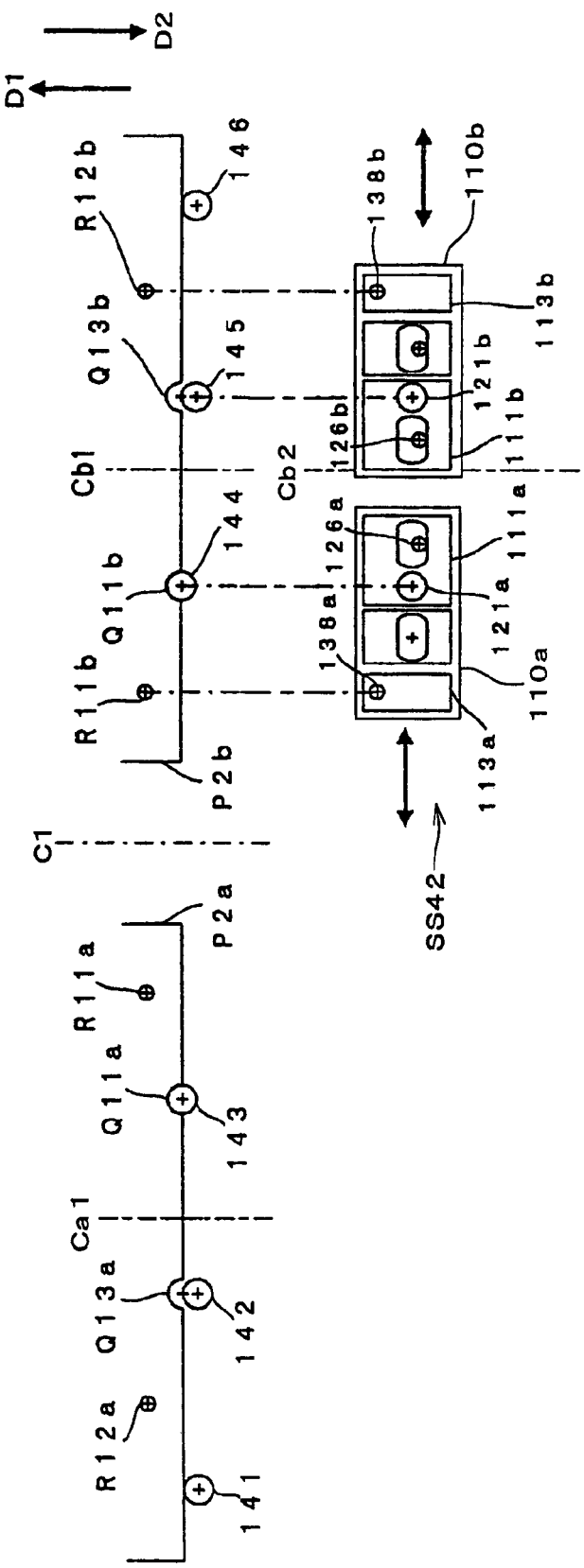
FIG. 50 is a view showing a positional relationship between a large-size double-mounting plate and the positioning pins, and a positional relationship between the punchers when punching the large-size double-mounting plate.
Figure 51:
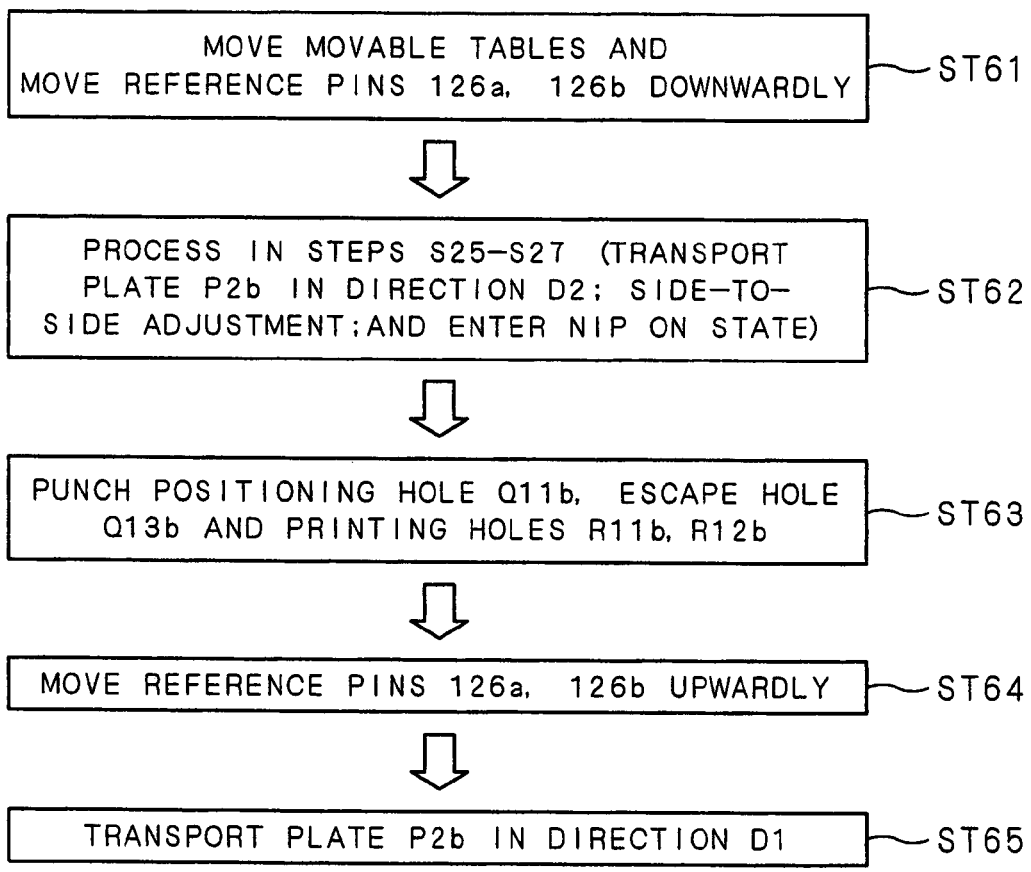
FIG. 51 illustrates the operation of punching holes in the large-size double-mounting plate in time sequence.

When the punching process on the plate P2a is completed, the punching process is then performed on the plate P2b. FIG. 50 is a view showing a positional relationship between the large-size double-mounting plates P2a, P2b on the drum 21 and the first to sixth positioning pins 141 to 146, and a movement direction of and a positional relationship between the punchers 111a, 111b, 113a and 113b when punching the plate P2b (in an operating state SS42). FIG. 51 is a diagram illustrating the operation for punching the holes Q11b, Q13b and the printing holes R11b, R12b in the plate P2b in time sequence.

First, the first movable punch unit 102a moves the movable table 110a so that an X-axis distance from the reference line Cb2 of the second movable punch unit 102b to the center of the round punch 121a is equal to an X-axis distance from the centerline Cb1 of the second plate mounting region 27b to the center of the fourth positioning pin 144.

The second movable punch unit 102b moves the movable table 110b so that an X-axis distance from the reference line Cb2 of the second movable punch unit 102b to the center of the round punch 121b is equal to an X-axis distance from the centerline C1 of the second plate mounting region 27b to the center of the fifth positioning pin 145.

Concurrently with the above movement, the reference pin 126a of the puncher. 111a is moved down to the level of the clearance 123a, and the reference pin 126b of the puncher 111b is moved down to the level of the clearance 123b. The operation described heretofore corresponds to a process ST61 shown in FIG. 51.

Next, operation in Steps S25 through S27 of FIG. 31 is performed (in a process ST62).

Next, the puncher 111a is driven to cause the round punch 121a to punch the semicircular positioning hole Q11b in the leading edge of the plate P2b. At the same time, the puncher 111b is driven to cause the round punch 121b to punch the semicircular escape hole Q13b in the leading edge of the plate P2b. Also simultaneously, the punchers 113a and 113b are driven to punch the printing holes R11b and R12b, respectively, in the leading edge of the plate P2b (in a process ST63).

Next, the reference pins 126a and 126b are moved upwardly (in a process ST64). Thereafter, the plate P2b is transported in the direction D1 back onto the upper tray 41 (in a process ST65). This completes the punching process on the plates P2a, and P2b.

In the above description, the upper tray 41 is loaded with two plates of the same size. However, when the upper tray 41 is loaded with two plates P2 of different sizes, the procedure described with reference to FIGS. 43 through 51 may be suitably changed, thereby allowing the proper punching process to be carried out on the two plates P2.

In the aforementioned preferred embodiment, the location of the reference pins for use in positioning the plate during punching is substantially the same as the location of the positioning pins for use in positioning the plate on the drum. This prevents the degradation of the quality of a printed material produced by printing on a printing sheet using an image recorded on the plate if the leading edge of the plate is wavy.

This will be described with reference to FIG. 45. As shown in FIG. 45, the plate P2a is subjected to the positioning by the reference pins 126a and 126b (in the process ST32) prior to the punching by the punch unit 23 (in the process ST33).

It is assumed that the plate P2a has a wavy portion situated to be brought into contact with the reference pin 126a. Then, the plate P2a is subjected to the positioning in an orientation inclined by the amount of the wavy portion, and then the holes Q11a, Q12a and the printing holes R11a, R12a are punched in the printing plate P2a. Thereafter, the plate P2a is subjected to the positioning on the drum 21 by the positioning pins 142 and 143. If the second positioning pin 142 is situated to be clear of the wavy portion, the plate P2a is fixed in an uninclined orientation on the drum 21, and then the recording heads 22 record an image on the plate P2a.

Such a difference in amount of inclination of the plate between the process of forming the printing holes and the process of recording the image causes different positional relationships between the recorded image and the printing holes depending on plates. This results in the lower overprinting accuracy provided when the same image is overprinted on a printing sheet by using these plates, to degrade the quality of the printed material.

In the image recorder 1 according to the present invention, the centering and the plate transport are performed so that a portion of the plate P2a which is to be brought into contact with the reference pin 126a makes contact with the positioning pin 142 on the drum 21. Therefore, the image recorder 1 prevents the aforementioned degradation of the quality of the printed material.

In the above description, the punch unit 23 disposed in the image recorder 1 is used to punch the positioning holes, the printing holes and the escape holes. However, a punch unit of the same type may be prepared as an individual plate punch apparatus outside the image recorder 1 and be used to punch virgin plates.

Additionally, the holes other than the positioning holes may be punched by an internal punch unit of the image recorder 1 or an external plate punch apparatus after the image is recorded on the plate.

While the invention has been described in detail, the foregoing description is in all aspects illustrative and not restrictive. It is understood that numerous other modifications and variations can be devised without departing from the scope of the invention.

What is claimed is:

1. An image recorder comprising:
   a cylindrical recording drum for mounting at least one image recording material on a surface thereof;
   a rotation mechanism for rotating said recording drum in a predetermined direction of rotation;
   a first recording head for recording an image on said at least one image recording material mounted on said recording drum; and
   a plurality of positioning pins disposed fixedly to protrude through said surface for positioning said at least one image recording material with respect to said recording drum, wherein
   said plurality of positioning pins include:
   a first pin-alignment having a pair of first pins, disposed almost in parallel to the axis of said recording drum; and
   at least one second pin-alignment each having at least one pair of second pins, disposed almost in parallel to the axis of said recording drum, wherein
   said first pin-alignment is offset backwardly with respect to said at least one second pin-alignment in a direction of insertion of said at least one image recording material,
   wherein said at least one image recording material includes one image recording material, said image recorder selectively executes positioning of a small-size single-mounting image recording material and a large-size single-mounting image recording material with only said pair of first pins of said plurality of positioning pins brought into contact with a leading edge of said at least one image recording material, and
   when said at least one image recording material includes two image recording materials, said image recorder executes positioning of said two image recording materials such that said two image recording materials are both mounted on said surface.

2. The image recorder according to claim 1, wherein said at least one pair of second pins includes two pairs of second pins.

3. The image recorder according to claim 1, wherein
   said at least one image recording material is positioned by a first pin member selected from said pair of first pins and a second pin member selected from said at least one pair of second pins.

4. The image recorder according to claim 1, wherein said first pin-alignment is symmetric with respect to the centerline of said recording drum.

5. The image recorder according to claim 1, wherein
   said second pin-alignment is symmetric with respect to the centerline of said recording drum.

6. The image recorder according to claim 1, wherein
   said plurality of positioning pins are brought into contact with an edge of said at least one image recording material.

7. The image recorder according to claim 1, further comprising
   a second recording head for recording an image on said at least one image recording material mounted on said recording drum, said second recording head being capable of performing image recording independently of said first recording head.

8. The image recorder according to claim 1, wherein
   said recording drum mounts a rectangular image recording material on a surface thereof, and
   said rectangular image recording material is of a size ranging from 398 by 370 mm to 2382 by 1270 mm.

9. The image recorder according to claim 1, further comprising:
   a tray for selectively loading therewith image recording materials of at least two types of sizes; and
   a punching element for punching an escape hole for preventing contact between an edge of an image recording material loaded onto said tray and said at least one pair of second pins, wherein
   said image recording material loaded onto said tray is positioned on said surface with an edge thereof brought into contact with said pair of first pins.

10. The image recorder according to claim 1, further comprising
- a tray for selectively loading therewith one of a single-mounting image recording material and two double-mounting image recording materials, wherein
- each of said first pin-alignment and said second pin-alignment is symmetric with respect to the centerline of said recording drum, and
- said image recorder selectively executes first plate handling for positioning said single-mounting image recording material on said surface with an edge thereof brought into contact with said pair of first pins and second plate handling for positioning said two double-mounting image recording materials on said surface at the same time with edges thereof respectively brought into contact with a first pin member selected from said pair of first pins and a second pin member selected from said at least one pair of second pins.

11. The image recorder according to claim 10, wherein a virgin image recording material is loaded onto said tray while said first recording head is recording an image on an image recording material mounted on said recording drum.

12. The image recorder according to claim 10, further comprising
- a second recording head for recording an image on an image recording material mounted on said recording drum independently of said first recording head, wherein
- in said second plate handling, image recording on one of said two double-mounting image recording materials by said first recording head and image recording on the other one of said two double-mounting image recording materials by said second recording head are performed concurrently.

13. The image recorder according to claim 10, further comprising
- a second recording head for recording an image on an image recording material mounted on said recording drum independently of said first recording head, wherein
- in said first plate handling, image recording on said single-mounting image recording material is performed using one or both of said first recording head and said second recording head.

14. An image recorder comprising:
- a cylindrical recording drum for mounting at least one image recording material on a surface thereof;
- a rotation mechanism for rotating said recording drum in a predetermined direction of rotation;
- a first recording head for recording an image on said at least one image recording material mounted on said recording drum; and
- a plurality of positioning pins disposed to protrude through said surface for positioning said at least one image recording material with respect to said recording drum, wherein said plurality of positioning pins includes:
- a first pin-alignment having a pair of first pins, disposed almost in parallel to the axis of said recording drum; and
- at least one second pin-alignment each having at least one pair of second pins, disposed substantially in parallel to the axis of said recording drum, wherein said at least one second pin-alignment is offset forwardly by a predetermined offset amount with respect to said first pin-alignment in a direction of insertion of said at least one image recording material, when said at least one image recording material includes one image recording material, said image recorder selectively executes positioning of said at least one image recording material with said pair of first pins brought into contact with a leading edge of said at least one image recording material, and when said at least one image recording material includes two image recording materials, said image recorder previously forms a notch corresponding to said predetermined offset amount in a position where said two image recording materials and said pair of first pins are in contact, and executes positioning of said two image recording materials such that said two image recording materials are both mounted on said surface.

* * * * *